(12) United States Patent
Odinaka et al.

(10) Patent No.: US 11,748,537 B1
(45) Date of Patent: Sep. 5, 2023

(54) COMPUTER-AIDED DESIGN TOOL FOR LOGIC SYNTHESIS OF A MIX OF CMOS GATES AND MAJORITY AND MINORITY LOGIC CIRCUITS

(71) Applicant: Kepler Computing Inc., San Francisco, CA (US)

(72) Inventors: Ikenna Odinaka, Durham, NC (US); Sasikanth Manipatruni, Portland, OR (US); Darshak Doshi, Sunnyvale, CA (US); Rajeev Kumar Dokania, Beaverton, OR (US); Amrita Mathuriya, Portland, OR (US)

(*) Notice: Subject to any disclaimer, the term of this patent is extended or adjusted under 35 U.S.C. 154(b) by 73 days.

(21) Appl. No.: 17/384,626

(22) Filed: Jul. 23, 2021

(51) Int. Cl.
G06F 30/327 (2020.01)
G06F 30/3953 (2020.01)
G06F 30/398 (2020.01)
G06F 18/22 (2023.01)

(52) U.S. Cl.
CPC ............ *G06F 30/327* (2020.01); *G06F 18/22* (2023.01); *G06F 30/398* (2020.01); *G06F 30/3953* (2020.01)

(58) Field of Classification Search
CPC .................................................. G06F 30/327
USPC ......................................................... 716/104
See application file for complete search history.

(56) References Cited

U.S. PATENT DOCUMENTS

2008/0276210 A1* 11/2008 Albrecht ............. G06F 30/3312
716/113
2016/0350469 A1  12/2016 Amarú et al.
2017/0177750 A1   6/2017 Gaillardon et al.

OTHER PUBLICATIONS

Soeken, M. et al., Exact Synthesis of Majority-Inverter Graphs and Its Applications, in IEEE Transactions on Computer-Aided Design of Integrated Circuits and Systems. vol. 36, Issue: 11, Nov. 2017. pp. 1842-1855.
Haaswijk, W. et al., A Novel Basis for Logic Rewriting in 2017 22nd Asia and South Pacific Design Automation Conference (ASP-DAC). Jan. 16-19, 2017. 6 pages.
Muroga, S., Threshold Logic and Its Applications, Wiley-Interscience, a Division of John Wiley & Sons, Inc. New York, 1971. 8 page excerpt.
Non-Final Office Action dated Feb. 27, 2023 for U.S. Appl. No. 17/497,554.
Non-Final Office Action dated Feb. 28, 2023 for U.S. Appl. No. 17/478,688.
Final Office Action dated May 30, 2023 for U.S. Appl. No. 17/478,688.

(Continued)

*Primary Examiner* — Eric D Lee
(74) *Attorney, Agent, or Firm* — Mughal Gaudry & Franklin PC

(57) ABSTRACT

A computer-aided design (CAD) tool is provided for logic optimization and synthesis. The CAD tool executes a process that involves optimizing power, performance, and area (PPA) of a logic circuit by minimizing a number of CMOS gates, and majority and/or minority gates in the circuit and its depth. The CAD tool implements a methodology of optimizing logic synthesis based on a mix of standard cell libraries (such as AND, OR, NAND, NOR, XOR, Multiplexer, full adder, half adder, etc.) and varying input majority and minority gates (where the number of inputs in the minority and majority gates could vary as odd numbers from 3 and above). The standard cell libraries cells may contain minority and/or majority gates.

20 Claims, 43 Drawing Sheets

(56) References Cited

OTHER PUBLICATIONS

Non-Final Office Action dated Jun. 7, 2023 for U.S. Appl. No. 17/648,406.
Non-Final Office Action dated Jun. 8, 2023 for U.S. Appl. No. 17/503,014.
Non-Final Office Action dated Jun. 8, 2023 for U.S. Appl. No. 17/515,012.
Notice of Allowance dated Jun. 22, 2023 for U.S. Appl. No. 17/497,554.
Notice of Allowance dated Jun. 28, 2023 for U.S. Appl. No. 17/478,88.

* cited by examiner

201 — Given logic circuit in Verilog, netlist, graph of higher-level blocks, Boolean expressions, or truth tables form. list allowed M-gate fan-ins. fan-out constraints. synthesis objective (e.g., area, energy, delay minimization). type (majority minority)

202 — Identify inputs, state elements (latches and flipflops) outputs for segmentation 203 — Classify inputs, outputs, and state elements as terminal nodes.
Segment the logic circuit into sub-circuits with nodes input output ports. Each sub-circuit is combinational
Create a list of separate combinational circuits sequential components.
Initialize empty synthesized list 204 — List of combinational circuits and sequential components 205 — Is circuit list exhausted?

Yes → 211 — Wire the circuits in synthesized list using input and output terminals of original logic circuit 212 — Synthesized circuit 206 — No → Assign current circuit to next in the list 207 — Is current circuit combinational?

Yes → 208 — Combinational circuit synthesis

No → 209 — Sequential component synthesis

210 — Add synthesized circuit to circuits list 1300
(logarithmic breakdown of product term, e.g., 1207)

1400
(Linear breakdown of product term, e.g., 1208)

COMPUTER-AIDED DESIGN TOOL FOR LOGIC SYNTHESIS OF A MIX OF CMOS GATES AND MAJORITY AND MINORITY LOGIC CIRCUITS

BACKGROUND

Current solutions for logic optimization and synthesis use complementary metal oxide semiconductor (CMOS) logic gates or specific algorithms using 3-input majority gates. 3-input majority or minority gates are used for compressing logic circuits relative to circuits based on AND, OR, and inverter gates. These techniques are optimized for getting better end results solely from CMOS technology-based fabrication methods. This leads to inferior results for technologies which use these majority or minority gates as fundamental fabrication building blocks.

Many of these methods initialize MIG (majority inverter graphs—connected nodes of majority and inverter gates) based on AND-OR-INVERT (AOI) graphs, which are connected nodes of AND, OR, and inverter gates. This is done by replacing each of these AND, OR, NAND, or NOR gates with majority or minority gates (M-gates) and introducing inverters as needed and applying heuristics to reduce the gate counts or logic depth. This is possible because the minority gate is a universal gate. However, this technique leads to suboptimal synthesis results in cases where final fabrication gates could also be majority and minority gates rather than AND, OR, NOR, or NAND gates.

Also, by limiting the M-gates to 3 inputs, any improvement in power, performance, and area (PPA) relative to static CMOS gates can be limited. Moreover, current schemes of beyond CMOS logic optimization tools focus on technologies that are incompatible with CMOS technologies. Such current technologies implement inverters that are costlier (e.g., in terms of power, area, or speed) than a CMOS inverter, leading to inverter minimization becoming an additional objective in logic optimization, where additional M-gates are introduced to reduce the number of inverters. The logic synthesis algorithms using 3-input majority gates are based on heuristics that do not perform well in terms of logic optimization and PPA.

The background description provided here is for the purpose of generally presenting the context of the disclosure. Unless otherwise indicated here, the material described in this section is not prior art to the claims in this application and are not admitted to be prior art by inclusion in this section.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 2 illustrates a flowchart of a method of logic synthesis using majority or minority inverter graph (MIG) having majority and minority logic gates of various fan-in and/or fan-out and existing standard cells, in accordance with some embodiments.

DETAILED DESCRIPTION

Figure 1:
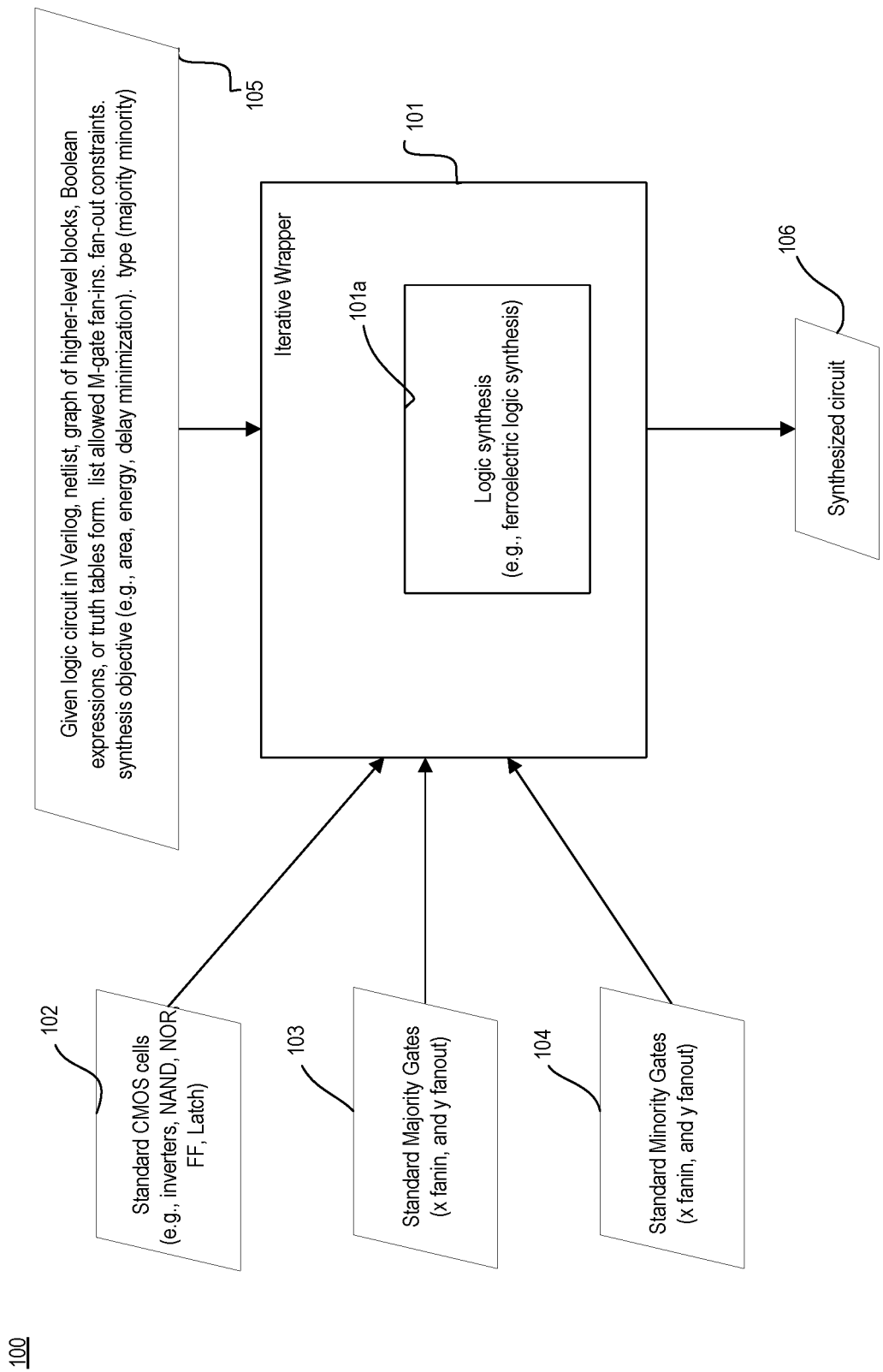
FIG. 1 illustrates a top-level architecture of a computer-aided design (CAD) tool for logic synthesis of a mix of CMOS gates and majority and minority logic gates of various fan-in and/or fan-out, in accordance with some embodiments.

Some embodiments provide a CAD tool to create optimized power, performance (e.g., delay), and area (PPA) digital logic for various standard cells and functional blocks (FUBs) using various optimization approaches. In some embodiments, the CAD tool is capable of receiving a number of inputs that describe a given logic circuit. These inputs can be in a hardware description language (HDL) such as Verilog or VHDL, netlist, graph of higher-level blocks, Boolean expressions, or truth tables. The inputs also include a list of narrow and/or wide-input majority or minority (herein referred to as M-gates), fan-in constraints of the M-gates, fan-out constraints of the M-gates, PPA objectives, preference of majority or minority gates, etc. Given these inputs that describe a circuit or logic circuit, the CAD tool separates out the circuit into combinational logic component or circuit and sequential logic component or circuit.

For the combinational logic synthesis, the CAD tool breaks the circuit down into different blocks informed by the high-level design and optimizes and synthesizes each block separately, in accordance with some embodiments. Various embodiments use multiple ways to optimize the combinational logic using MIG synthesis and optimization including mapping portions of the optimized MIG to standard cells. The majority or minority gates here can be ferroelectric capacitor-based majority or minority gates, in accordance with some embodiments. However, the embodiments are not limited to ferroelectric capacitors-based majority or minority gates, and any technology used for making majority or minority gates are applicable here.

Majority or minority gate is a universal gate and could be used to build all types of standard cells and building blocks. Depending upon a logic function, majority or minority gates (M-gates) based synthesis may also provide smaller overall gate count. The CAD tool of some embodiments use M-gates to optimize PPA in at least two ways. One way is to use M-gates as fundamental gates to replace any type of existing gate with 1:1 mapping if advantageous. Another way is to use these gates to reduce the number of gate counts wherever possible. For M-gate based synthesis, in one technique, majority gate is a basic building block and inverters are introduced to build minority gates as needed and also sometimes buffers and/or inverters are introduced to provide higher fan-outs for the circuits.

In some embodiments, the scheme unfolds feedback loops in a sequential logic resulting in a combinational logic, and applies logic synthesis techniques to produce a few candidate solutions. For example, the CAD tool synthesizes sequential circuits by transforming them into combinational logic via unfolding loops and synthesizing the resultant combinational logic, and recreating the loops afterwards. Among the various synthesized versions of the sequential circuits, the CAD tool goes through each solution (e.g., each synthesized circuit in this context) and checks their functionality to avoid any race conditions and returns the most optimal functional solution.

The scheme of various embodiments uses wide-input majority or minority (herein referred to as M-gates) in combination with CMOS gates. This leads to fewer gates and a smaller logic depth. In some embodiments, inverter minimization is performed as a post-processing activity following M-gate optimization, which does not change the number of M-gates or the logic depth. For example, the CAD tool of various embodiments minimizes the number of inverters in the circuit or along a critical timing path. In some embodiments, the CAD tool accounts for design feedback that involves adding extra CMOS buffers or inverters to drive a large fan-out (or load). Together, various mechanisms of the scheme provide an improved PPA over the known scheme of logic synthesis.

The CAD tool of various embodiments has the capability to synthesize both combinational and sequential FUBs. In some embodiments, the CAD tool applies a gate pruning algorithm to facilitate both single and multiple fan-in M-gate synthesis. Some embodiments use extended satisfiability (SAT) formulation to use both majority and minority gates and wide-input M-gates. In some embodiments, the CAD tool uses binary integer linear programming (BIP) framework for logic optimization of a MIG. As such, a specialized framework is established where threshold gate weights are −1, 0, and 1, which allows for the creation of optimal majority or minority inverter graphs. The BIP framework also allows for depth optimization to be explicitly captured in the program constraints. In some embodiments, the framework allows the use of either a single fan-in or multiple fan-in M-gates for synthesis. The CAD tool of some embodiments provides inverter minimization per block (e.g., standard cell or FUB), and thus provides enough boost within the block. For example, by reducing the number of inverters, power savings can be realized. In some embodiments, inverter minimization is performed as a post-synthesis step to reduce the total number of inverters in the block or along a critical timing path of the block. In some embodiments, fan-out constraints and requirements per M-gate are performed as a post-synthesis step by adding inverters and buffers, as needed, to drive a higher fan-out. In some embodiments, hierarchical synthesis is performed to further optimize synthesized circuits by taking advantage of "don't care" input conditions in interior sub-blocks. In some embodiments, the CAD tool uses gate count initialization in optimal synthesis to accelerate the search for an optimal MIG.

There are many technical effects of the various embodiments. For example, the CAD tool of various embodiments can take majority or minority gates with a large fan-in (e.g., 3, 5, 7, or higher) input M-gates and standard cell library and produces optimal synthesized logic circuits. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

FIG. 1 illustrates top-level architecture 100 of a computer-aided design (CAD) tool for logic synthesis of a mix of CMOS gates and majority and minority logic gates of various fan-in and/or fan-out, in accordance with some embodiments. Architecture 100 comprises iterative wrapper 101 with logic synthesis core 101a, which is the nucleus of the CAD tool. In various embodiments, iterative wrapper 101 has access to a variety of cells to perform logic synthesis. These cells include standard CMOS cells 102, such as a CMOS-based inverter, NAND gate, NOR gate, XOR gate, flip-flop (FF), latch, multiplexer, complex gate including half-adder, multiplexer, etc. These CMOS cells can be part of a standard library for a particular process technology node. In some embodiments, iterative wrapper 101 has access to a standard library of majority gates 103 that have x fan-in and y fan-out, where 'x' is 3 or more, and where 'y' is 1 or more. In some embodiments, the majority gates comprise ferroelectric capacitors to receive 3 or more inputs, where the ferroelectric capacitors are coupled together at another end. In some embodiments, the majority gates comprise non-ferroelectric input capacitors that receive 3 or more inputs, wherein the non-ferroelectric capacitors are coupled together at another end, which is coupled to a ferroelectric capacitor. In some embodiments, iterative wrapper 101 has access to a standard library of minority gates 104 that have 'x' fan-in and 'y' fan-out, where 'x' is 3 or more, and where 'y' is 1 or more. Minority gates 104 are essentially majority gates with an output inverter. The majority gate 103 and minority gate 104 can include basic cells like NAND gate, NOR gate, XOR gate, flip-flop (FF), adder, etc.

In some embodiments, iterative wrapper 101 receives inputs 105 representing a logic circuit that is to be synthesized. The inputs can be in a number of formats including hardware description language (HDL) such as Verilog or VHDL, netlist, graph of higher-level blocks, Boolean expressions, or truth tables. The inputs also include a list of narrow and/or wide-input majority or minority (herein referred to as M-gates), fan-in constraints of the M-gates, fan-out constraints of the M-gates, PPA objectives, preference of majority or minority gates, etc. Given these inputs that describe a circuit or logic circuit, the CAD tool separates out the circuit into combinational logic component (or circuit) and sequential logic component or circuit. The output of iterative wrapper 101 is synthesized circuit 106, which includes a mix of CMOS standard cells, majority and/or minority logic gates of various fan-in and fan-out to provide the most optimal circuit design for use in a processor or an integrated circuit (IC).

FIG. 2 illustrates flowchart 200 of a method of logic synthesis using majority or minority inverter graph (MIG) having majority and minority logic gates of various fan-in and/or fan-out and existing standard cells, in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs. Flowchart 200 provides a top-level view of the overall logic synthesis flow. Here, a logic synthesis scheme uses majority and/or minority inverter graph (MIG) and existing standard cells, which work for both sequential and combinational logic. The logic synthesis scheme allows wide (e.g., 3 or larger odd number) and multiple fan-in inputs (e.g., the optimized MIG can contain M-gates with varied number of inputs).

Block 201 are inputs representing a logic circuit that is to be synthesized using a mix of CMOS and majority and/or minority gates. The inputs can be in a number of formats including HDL such as Verilog or VHDL either describing the functionality or circuit connectivity, netlist of various gates (such as NAND, NOR, Minority, Majority, AND, OR), graph of higher-level blocks, Boolean expressions, or truth tables for the function. The inputs also include a list of narrow and/or wide-input majority or minority (herein referred to as M-gates), fan-in constraints of the M-gates, fan-out constraints of the M-gates, PPA objectives, preference of majority or minority gates, etc. Given these inputs that describe a circuit or logic circuit, the CAD tool separates out the circuit into combinational logic component (or circuit) and sequential logic component or circuit.

At block 202, the CAD tool identifies the inputs of the logic, state elements (e.g., latches and flip-flops), and outputs of the logic for segmentation from input 201. In some embodiments, the inputs and outputs of the logic function are assumed to require state elements such as flip-flops and latches. In some embodiments, big logic blocks are broken down and pipelining is implemented with intermediate state elements as needed to meet clocking and throughput requirements as indicated by block 203. This is done keeping the requirements of delay and energy of each component in consideration. In some embodiments, the breakdown with state elements may be performed during a post-processing phase depending upon the synthesized results and delay and energy constraints of the overall logic function unit. At block 203, the inputs, outputs, and state elements are classified as terminal nodes. The CAD tool then segments the logic circuit into sub-circuits with nodes (e.g., input and output ports). Each sub-circuit is combinational, in accordance with various embodiments. In various embodiments, the CAD tool creates a list of separate combinational circuits and sequential components or circuits, and initializes an empty synthesized list.

Once the combinational and sequential logic blocks are identified separately, specific synthesis flows for combinational and sequential logic blocks are used to optimize for the PPA requirements. The list of combinational circuits (or components) and sequential circuits (or components) is saved as indicated by block 204. At block 205, a determination is made whether the list of combinational circuits (or components) and sequential circuits (or components) is exhausted. This check is made to go through each circuit in the list and classify it as combinational circuit or sequential circuit. If the list is not exhausted, the process proceeds to block 206 where the current circuit is assigned as the next circuit in the list, and then that circuit is analyzed at block 207 to determine whether it is combinational.

In a circuit without state elements or with only input and output registers, a region between the inputs and outputs comprises combinational circuit(s). In a pipelined circuit, the region between consecutive pipeline registers comprises combinational circuit(s). By defining inputs, outputs, and state elements as terminal nodes, the circuit can be segmented into sub-circuits (or sub-graphs) with input and output terminals. The sub-circuits are combinational circuits, in accordance with various embodiments. For combinational circuits, combinational circuit synthesis is applied at block 208. For circuits identified as sequential circuits (e.g., because they have a feedback loop), sequential component synthesis is applied at block 209. The synthesized circuits from block 208 and block 209 are added to a list of synthesized circuits as indicated by block 210.

The process then proceeds to block 205, where it is determined whether the list of circuits is exhausted. If not, the process continues iteratively as discussed herein. If the list of circuits is exhausted, the process proceeds to block 211. At block 211, circuits in the list of synthesized circuits are wired using input and output terminals of the original logic circuit that is read from inputs 201. The resultant output after wiring the circuits in the list of synthesized circuits is the synthesized circuit of the original logic circuit, as indicated by block 212. The processes for combinational circuit synthesis of block 208 and sequential circuit synthesis of block 209 are discussed with reference to subsequent figures herein, in accordance with some embodiments.

Figure 3:
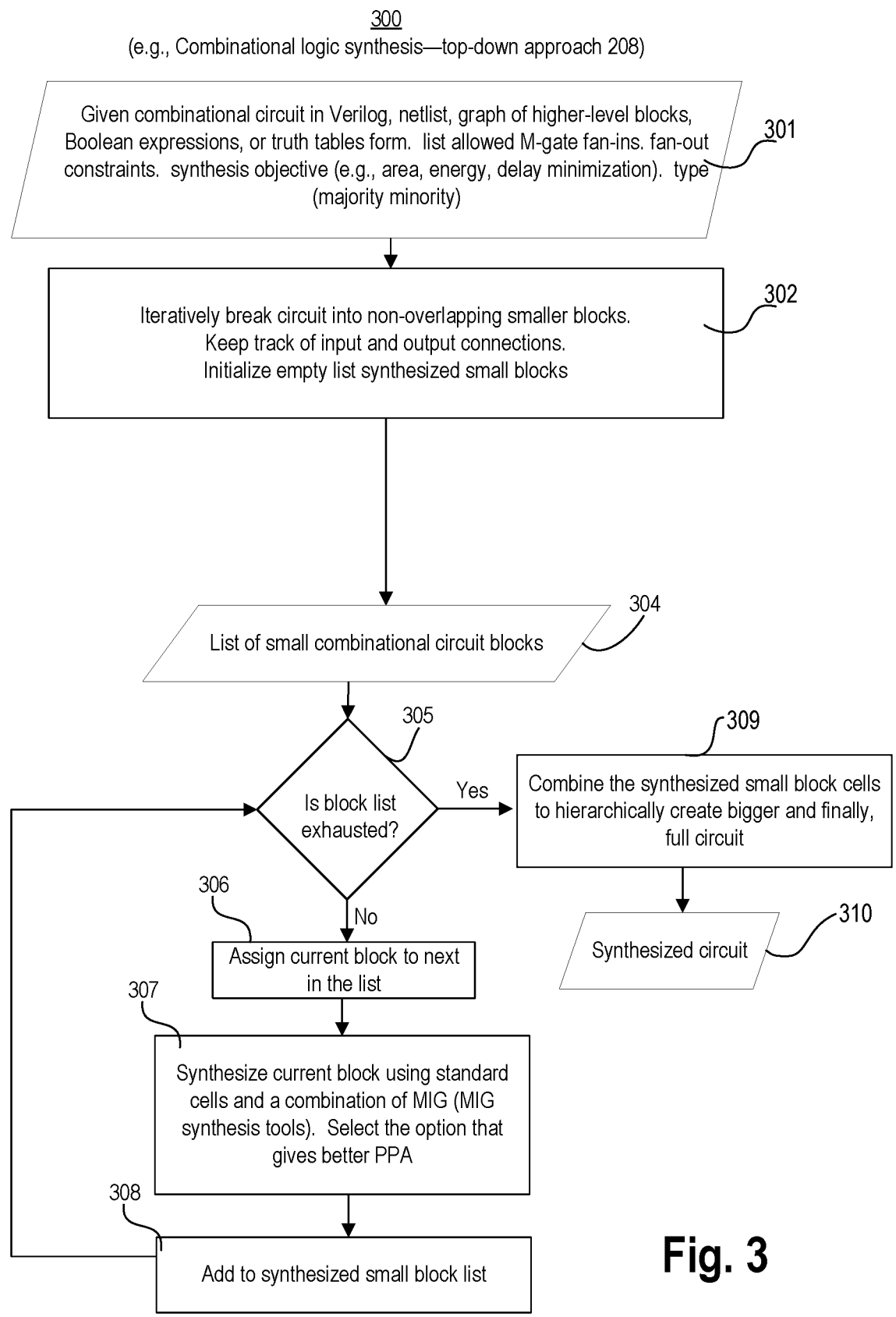
FIG. 3 illustrates a flowchart of a method for combinational logic synthesis using a top-down approach, in accordance with some embodiments.

FIG. 3 illustrates flowchart 300 of a method for combinational logic synthesis (e.g., block 208) using a top-down approach, in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs. Flowchart 300 illustrates a method that breaks down logic function into small sub-circuits, performs logic synthesis with those, and then combines them to produce the final results. Flowchart 300 can be used in isolation (e.g., independently) or part of flowchart 200 to optimize a combinational circuit.

Flowchart 300 begins with inputs for a combinational circuit as indicated by block 301. The inputs can be in a number of formats including HDL such as Verilog or VHDL either describing the functionality or circuit connectivity of the combinational circuit, netlist of various gates (such as NAND, NOR, Minority, Majority, AND, OR), graph of higher-level blocks, Boolean expressions, or truth tables for the function. The inputs also include a list narrow and/or wide-input majority or minority (herein referred to as M-gates), fan-in constraints of the M-gates, fan-out constraints of the M-gates, PPA objectives, preference of majority or minority gates, etc. At block 302, the CAD tool (e.g., iterative wrapper 101) iteratively breaks the combinational circuit into non-overlapping smaller blocks. For example, the combinational circuit is segmented into non-overlapping smaller blocks until the blocks are small enough to be synthesized by either using only standard cells or the MIG cells from the MIG synthesis tool. The MIG synthesis tool mixes standard cells and MIG cells. At block 302, the CAD tool also keeps track of input and output connections of the smaller blocks. In some embodiments, the CAD tool initializes the empty list of synthesized small blocks. Here, initializing generally refers to creating an empty list that is used to store synthesized circuits. Here, small blocks generally refer to sub-circuits with a maximum of K inputs, where K is 5 or 6.

The output of block 302 is a list of small combinational circuit blocks indicated by block 304. This list of these small combinational circuit blocks is then iteratively processed, and the best synthesized sub-circuit or block is then selected based on PPA to be the cell for the small block. This process is indicated by blocks 305, 306, and 307. At block 305, the CAD tool determines whether the list of small combinational circuit blocks is exhausted (e.g., whether all small blocks in the list are processed). As each block is processed in the list, the current block is assigned to the next block in the list so that the next block is processed as indicated by block 306. This process continues till all blocks in the list 304 are processed. At block 307, the current block is synthesized using standard cells and/or a combination of standard cells and MIG cells using MIG synthesis tools. The standard cell set also comprises circuit representation of bigger building blocks such as adders and multipliers. In some embodiments, the synthesis results are compared with synthesized blocks that implement the same functionality, and the best circuit is chosen based on PPA constraints. In one example, if there is an off-the-shelf CMOS synthesis tool available, its synthesis of the small block can be compared to the MIG synthesis tools' result and the better circuit is selected based on PPA constraints, since M-gates here are compatible with CMOS logic gates. The synthesized block that gives the best PPA (e.g., that meets the PPA objectives as close as possible) is then selected and added to a list of synthesized small block list(s) as indicated by block 308.

The process then proceeds to block 305 and the next circuit block becomes the current block, and the process is repeated and the list of synthesized small blocks is filled. When the entire list of small combinational circuit blocks (block 304) is processed (or exhausted, the process proceeds to block 309. At block 309, the synthesized small block cells in the list of synthesized small blocks are combined to hierarchically create bigger cells and finally the full combinational circuit. For example, the small synthesized block cells are rolled-up to represent the full synthesized combinational circuit 310.

Figure 4:
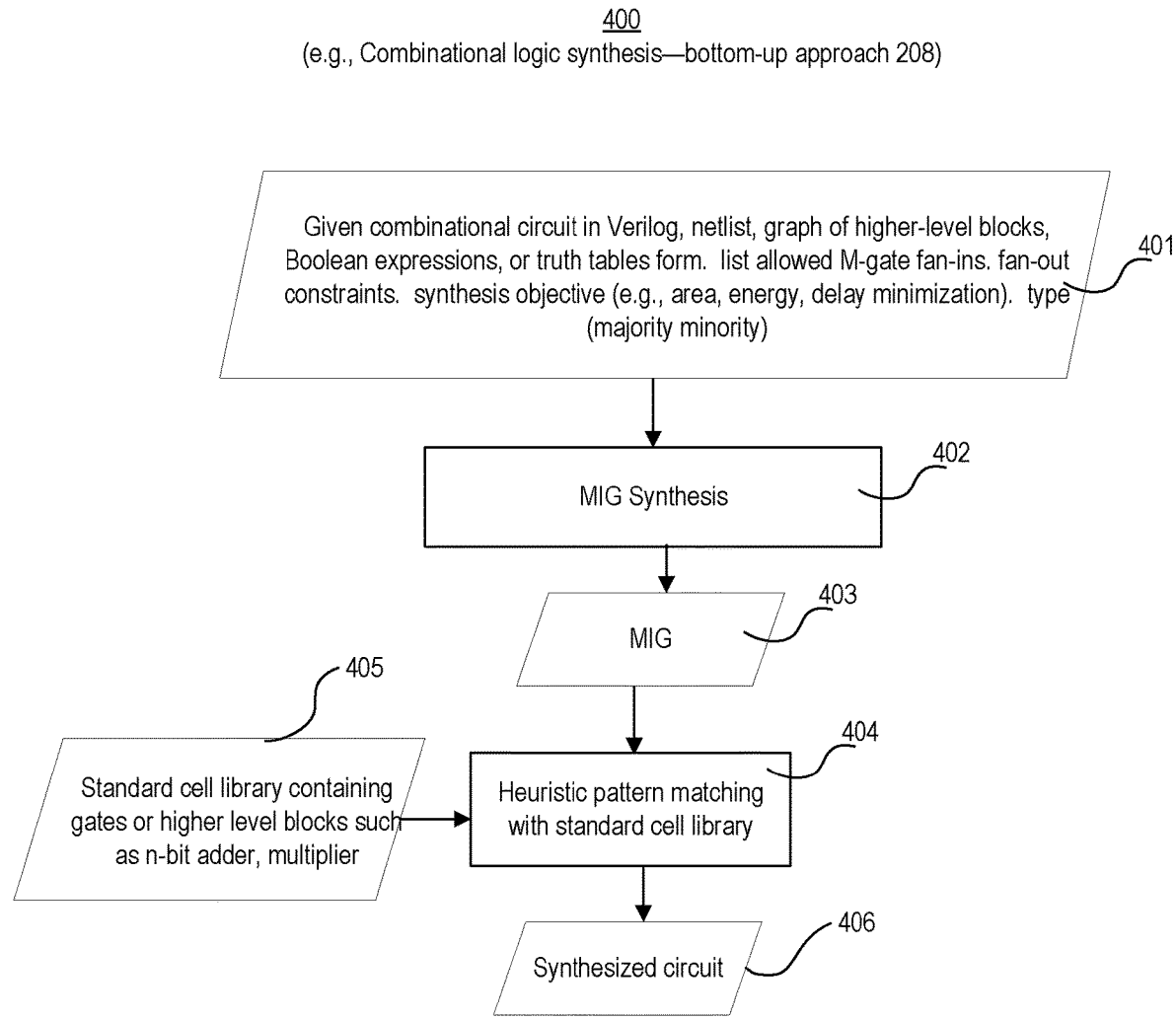
FIG. 4 illustrates a flowchart of a method for combinational logic synthesis using a bottom-up approach, in accordance with some embodiments.

FIG. 4 illustrates flowchart 400 of a method for combinational logic synthesis (e.g., block 208) using a bottom-up approach, in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs. Flowchart 400 illustrates a method that, unlike the top-down approach of FIG. 3, may not use separation of a combinational circuit into non-overlapping subblocks prior to MIG synthesis. Rather, the entire combinational circuit is passed to the MIG synthesis tool which transforms the circuit into a majority and/or minority inverter graph (MIG) and then optimizes the graph based on the PPA requirement. After MIG optimization, subgraphs of the optimized MIG graph are functionally mapped to building block cells with the best PPA, where the building block cells can be based on existing standard cells or a combination of existing standard cells and MIG cells. In flowchart 400, the full logic function is synthesized and pattern matching is used to map sections of the MIG to standard cells. Flowchart 400 can be used in isolation (e.g., independently) or part of flowchart 200 to optimize a combinational circuit.

Flowchart 400 begins with inputs for combinational circuit as indicated by block 401. The inputs can be in a number of formats including HDL such as Verilog or VHDL either describing the functionality or circuit connectivity of the combination circuit, netlist of various gates (such as NAND, NOR, Minority, Majority, AND, OR), graph of higher-level blocks, Boolean expressions, or truth tables for the function. The inputs also include a list narrow and/or wide-input majority or minority (herein referred to as M-gates), fan-in constraints of the M-gates, fan-out constraints of the M-gates, PPA objectives, preference of majority or minority gates, etc.

At block 402, the CAD tool performs MIG synthesis. In some embodiments, the MIG synthesis scheme assumes that the logic circuit can be synthesized using a feed-forward network of M-gates and inverters. Majority gate followed by one inverter is equivalent to a minority gate. Minority gates could be made as a fundamental building block. A minority gate with one input is an inverter. Such a network of gates is equivalent to a directed acyclic graph (DAG). MIG synthesis relies on the logic initialization, hierarchical synthesis, optimal synthesis, inverter minimization, and post synthesis algorithms. In various embodiments, MIG synthesis is a flexible algorithm that allows the use of majority and/or minority gates (M-gates), wide-input and single and/or multiple fan-in M-gates. The output of MIG synthesis is a MIG as indicated by block 403.

At block 404, the CAD tool applies heuristic pattern matching with standard cell library. Heuristic pattern matching comprises mapping sections of the MIG to standard cells. The standard cell library comprises gates or higher-level blocks such as n-bit adder, n-bit multiplier, multiplexers, decoders, etc. as indicated by block 405. These standard cell library gates or higher-level blocks are input to the heuristic pattern matching scheme of block 404. The output of the heuristic pattern matching scheme is the synthesized combinational circuit as indicated by block 406.

Figure 5:
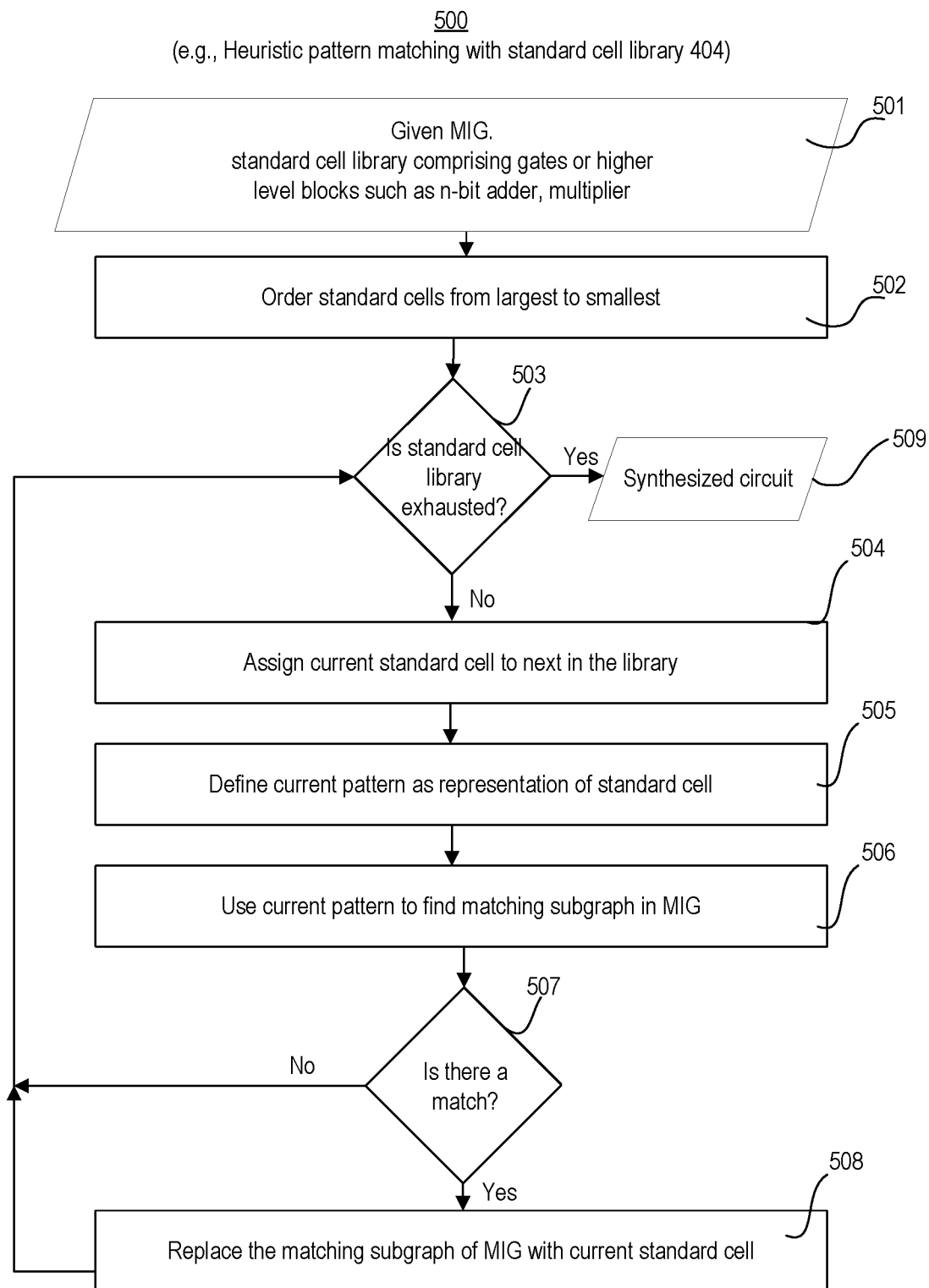
FIG. 5 illustrates a flowchart of a method for heuristic pattern matching with standard cell library, in accordance with some embodiments.

FIG. 5 illustrates flowchart 500 of a method for heuristic pattern matching (e.g., block 404) with standard cell library, in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs. Flowchart 500 illustrates a method of heuristic pattern matching with standard cell library. Here, a pattern-matching heuristic is used in the bottom-up approach of FIG. 4 for mapping sections of the MIG to standard cells. Flowchart 500 shows one heuristic for solving the problem, by ordering the cells in the cell library in descending order of size (e.g., number of input and output ports), selecting one cell at a time until the library is exhausted, and functionally matching the selected cell to portions of the MIG.

Flowchart 500 begins with block 501 (e.g., MIG block 403). Block 501 includes MIG input, standard cell library comprising gates and/or higher-level blocks such as n-bit adder, n-bit multiplier, etc. At block 502, the CAD tool orders the standard cells according to size from largest to smallest. A person skilled in the art would appreciate that order of cells can be flipped. For example, the cells can be ordered from a smallest size to a largest size instead. The size may be determined by a total device count and/or total device size per cell. In some embodiments, the size may be determined by a layout footprint of the cell. The ordered list of standard cells is then iteratively processed for a match. This iterative process comprises blocks 503, 504, 505, 506, 507, and 508, that adapt a greedy algorithm.

At block 503, a determination is made regarding whether the ordered cells of the standard cell library are exhausted. In the beginning of the process, the library is not exhausted, and the process proceeds to block 504, where the current standard cell is assigned the next (e.g., the first) standard cell in the ordered list. One by one, each cell in the list is traversed. At block 505, a current pattern is used as a representation for the current standard cell in the ordered list. The current pattern comprises of characteristics of a subgraph of a MIG. The characteristics can be a set of truth tables. From the set of truth tables, the number of inputs, the number of outputs, and the functionality can be easily extracted. The characteristics could also be the Boolean formulas for the outputs, in accordance with some embodiments. At block 506, the CAD tool uses the current pattern to find a matching subgraph in MIG. A determination is made regarding the match at block 507. If the current pattern matches the subgraph in the MIG, the process proceeds to block 508 where the matching subgraph of the MIG is replaced with the current standard cell. The process then proceeds to block 503 and repeated till the entire list of ordered cells is exhausted with this matching process. If the current pattern does not match the subgraph in the MIG, the process proceeds to block 503. After all the ordered list of cells is exhausted, the final MIG represents the synthesized combinational circuit 509.

Figure 6:
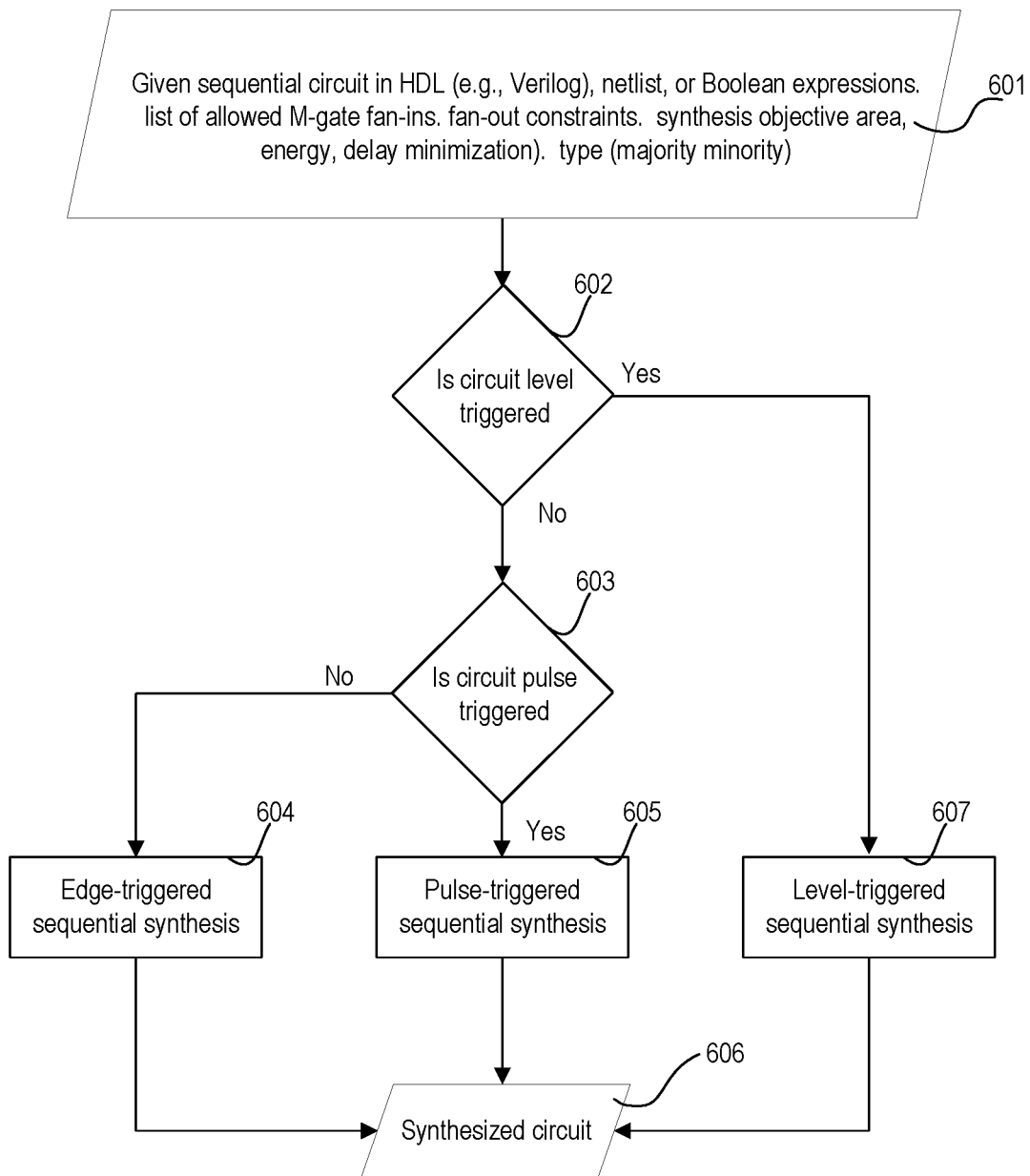
FIG. 6 illustrates a high-level flowchart of sequential logic synthesis, in accordance with some embodiments.

FIG. 6 illustrates high-level flowchart 600 of sequential logic synthesis (e.g., block 209), in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs. Flowchart 600 illustrates a method where the sequential circuit is analyzed and synthesized according to its classification. If a feedback loop is found in a circuit of a logic block to be synthesized, the circuit may be a sequential circuit. Depending on the circuits' response to a clock, the sequential circuit can be edge-triggered, pulse-triggered, or level-triggered. For each type of sequential circuit classification, a particular synthesis process is used. Flowchart 600 can be used in isolation (e.g., independently) or part of flowchart 200 to optimize a sequential circuit.

Flowchart 600 starts with the description of the sequential circuit. The description is provided as inputs 601. The inputs can be in a number of formats including HDL such as Verilog or VHDL either describing the functionality or circuit connectivity of the combination circuit, netlist of various gates (such as NAND, NOR, Minority, Majority, AND, OR), graph of higher-level blocks, Boolean expressions, or truth tables for the function. The inputs also include a list narrow and/or wide-input majority or minority (herein referred to as M-gates), fan-in constraints of the M-gates, fan-out constraints of the M-gates, PPA objectives, preference of majority or minority gates, etc. In one example, the inputs for the sequential circuits are specified as netlist or Boolean expressions. Any tool that can convert an input description (e.g., HDL) into a netlist can be used as input for flowchart 600, in accordance with some embodiments. One reason for using netlists and Boolean expressions is that standard truth tables and graph of higher-level blocks may not capture and reveal the feedback loop in the sequential circuit, respectively.

At block 602, the CAD tool determines whether the sequential circuit is level-triggered. Examples of level-triggered sequential circuits are latches. The latches can be level-high or level-low latches. If the sequential circuit is level-triggered the process proceeds to block 607 for level-triggered sequential synthesis. If the circuit is not level-triggered, the process proceeds to block 603 where a determination is made regarding whether the circuit is pulse-triggered. If the sequential circuit is pulse-triggered, the process proceeds to block 605 where pulse-triggered sequential synthesis is performed. Examples of pulse-triggered sequential include back-to-back coupled latches configured as a D-flip-flop (D-FF), where each latch is controlled by a different clock (e.g., a clock and an inverse of the clock). If the sequential circuit is not pulse-triggered, it is expected to be edge-triggered. In that case, the CAD tool performs edge-triggered sequential synthesis. Examples of edge-triggered sequential circuits are rising-edge D-FF and falling-edge D-FF. The sequential circuits can have scan gadgets for debug or design-for-test (DFT). The output of edge-triggered sequential synthesis 604, pulse-triggered sequential synthesis 605, or level-triggered sequential synthesis is a synthesized sequential circuit 606.

Figure 7:
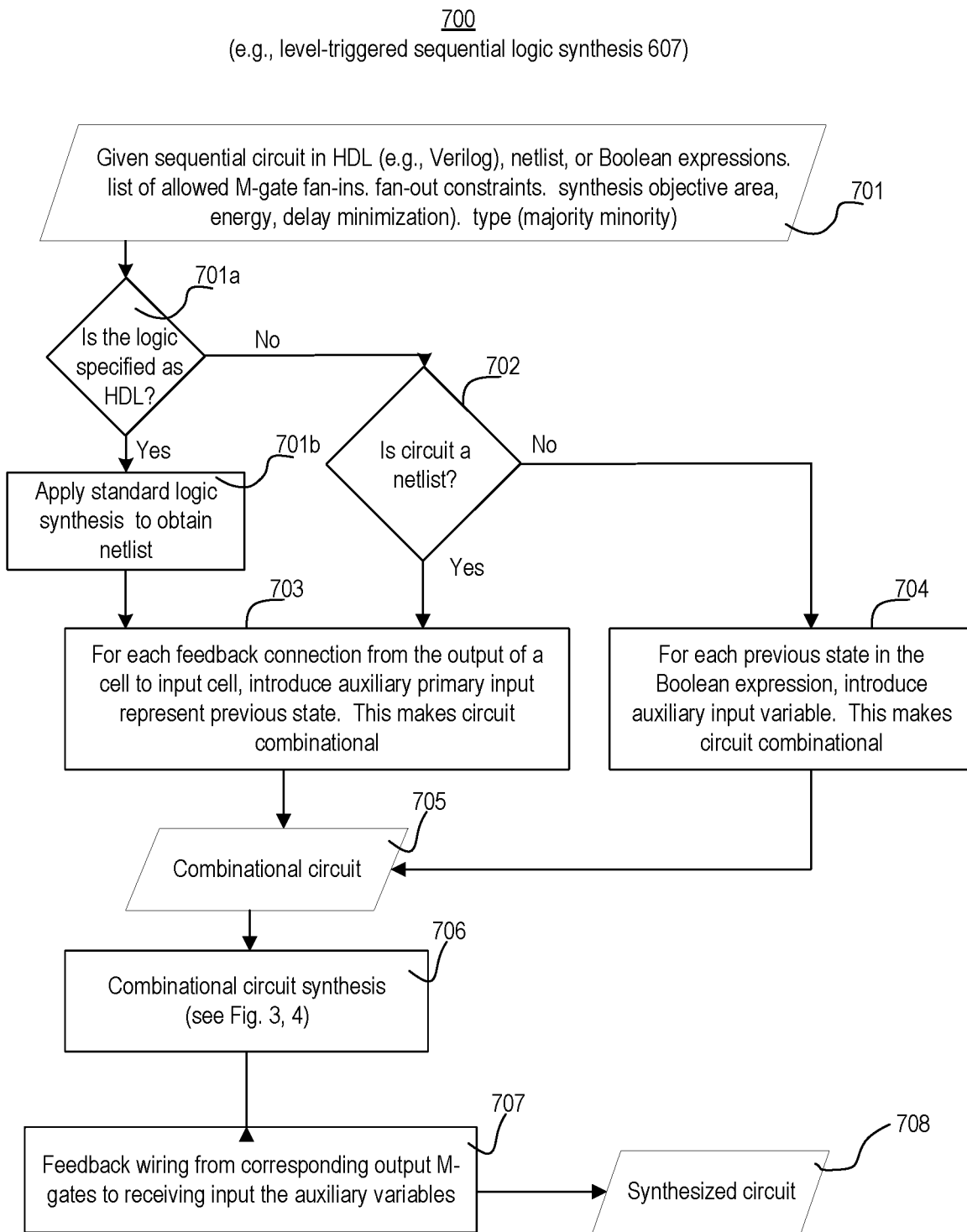
FIG. 7 illustrates a flowchart of a method of level-triggered sequential logic synthesis, in accordance with some embodiments.

FIG. 7 illustrates flowchart 700 of a method of level-triggered sequential logic synthesis (e.g., block 607), in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs. Flowchart 700 provides an optimal way of synthesizing level-sensitive sequential components such as latches.

Flowchart 700 begins with sequential circuit input 701. The inputs can be in a number of formats including HDL such as Verilog or VHDL either describing the functionality or circuit connectivity of the combination circuit, netlist of various gates (such as NAND, NOR, Minority, Majority, AND, OR), graph of higher-level blocks, Boolean expressions, or truth tables for the function. The inputs also include a list narrow and/or wide-input majority or minority (herein referred to as M-gates), fan-in constraints of the M-gates, fan-out constraints of the M-gates, PPA objectives, preference of majority or minority gates, etc. In one example, the inputs for the sequential circuits are specified as a netlist or Boolean expressions. Any tool that can convert an input description (e.g., HDL) into a netlist can be used as input for flowchart 600, in accordance with some embodiments. One reason for using netlists and Boolean expressions is that standard truth tables and graph of higher-level blocks may not capture and reveal the feedback loop in the sequential circuit, respectively.

At block 701a, the CAD tool determines whether the logic defined as part of input 701 is specified as HDL (e.g., Verilog). If the logic is specified as an HDL, then at block 701b, the CAD tool applies logic synthesis on the HDL to obtain a netlist. Any suitable logic synthesis tool may be used (e.g., commercially available logic synthesis tools may be used). If the logic is not specified as an HDL, then at block 702, the CAD tool determines whether the sequential circuit is described by a netlist. If the sequential circuit is described as a netlist, the process proceeds to block 703. At block 703, for each feedback connection from the output of a cell to the input of a cell, an auxiliary primary input is introduced to represent a previous output state. This makes the circuit a combinational circuit, as indicated by block 705. If the sequential circuit is not a netlist, then for each previous state in the Boolean expression, an auxiliary input variable is introduced. One reason for adding the auxiliary input is to convert a directed cyclic graph to a directed acyclic graph (DAG) in MIG synthesis, which assumes the input graph to be DAG. The auxiliary input is an additional input variable or loop variable to represent a previous value of the output. As such, the auxiliary input effectively breaks a loop in the graph turning it into a combinational circuit as indicated by block 705. At block 706, combinational circuit synthesis is performed on the combinational circuit as described with reference to FIG. 3 and FIG. 4. At block 707, post combinational circuit synthesis is performed. In some embodiments, during post combinational circuit synthesis, the loop variables are replaced by connections from the output(s) to the gates, which receive input from the loop variables. For example, feedback wiring, from corresponding output M-gates to M-gates receiving input from the axillary input variables, are made. The resultant output is a synthesized circuit 708. If the sequential circuit is not described as a netlist, the process proceeds to block 704. At block 704, the CAD tool introduces an auxiliary input variable for each previous state in the Boolean expression. This makes a combinational circuit as indicated by block 705.

Figure 8:
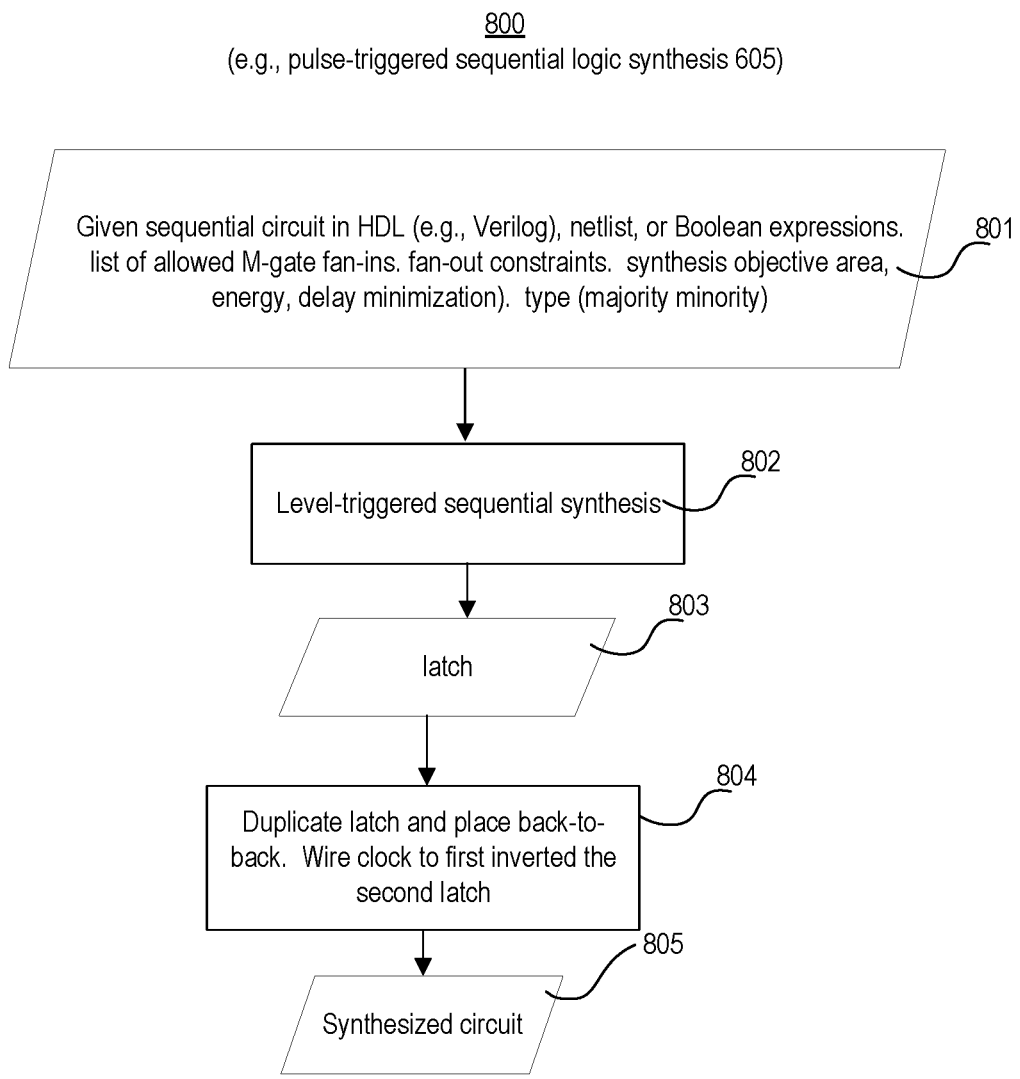
FIG. 8 illustrates a flowchart of a method of a pulse-triggered sequential logic synthesis, in accordance with some embodiments.

FIG. 8 illustrates flowchart 800 of a method of a pulse-triggered sequential logic synthesis, in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs. Flowchart 800 provides an optimal way of synthesizing pulse-triggered sequential components such as D-FFs. In a pulse-triggered sequential circuit, there are back-to-back latches (e.g., first latch coupled to a second latch) with data passing into a first latch on a high or low clock level and from the first to a second latch on a corresponding low or high clock level). In a pulse-triggered circuit, the clock signal is inverted for the second latch relative to the first latch.

Flowchart 800 begins with sequential circuit input 801. The inputs can be in in a number of formats including HDL such as Verilog or VHDL either describing the functionality or circuit connectivity of the combinational circuit, netlist of various gates (such as NAND, NOR, Minority, Majority, AND, OR), graph of higher-level blocks, Boolean expressions, or truth tables for the function. The inputs include a list of narrow and/or wide-input majority or minority (herein referred to as M-gates), fan-in constraints of the M-gates, fan-out constraints of the M-gates, PPA objectives, preference of majority or minority gates, etc. In one example, the inputs for the sequential circuits are specified as a netlist or Boolean expressions. Any tool that can convert an input description (e.g., HDL) into a netlist can be used as input for flowchart 600, in accordance with some embodiments. One reason for using netlists and Boolean expressions is that standard truth tables and graph(s) of higher-level blocks may not capture and reveal the feedback loop in the sequential circuit, respectively.

For each latch of the back-to-back latches, the CAD tool performs level-triggered sequential synthesis as described with reference to FIG. 8 and as indicated by block 802. The output of level-triggered sequential synthesis is a latch as indicated by block 803. At block 804, the synthesized latch is duplicated (e.g., a copy is made) and connected back-to-back with the synthesized latch (e.g., first latch) of block 803. Then, an inverted clock is provided to the duplicated latch (e.g., second latch) compared to the first latch. The resultant circuit is a synthesized pulse-triggered sequential circuit (e.g., a D-FF) as indicated by block 805.

Figure 9:
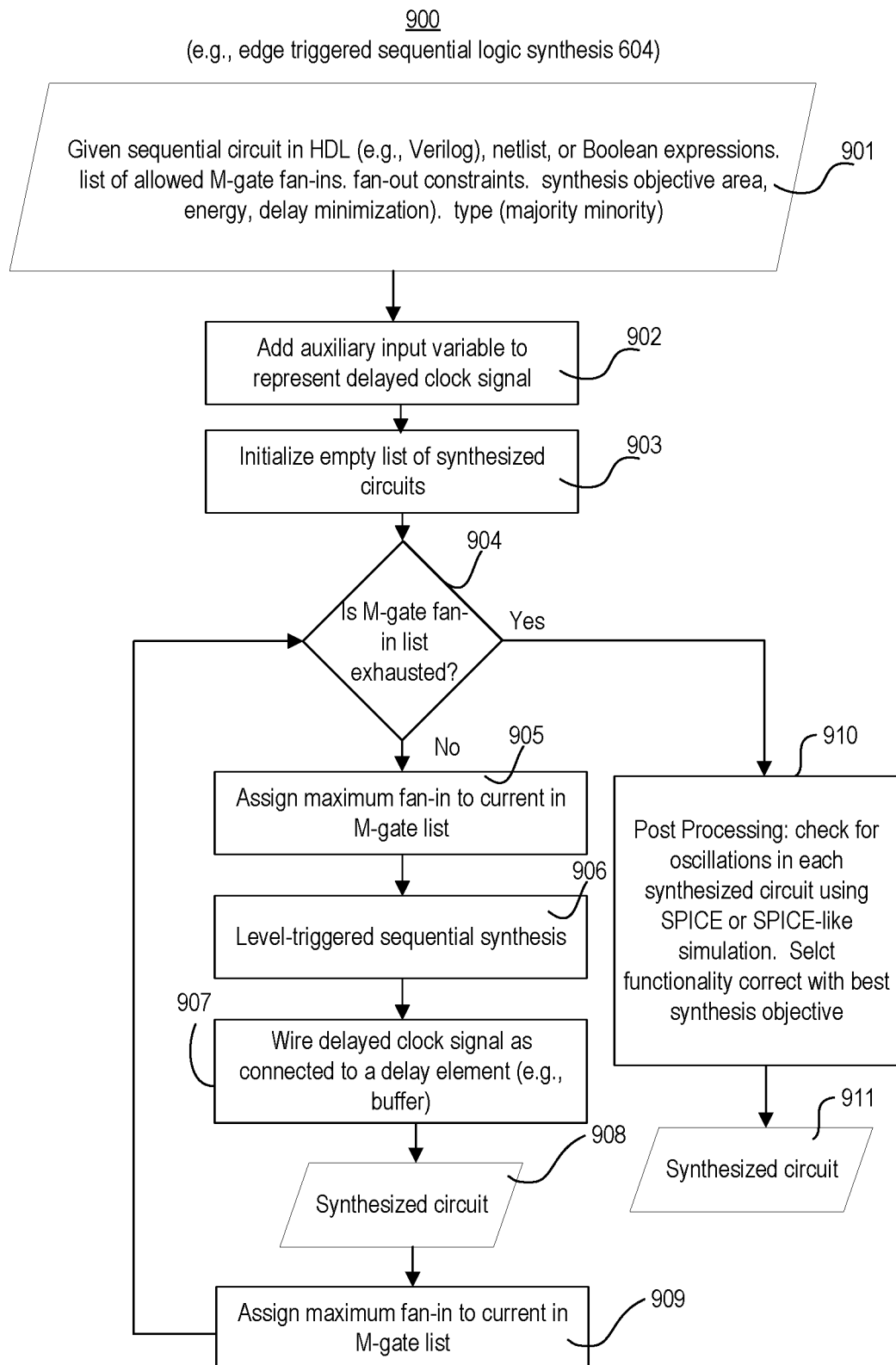
FIG. 9 illustrates a flowchart of a method of edge-triggered sequential logic synthesis, in accordance with some embodiments.

FIG. 9 illustrates flowchart 900 of a method of edge-triggered sequential logic synthesis, in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs. Flowchart 900 provides an optimal way of synthesizing edge-triggered sequential components such as rising-edge or falling-edge D flip-flops (D-FFs). In some embodiments, edge-triggering is accounted for by transforming to level-triggered. This transformation is done by introducing a new input variable that represents a delayed version of the clock. While some embodiments use unrolling technique for sequential circuits, it is possible that some of the synthesized results for edge-triggered circuits may contain a race condition which causes the output of the circuit to be unstable and continue to fluctuate. This happens because of the time dependence in sequential circuits from the previous clock cycle. To handle this problem, some embodiments generate multiple synthesis solutions with given PPAs. During a post-processing phase, in some embodiments, each of the circuit solutions is simulated for stability and the final result is selected based on correct functionality and according to the best PPA results.

Flowchart 900 begins with sequential circuit input 801. The inputs can be in a number of formats including HDL such as Verilog or VHDL either describing the functionality or circuit connectivity of the combinational circuit, netlist of various gates (such as NAND, NOR, Minority, Majority, AND, OR), graph of higher-level blocks, Boolean expressions, or truth tables for the function. The inputs also include a list narrow and/or wide-input majority or minority (herein referred to as M-gates), fan-in constraints of the M-gates, fan-out constraints of the M-gates, PPA objectives, preference of majority or minority gates, etc.

At block 902, CAD tool adds an auxiliary input variable to represent a delayed clock signal. The delayed clock signal is used to capture the concept of an edge. For example, clock (clk) and delayed clock (dclk) are used to capture an edge of an input data. Here, clk and dclk are used to capture the clock edge (transition from low to high or from high to low). Starting at time t=0, assume clk is low for an interval of T/2, high for an interval of T/2, and then low for another T/2 interval. Assume a delay of τ. dclk(t)=clk(t−τ) will be high at t=0 for an interval of τ. Then it will be low for an interval of T/2, high for an interval of T/2, and then low for another T/2 interval. Consider the first rising edge, when t=T/2. During the hold time, right after the edge, clk will be high while dclk will be trailing it at a low signal. Here, (clk=high, dclk=low) represents a rising edge in the truth table. Consider the next edge, a falling edge, when t=T/2+T/2=T. During the hold time, right after the edge, clk will be low while dclk will be trailing it at a high signal. Here, (clk=low, dclk=high) represents a falling edge in the truth table.

At block 903, the CAD tool initializes an empty list of synthesized circuits. Here, initialize generally refers to start an empty list. Synthesized circuits will be added to the empty list later. The circuits correspond to different fan-ins and PPA. For example, a circuit can correspond to a fan-in list of [3, 5] and area or delay requirements. Synthesis is then performed using maximum fan-in of 3 with area requirement and with delay requirement. Then the CAD tool synthesizes using a maximum fan-in of 5 with area requirement and with delay requirement. This gives at most 4 synthesized circuits. For each of the 4 synthesized circuits, the CAD tool can also keep all the discarded circuits from inverter minimization. This gives a large number of circuits with the same M-gate connections but with majority and minority gates substituted and inverters added or removed.

In some embodiments, the M-gate fan-in list is processed until it is exhausted as indicated by block 904. Each fan-in is selected in turn to be the maximum allowed fan-in for edge-triggered sequential logic synthesis. The list of fan-ins allows the CAD tool to create candidate synthesized circuits, one (or more if all the discarded candidates of inverter minimization are considered) for each fan-in, since it is not known ahead of time if the synthesized circuit will be stable. At block 905, the maximum fan-in for synthesis is assigned to be the value of the current fan-in from the M-gate fan-in list. At block 906, level-triggered sequential synthesis is applied using the maximum M-gate fan-in. FIG. 7 illustrates a method for level-triggered sequential synthesis. The output of level-triggered sequential synthesis is then processed at block 907 where wire delayed clock (e.g., dclk) is connected as clock to a delay element (e.g., buffer). The resultant circuit is a synthesized circuit 908. At block 909, the synthesized circuit is added to the list of synthesized circuits, and the process is iteratively performed again with the next fan-in from the M-gate fan-in list, and so on till the entire list is exhausted as determined by block 904. Once the list is exhausted, the process proceeds to block 910, where post-processing is done to check for oscillations in each of the M-gate.

The post-processing can be done using any suitable circuit simulator such as SPICE or its derivative (e.g., SPICE-like) simulators. One reason for such possible oscillations is that some of the synthesized MIGs for edge-triggered circuits may contain a race condition which causes the output of the circuit to be unstable and continue to fluctuate. This happens because of the time dependence in sequential circuits from the previous clock cycle. During block 910, the edge-triggered circuit obtained at block 908 is checked for stability and the final edge-triggered circuit is selected based on correct functionality and according to the best PPA results (or target results). The resultant final edge-triggered circuit is the synthesized edge-triggered circuit as indicated by block 911.

Figure 10A:
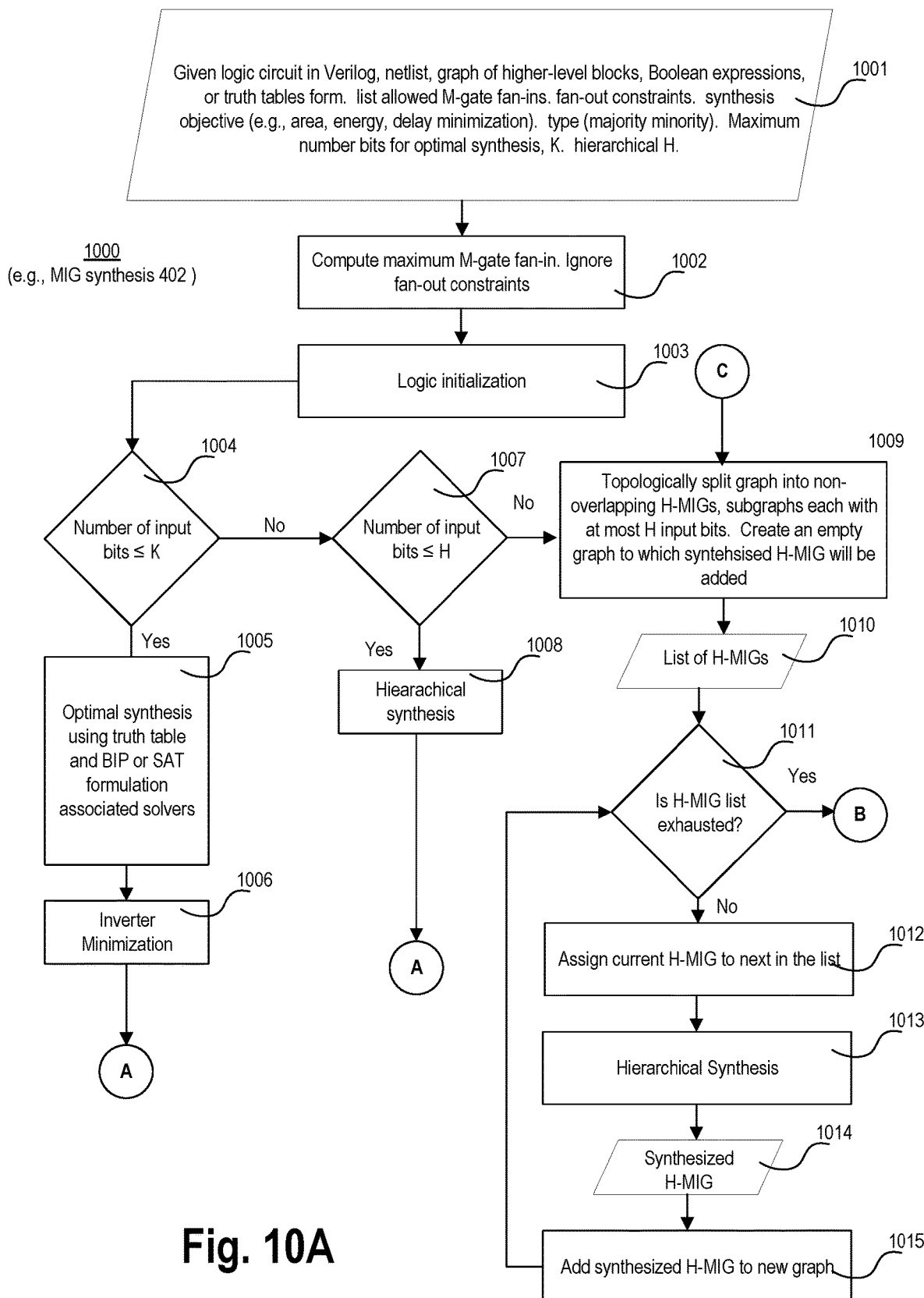
FIGS. 10A-B illustrate a flowchart of a method of MIG synthesis, in accordance with some embodiments.
Figure 10B:
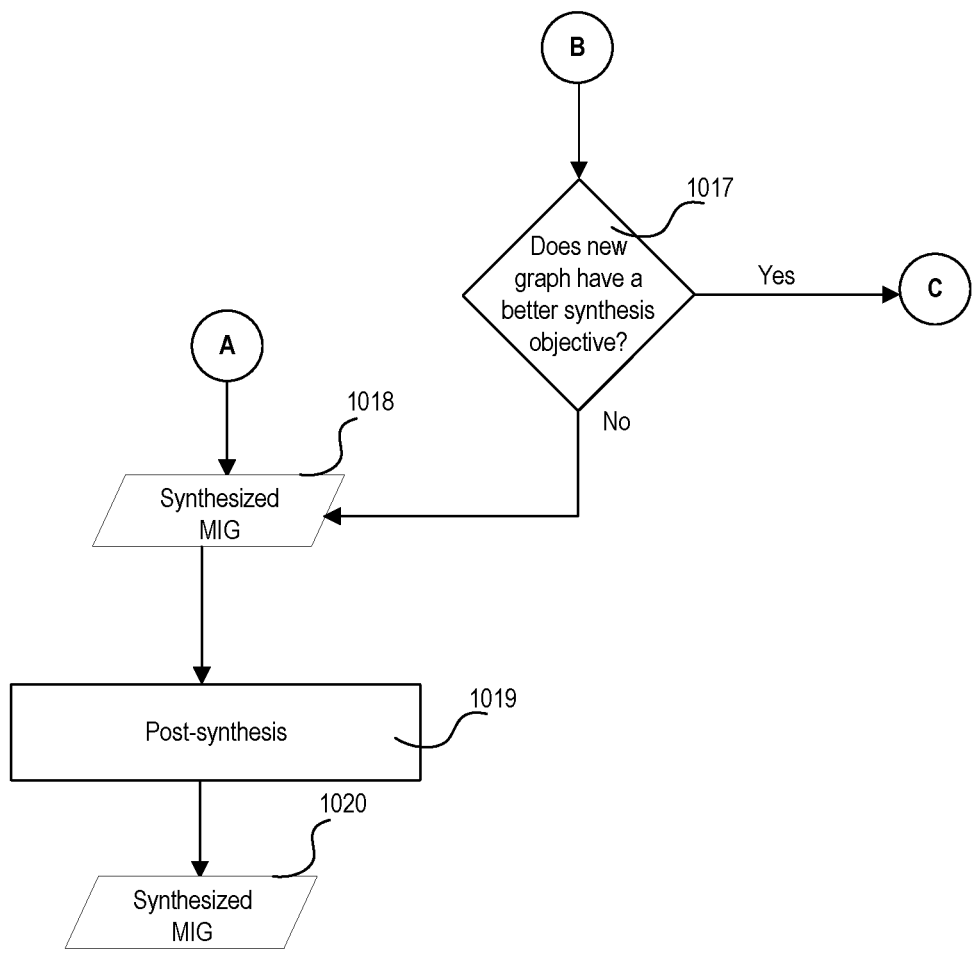

FIGS. 10A-B illustrate flowcharts 1000 and 1030, respectively, of a method of MIG synthesis, in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs. Flowcharts 1000 and 1030 comprises MIG optimization algorithms including initialization, hierarchical synthesis, optimal synthesis, and other synthesis algorithms built on top of MIGs.

The algorithm is a flexible algorithm that allows the use of majority and/or minority gates (M-gates), wide-input and single/multiple fan-in M-gates. Flowcharts 1000 and 1030 form the basis of block 402 of FIG. 4. The MIG synthesis algorithm of flowcharts 1000 and 1030 assume that the logic circuit can be synthesized using a feed-forward network of M-gates and inverters. As discussed herein, majority gate followed by one inverter is equivalent to a minority gate. Minority gates could be made as a fundamental building block. A minority gate with one input is an inverter. Such a network of gates is equivalent to a DAG.

Flowchart 1000 begins with a logic circuit input 1001. The input(s) can be in in a number of formats including HDL such as Verilog or VHDL either describing the functionality or circuit connectivity of the combination circuit, netlist of various gates (such as NAND, NOR, Minority, Majority, AND, OR), graph of higher-level blocks, Boolean expressions, or truth tables for the function. The inputs also include a list narrow and/or wide-input majority or minority (herein referred to as M-gates), fan-in constraints of the M-gates, fan-out constraints of the M-gates, PPA objectives, preference of majority or minority gates, maximum number of bits for optimal synthesis, K, and/or maximum number of bits for hierarchical synthesis, H, etc.

At block 1002, the CAD tool computes a maximum M-gate fan-in, and ignores fan-out constraints. A user specifies whether they want majority or minority gates as the basic building blocks. The number of inputs to the M-gate (aka fan-in), are also to be specified. This could be a list of a single or multiple fan-ins. Each fan-in is an odd number. The user also needs to specify whether the primary objective is area, energy, or delay minimization. This choice determines which heuristic is used in splitting the graph into subgraphs and the scoring of the current optimized graph, in accordance with various embodiments.

At block 1003, the CAD tool performs the process of logic initialization. Logic initialization is described with reference to FIG. 11. In various embodiments, the input circuit from input 1001 is transformed by the logic initialization flow into a form that can be easily optimized using optimal or hierarchical synthesis.

At block 1004, a determination is made whether the number of input bits is less than or equal to K. K is a small number such as in {4, 5, 6}. In some embodiments, K is less than or equal to 10. K represents the maximum bit width for which an optimal MIG can be found in a reasonable amount of time. If the number of input bits is less than or equal to K, the process proceeds to block 1005 where the logic circuit is synthesized optimally rather than using heuristics. Examples of methods for optimal synthesis are binary integer programming (BIP), or satisfiability (SAT) formulation and associated solvers. The optimal synthesis output is then processed for inverter minimization at block 1006. The process then proceeds to block 1018, as indicated by transition letter A, which indicates the resultant synthesized MIG. At block 1019, after the MIG optimization, each M-gate is pruned to have the desired fan-in using a gate pruning algorithm. During post-synthesis, the fan-out requirements are honored using the buffering algorithm which introduces inverters and buffers as needed. The resultant circuit is synthesized MIG as indicated by block 1020. In some embodiments, MIG synthesis ignores fan-out requirements during MIG optimization. In some embodiments, fan-out requirements are observed during the post-synthesis flow by a buffering algorithm.

If the number of input bits is greater than K, the process proceeds to block 1007. At block 1007, the number of input bits is compared with H. H is a larger number such as 20 or more. H represents the maximum bit width for which hierarchical synthesis can improve the optimality of the synthesized MIG. If the number of input bits is less than or equal to H, the process proceeds to block 1008 where hierarchical synthesis is performed. For example, when the number of input bits lies in (K, H], hierarchical synthesis is used. After hierarchical synthesis, the resultant circuit is synthesized MIG as indicated by block 1018.

When the number of input bits exceeds H, multiple independent hierarchical synthesis are performed and the results glued together as indicated by block 1009. At block 1009, the graph is topologically split into non-overlapping H-MIGs subgraphs, each with H input bits. These non-overlapping H-MIGs subgraphs are listed as H-MIGs in a list as indicated by block 1010. Each H-MIG is then processed till the list of H-MIG is exhausted, as indicated by decision block 1011. For that, the current H-MIG in the list is assigned the next H-MIG from the list at block 1012, and then hierarchical synthesis is performed on the current H-MIG as indicated by block 1013. The output of hierarchical synthesis is synthesized H-MIG (hierarchical MIG) as indicated by block 1014. The H-MIG is then added to a new graph at block 1015. This new graph is from a hierarchical synthesis flow of FIG. 26, in accordance with some embodiments. The process is then repeated iteratively for each H-MIG in the list of H-MIGs and synthesized H-MIGs are added to the new graph. Once all the H-MIGs are exhausted, the process proceeds to block 1017 as indicated by marker B. At block 1017, the CAD tool decides about whether the new graph has a better synthesis objective. Note, in block 1009, the CAD tool also creates an empty (new) graph to which each synthesized H-MIG will be added. After processing all the H-MIGs, there should be two graphs. These two graphs include the current graph (either the initialized MIG or the graph from the previous iteration of the outside loop) and the new graph. In some embodiments, the CAD tool compares the two graphs to tell us whether to continue improving or to stop. If the new graph has a better synthesis objective, the process proceeds to block 1009 as indicated by marker C. If the new graph does not have a better synthesis objective, then the process has the synthesized MIG as indicated by block 1018. In some embodiments, the current graph and the new graph, as discussed with reference to FIGS. 10A-B, can be compared by extracting the gate count (or area, if the layout footprint of M-gates and inverters is known) or the depth (or delay, if the propagation delay of M-gates and inverters is known) from the graphs. If the new graph has improved PPA, the optimization continues otherwise it is terminated, since achieving results better than the current graph may not be feasible.

Figure 11:
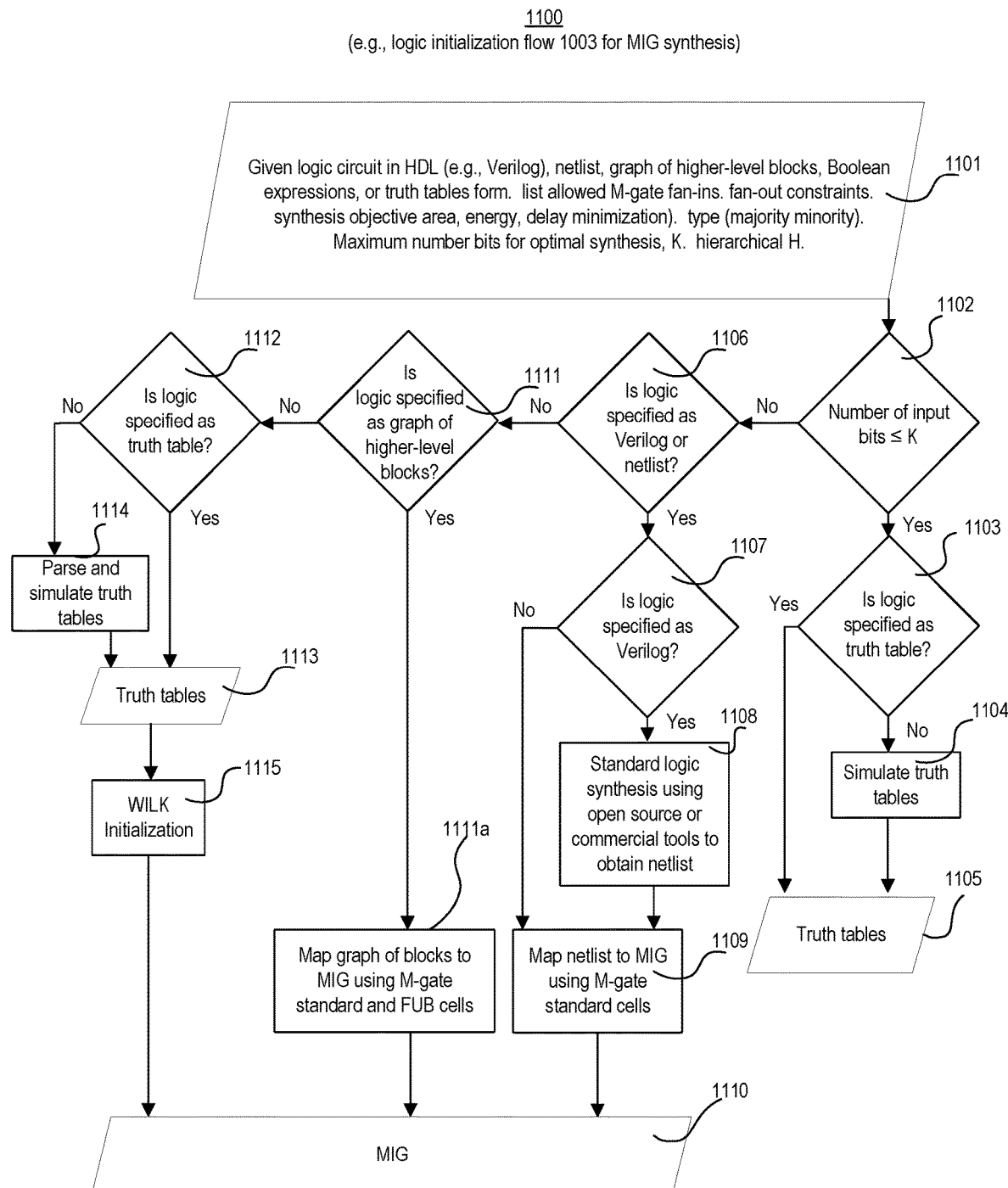
FIG. 11 illustrates a flowchart of a method of logic initialization flow for MIG synthesis, in accordance with some embodiments.

FIG. 11 illustrates flowchart 1100 of a method of logic initialization flow for MIG synthesis (e.g., block 1003 of FIG. 10), in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs. Flowchart 1100 provides methods for translating logic circuit inputs such as Verilog or netlists, graph of higher-level blocks, Boolean expressions, and truth tables into truth tables (when the circuit is small) or MIG (for larger circuits). In various embodiments, the logic initialization flow is responsible for mapping the different input forms of the logic function to the forms that the actual synthesis steps of the MIG synthesis algorithm can easily work with. For small circuits, the output of the logic initialization algorithm is a truth table, whereas for larger circuits, the output is a MIG.

Flowchart 1100 begins with a logic circuit input 1101. The input(s) can be in a number of formats including HDL such as Verilog or VHDL either describing the functionality or circuit connectivity of the combination circuit, netlist of various gates (such as NAND, NOR, Minority, Majority, AND, OR), graph of higher-level blocks, Boolean expressions, or truth tables for the function. The inputs also include a list narrow and/or wide-input majority or minority (herein referred to as M-gates), fan-in constraints of the M-gates, fan-out constraints of the M-gates, PPA objectives, preference of majority or minority gates, maximum number of bits for optimal synthesis, K, and/or maximum number of bits for hierarchical synthesis, H, etc.

At block 1102, the CAD tool decides whether the number of input bits is less than or equal to K. As described herein, K is a small number such as in {4, 5, 6}. In some embodiments, K is less than or equal to 10. K represents the maximum bit width for which an optimal MIG can be found in a reasonable amount of time. As such, when the number of input bits is less than or equal to K, the process proceeds to block 1103 where it is determined whether the logic circuit, which is input to the logic initialization flow, is specified as a truth table. If the logic circuit is specified as a truth table, the truth table is saved as indicated by block 1105. If the logic circuit is not specified as a truth table, simulation is performed on the logic circuit at block 1104 and truth table 1105 is derived from the simulation. As mentioned herein, truth tables can be derived for logic circuits with fewer inputs (e.g., less than 10). If the number of inputs is large (e.g., greater than K), then the process proceeds to block 1106.

At block 1106, the CAD tool determines whether the logic circuit is specified as Verilog (or in any other hardware description language) or a netlist. If the logic circuit is specified in a hardware description language or as a netlist, the process proceeds to block 1107. At block 1107, the CAD tool determines whether the logic circuit is specified as HDL (e.g., Verilog). This determination is made to obtain a netlist if such HDL is specified. As such, at block 1108, if it is determined that the logic circuit is specified as HDL, the CAD tool performs standard logic synthesis using any suitable tool such as open source or commercial tools to obtain a netlist. At block 1109, the CAD tool maps the netlist to MIG using M-gate standard cells to generate the MIG as indicated by block 1110. As discussed herein, the M-gate standard cells include cells of various fan-in and fan-out for a number of different logic functions (e.g., AND, OR, NAND, etc.). These cells can be ferroelectric based cells or non-ferroelectric based cells (e.g., CMOS of other technologies).

If it is determined that the logic is not specified as a hardware description language or a netlist, the process proceeds to block 1111 from block 1106. At block 1111, the CAD tool decides whether the logic is specified as a graph of higher-level blocks. The graph looks like a logic function. A graph of higher-level blocks is a graph containing a connection between blocks that are bigger than a gate (e.g., two or more M-gates). For example, in an array multiplier, a connection of full adders and half adders constitutes a graph of higher-level blocks. Given that the CAD tool knows the optimal MIG of a full adder and a half adder, the full adder and half adder blocks are replaced with their MIG equivalent and the MIGs are connected following the connections of the full adder and half adder blocks in the array multiplier. If the logic is specified as a graph of higher-level blocks, the process proceeds to block 1111a, where the graph of the blocks is mapped to MIG using M-gate standard cells and/or functional unit blocks (FUB) cells (which are higher-level cells). The resultant circuit is a MIG as indicated by block 1110.

If it is determined that the logic is not specified as a graph of higher-level blocks, the process proceeds from block 1111 to 1112. At block 1112, the CAD tool decides whether the logic is specified as a truth table. If that is the case, the truth table is identified and saved as illustrated by block 1113. If the logic is not specified as a truth table, then at block 1114, the CAD tool parses the Boolean expressions and simulates them to generate truth tables. These truth table(s) are saved as illustrated by block 1113. Once the truth tables are identified, the CAD tool performs wide input logic (WILK) initialization at block 1115 to generate the MIG. WILK is a heuristic for initializing a majority and/or minority inverter graph (MIG), in accordance with some embodiments. In various embodiments, WILK is a constructive approach that relies on two-level logic formulation, commutative and associative (symmetric) properties of disjunction (OR) and conjunction (AND), and the expressiveness of wide-input majority gates for initializing combinational circuits. In some embodiments, WILK uses wide-input M-gates based on a result of sum-of-products (SOP) minimization algorithm.

Figure 12A:
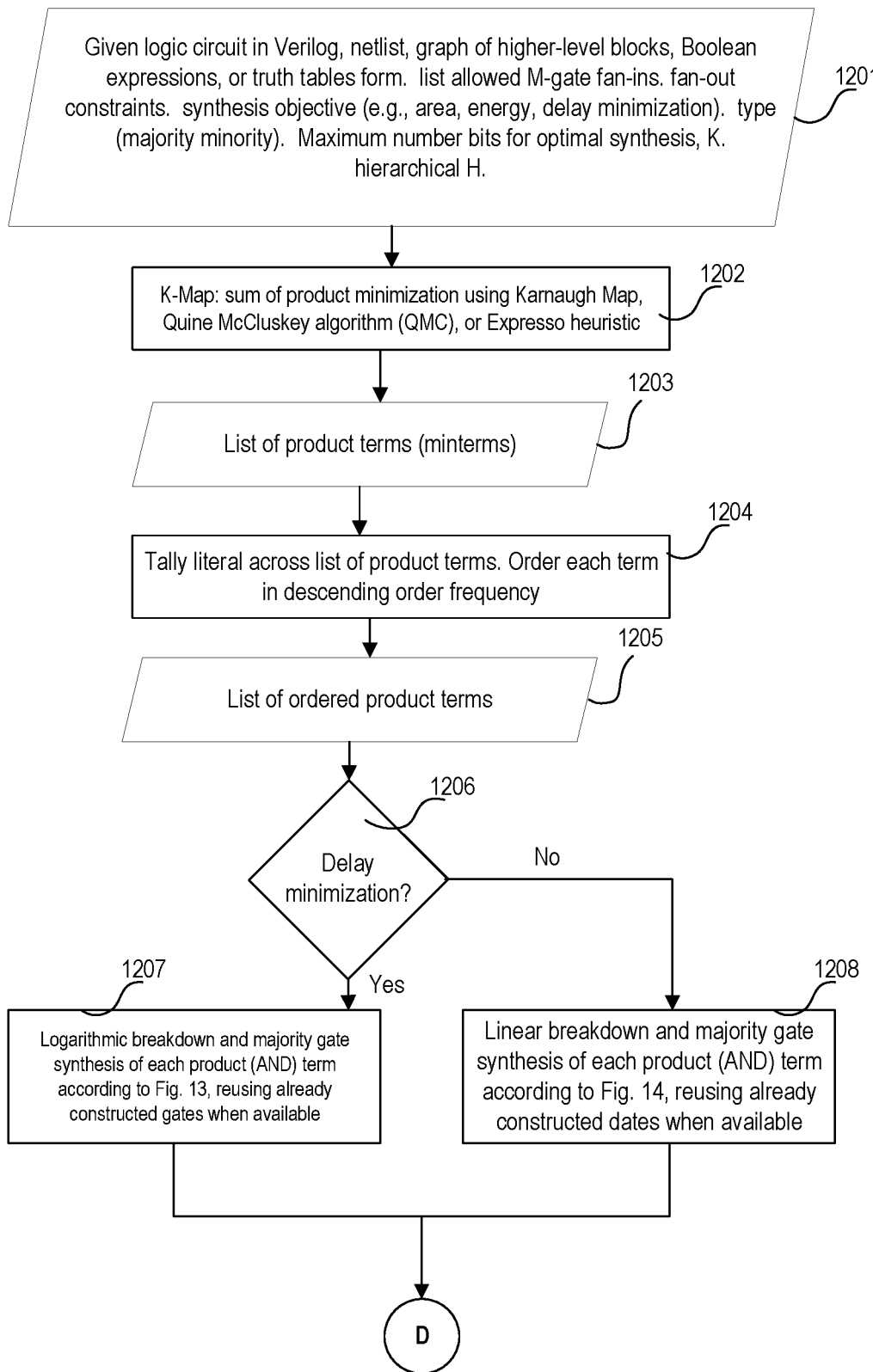
FIGS. 12A-B illustrate a flowchart of a method of wide-input logic initialization flow, in accordance with some embodiments.
Figure 12B:
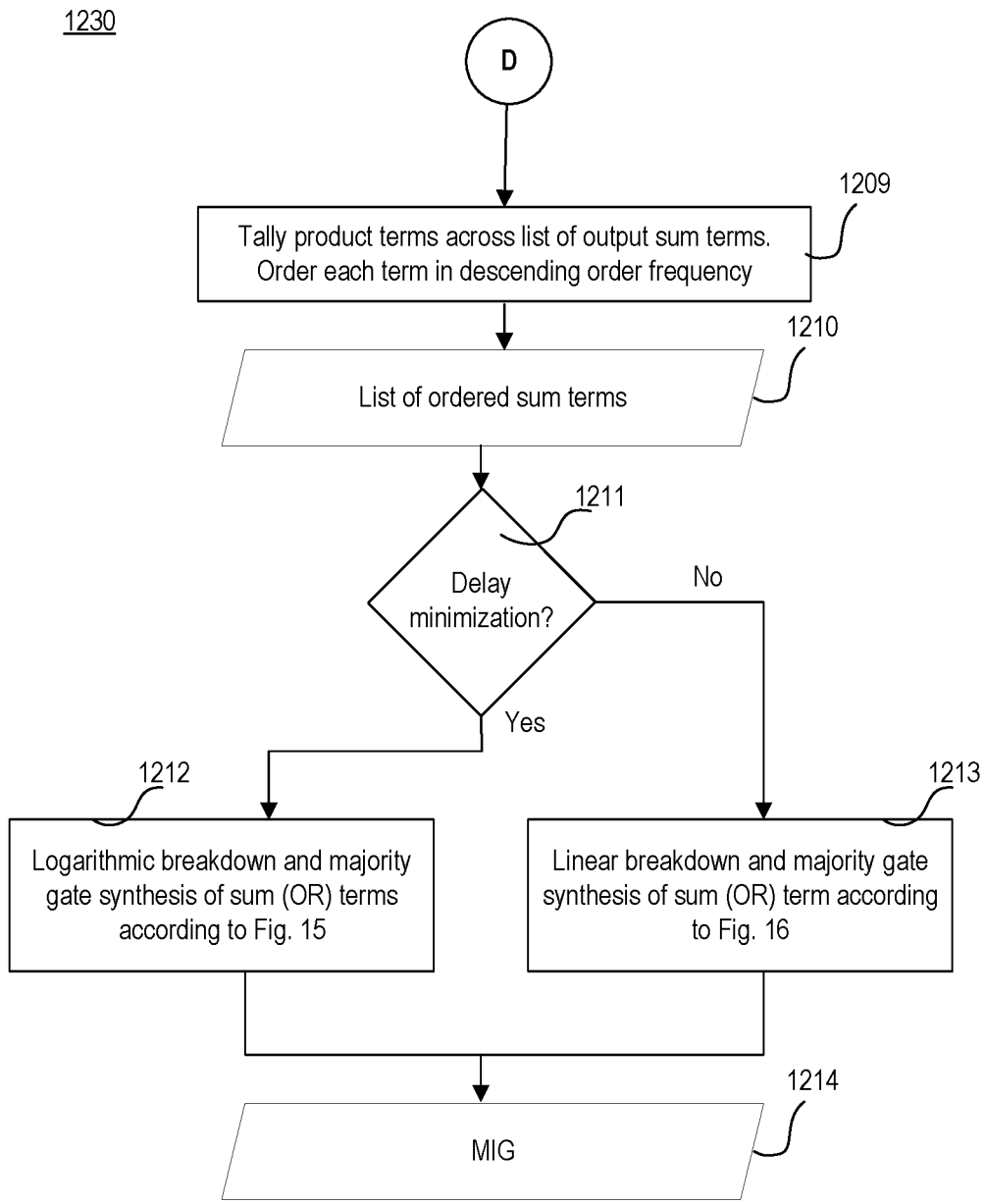

FIGS. 12A-B illustrate flowcharts 1200 and 1230, respectively, of a method of wide-input logic initialization (WILK) flow (e.g., block 1115 of FIG. 11), in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs. Flowchart 1200 (and flowchart 1230) provide heuristic for initializing MIG using wide-input M-gates based on the result of a sum of products (SOP) minimization algorithm.

Flowchart 1200 begins with a logic circuit input 1201. The input(s) can be in a number of formats including HDL such as Verilog or VHDL either describing the functionality or circuit connectivity of the combinational circuit, netlist of various gates (such as NAND, NOR, Minority, Majority, AND, OR), graph of higher-level blocks, Boolean expressions, or truth tables for the function. The truth tables can be multiple inputs and multiple outputs. The inputs also include a list narrow and/or wide-input majority or minority (herein referred to as M-gates), fan-in constraints of the M-gates, fan-out constraints of the M-gates, PPA objectives, preference of majority or minority gates, maximum number of bits for optimal synthesis, K, and/or maximum number of bits for hierarchical synthesis, H, etc.

At block 1202, the CAD tool performs a method of simplifying Boolean algebra expressions (e.g., a logic function). This can be performed by a Karnaugh map (K-map), Quine McClusky (QMC) algorithm or Expresso heuristic. Any logic function can be represented by two levels of logic as given by the minterm expansion $$f(x_1, x_2, \ldots, x_n) = \bigvee_{c_1, c_2, \ldots, c_n} f(c_1, c_2, \ldots, c_n) \wedge x_1^{c_1} \wedge x_2^{c_2} \wedge \ldots \wedge x_n^{c_n},$$

where $c_i$ is either 0 or 1. When $c_i$ is 1, $x_i^{c_i} = x_i$ (the input is used in its original form). When $c_i$ is 0, $x_i^{c_i} = \overline{x}_i$ (the input is used in its inverted form). The first level of logic is represented by at most $2^d$ AND gates ($\Lambda$), one for each of the $2^n$ possible combinations of 0 and 1 for $c_1, c_2, \ldots, c_n$. The second level of logic is represented by a single OR gate (V). Each operand of the OR gate is a representation of a row in the truth table for $f(x_1, x_2, \ldots, x_n)$. The two-level minterm expansion is a specific example of sum of product (SOP) representation of logic. The number of literals $x_i^{c_i}$ in each minterm and the number of minterms can be minimized in a process known in the literature as sum-of-product (SOP) minimization.

Karnaugh maps (K-maps) can be used for SOP minimization for small number of input bits n (e.g., n≤5). Quine McCluskey (QMC) algorithm can be used for slightly larger n (e.g., 5<n<8). For much larger n (e.g., n≥8) heuristics such as the Espresso algorithm can be used for SOP minimization. Here, the techniques for simplifying Boolean expression for SOP minimization are generally referred to as the K-map algorithm. The output of the K-map algorithm is a sum (OR gate) of product of terms (AND gates). SOP can always be implemented using AND gates feeding into an OR gate. Likewise, a product-of-sums expression (POS) leads to OR gates feeding an AND gate. The POS expression gives a complement of the function (if F is the function so its complement will be F'). The output of block 1202 is a list of product terms (minterms) as indicated by block 1203.

At block 1204, the CAD tool tallies literals (e.g., terms $x_1, x_2, \ldots x_n$) across the list of product terms. Based on the frequency of occurrence of the literals, each product term is ordered. For example, each product term in the list of product terms is ordered in a descending order. A person skilled in the art would appreciate that the order can be ascending order and the algorithm can be modified to reuse the ordered list accordingly. In some embodiments, some other heuristic ordering can be used that brings frequent cohorts of literals in close proximity within each minterm. The output of block 1204 is a list of ordered product terms as indicated by block 1205. Each term in the ordered product term is a AND gate.

Due to the commutative and associative (symmetric) properties of OR/AND gates, a large fan-in OR/AND gate can be broken down into a sequence of smaller OR/AND gates. For example, OR(a, b, c, d)=OR(OR(a, b), OR(c, d)) or OR(a, b, c, d)=OR(OR(OR(a, b), c), d). The first breakdown (OR(OR(a, b), OR(c, d)) is logarithmic (depth oriented) whereas the second breakdown (OR(OR(OR(a, b), c, d) is linear (area oriented).

A (2N-1)-input majority gate can represent an N-input AND gate, by tying (N-1) of the majority gate's inputs to a ground level. Similarly, a (2N-1)-input majority gate can represent an N-input OR gate, by tying (N-1) of the majority gate's inputs to a supply level. Since a majority gate can represent AND and OR gates, and the inputs to the AND and OR gates are either original or inverted forms of the input digital signals, any logic function can be represented by majority gates and inverters only. As such, wide-input majority gates provide flexibility is simplifying a give logic function.

Given the list of input logic functions in the form of a truth table(s) with a moderate number of input bits n e.g., 16 input bits, the maximum fan-in F for the majority gate, and the desired PPA criterion, WILK initialization flow 1200 applies K-map at block 1202 for SOP minimization. The output of K-map is a list of product terms as indicated by block 1203. To ensure re-use of majority gates during the construction of the initial MIG, WILK initialization flow 1200 tallies at block 1204 the literals across all product terms and order each product term based on the frequency of its literals from most frequent to least frequent as indicated by block 1205. This ensures that for smaller maximum fan-in, the most frequent set of literals are grouped together fostering gate reuse. Thereafter, WILK initialization flow 1200 synthesizes each ordered product term using a set of majority gates using the relationship between AND gates and majority gates stated above.

Figure 13:
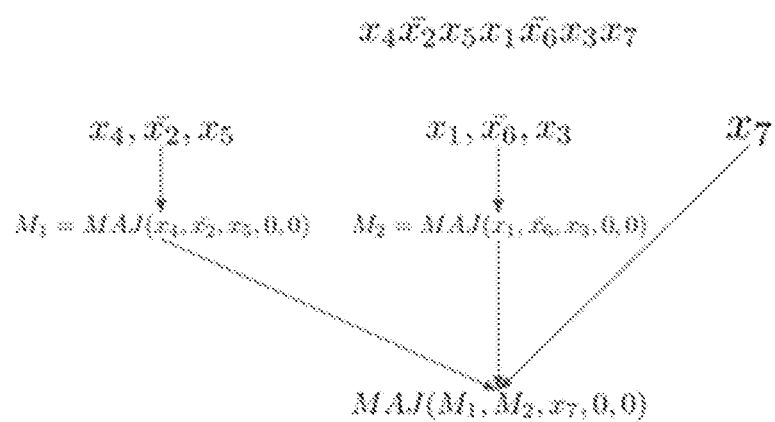
FIG. 13 illustrates a graph for logarithmic breakdown of a product term for use in the wide-input logic initialization flow, in accordance with some embodiments.

At block 1206, the CAD tool determines whether the logic is to be optimized (or simplified) for delay minimization, area or energy. If the logic is to be optimized for delay minimization, (e.g., shallow logic depth), then the process proceeds to block 1207. When the maximum fan-in F is limited relative to the product term with pliterals (when F<2p–1), more than one majority gate is needed. To ensure the depth is not adversely affected, the logarithmic breakdown of the product term as shown herein for p=7 and F=5 (which can represent 3-input AND gates) in FIG. 13 can be used. FIG. 13 illustrates graph 1300 for logarithmic breakdown of a product term for use in the wide-input logic initialization flow, in accordance with some embodiments. In FIG. 13, one product term with seven terms is broken down into a sequence of majority gates. In this example, it takes a depth of 2 and 3 AND gates to achieve the function represented by the 7-term input product term. In this example, each AND gate is implemented as a majority gate that can be reused.

Figure 14:
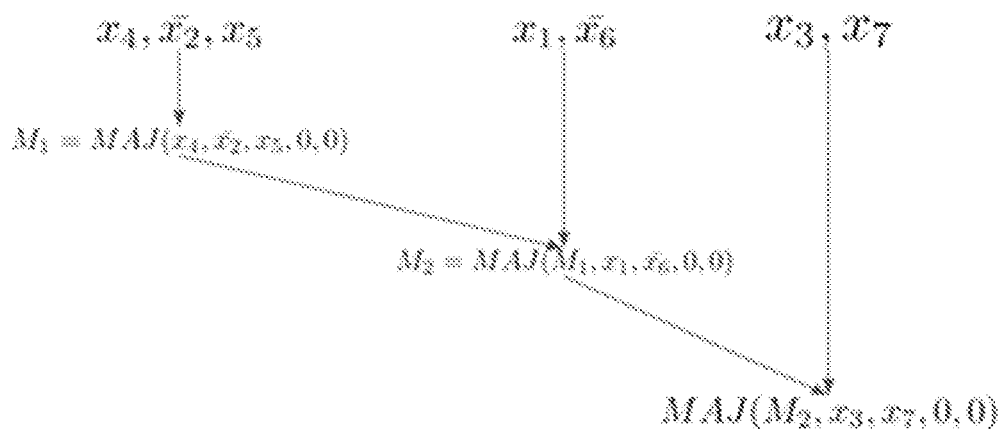
FIG. 14 illustrates a graph for linear breakdown of product term for use in the wide-input logic initialization flow, in accordance with some embodiments.

Referring back to FIG. 12A, if the logic is to be optimized for area or energy, the process proceeds to block 1208 from block 1206. The linear breakdown of the product term illustrated in FIG. 14 increases the depth by 1. FIG. 14 illustrates graph 1400 for linear breakdown of product term for use in the wide-input logic initialization flow, in accordance with some embodiments. In this example, it takes a depth of 3 levels of majority based OR gates. In general, the linear breakdown has the advantage of keeping the high frequency literals closer (within the same majority gate) and using fewer gates. The choice between linear and logarithmic breakdown depends on the tradeoff between area and delay.

Referring back to FIGS. 12A-B, after synthesizing the ordered product terms, WILK initialization flow 1200 synthesizes the sums (OR gates) of all the product terms. Again, the product terms across all sum terms are tallied (one sum term per output logic function) at block 1209. Subsequently, the list of sum terms is ordered based on the frequency of their constituent product terms. The list of ordered sum terms is the output of block 1209 as indicated by block 1210. In some embodiments, a set of majority gates using the relationship between OR gates and majority gates stated above are utilized, to represent each sum term. When the maximum fan-in F is limited relative to the sum term with s product terms (when F<2s–1), more than one majority gate is needed.

Figure 15:
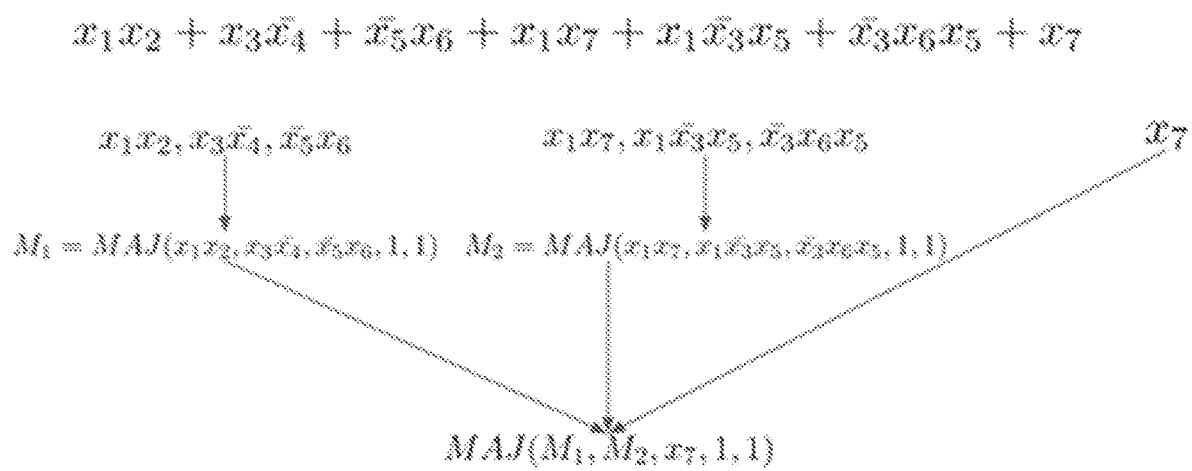
FIG. 15 illustrates a graph for logarithmic breakdown of a sum term for use in the wide-input logic initialization flow, in accordance with some embodiments.
Figure 16:
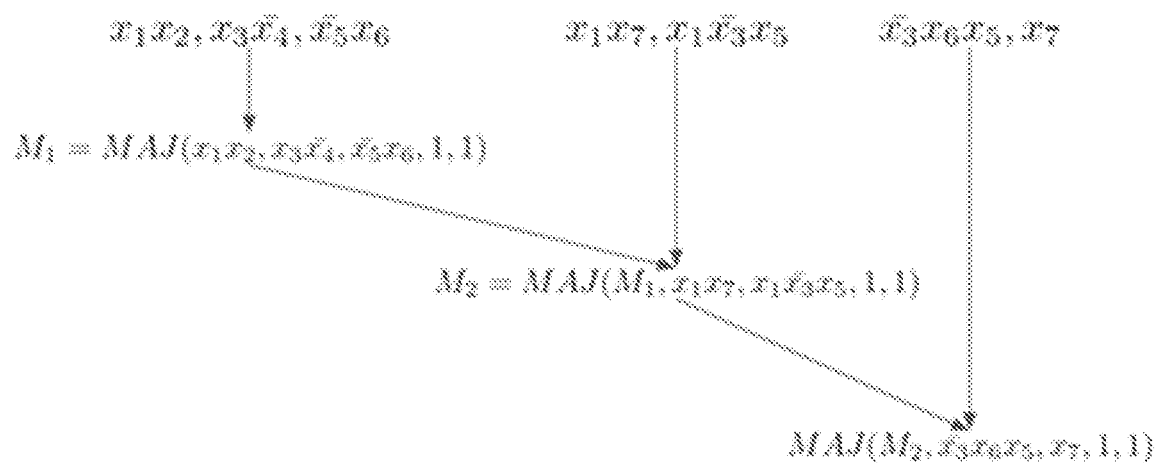
FIG. 16 illustrates a graph for linear breakdown of sum term for use in the wide-input logic initialization flow, in accordance with some embodiments.

At block 1211, the CAD tool determines whether the ordered sum terms are to be optimized (or simplified) for delay minimization, area or energy. If the ordered sum terms are to be optimized for delay minimization, (e.g., shallow logic depth), then the process proceeds to block 1212. At block 1212, the CAD tool uses logarithmic breakdown and majority gate synthesis of sum (OR) terms as illustrated in FIG. 15. FIG. 15 illustrates graph 1500 for logarithmic breakdown of a sum term for use in the wide-input logic initialization flow, in accordance with some embodiments. Referring back to FIG. 12B, if the logic is to be optimized for area or energy, the process proceeds to block 1213 from block 1211. The linear breakdown and majority gate synthesis of sum (OR) term(s) is illustrated with reference to FIG. 16. FIG. 16 illustrates graph 1600 for linear breakdown of sum term for use in the wide-input logic initialization flow, in accordance with some embodiments. The resultant output from blocks 1212 or 1213 is a MIG as indicated by block 1214. While the WILK initialization flow is illustrated with reference to performing synthesis of product terms first and then the sum terms, the order can be reversed, in accordance with some embodiments. For example, WILK initialization flow can be accomplished with reference to performing synthesis of product-of-sum (POS) logic representation.

Figure 17:
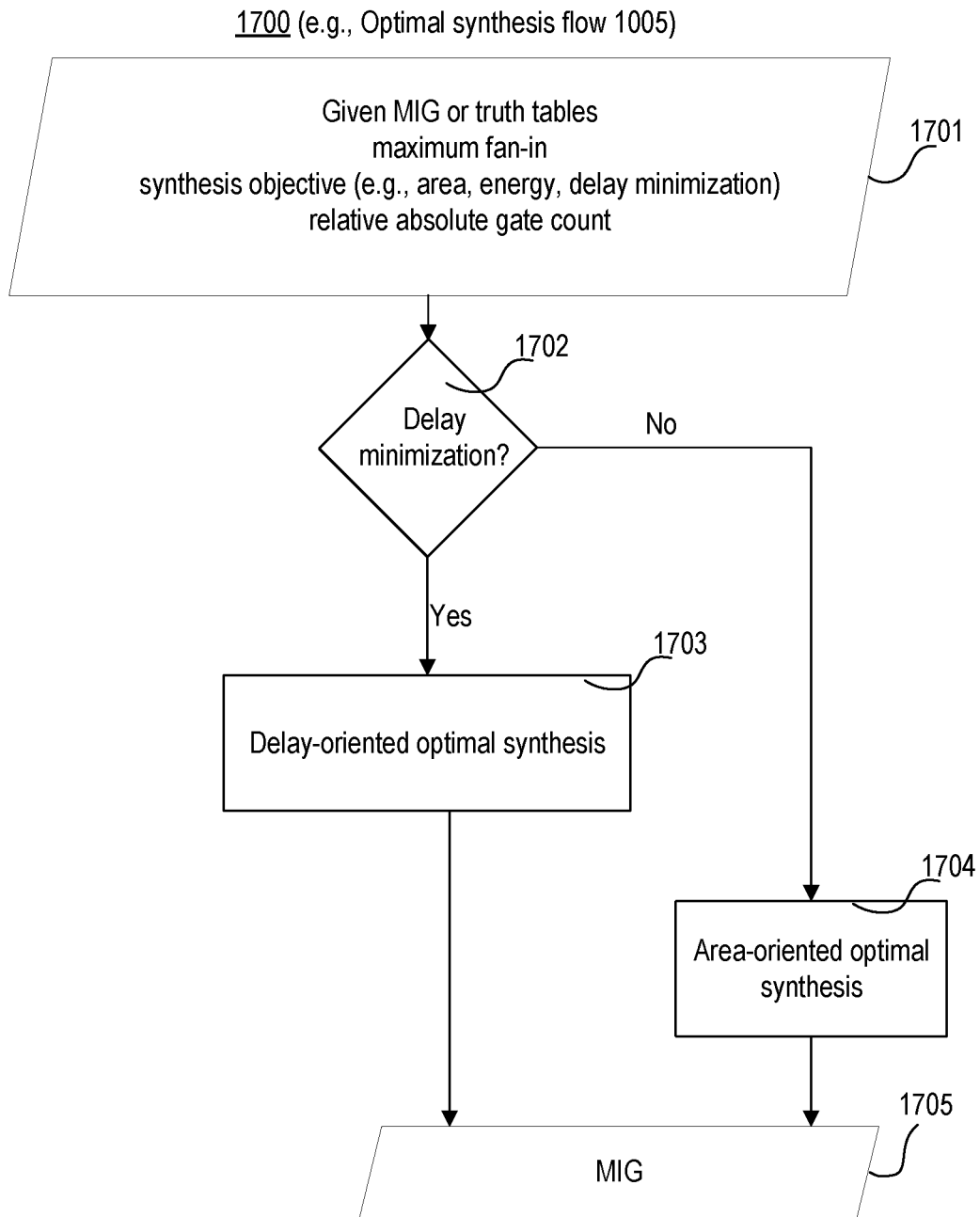
FIG. 17 illustrates a flowchart of a method for optimal synthesis flow, in accordance with some embodiments.

FIG. 17 illustrates flowchart 1700 of a method for optimal synthesis flow, in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs. Flowchart 1700 provides a mechanism for optimal MIG synthesis of relatively small circuits (e.g., number of inputs is less than or equal to K) using either area-oriented or delay-oriented algorithms depending on the primary synthesis objective.

Flowchart 1700 begins with a set of inputs 1701. The input(s) include MIG or truth tables, maximum fan-in, synthesis objective (e.g., PPA objectives), and maximum relative or absolute gate count. At block 1702, the CAD tool decides whether to minimize delay. When delay minimization is the stated objective, the process proceeds to block 1703 where delay-oriented synthesis is performed as discussed with reference to FIG. 20. In delay-oriented synthesis, one objective is depth minimization. If area or energy minimization or efficiency is the stated objective, the process proceeds to block 1704 where area-oriented optimal synthesis is performed as discussed with reference to FIG. 18 and FIG. 19. In area-oriented optimal synthesis, one objective is to reduce gate count of a logic. The resultant output of the delay-oriented synthesis or area-oriented optimal synthesis is MIG 1705.

Figure 18A:
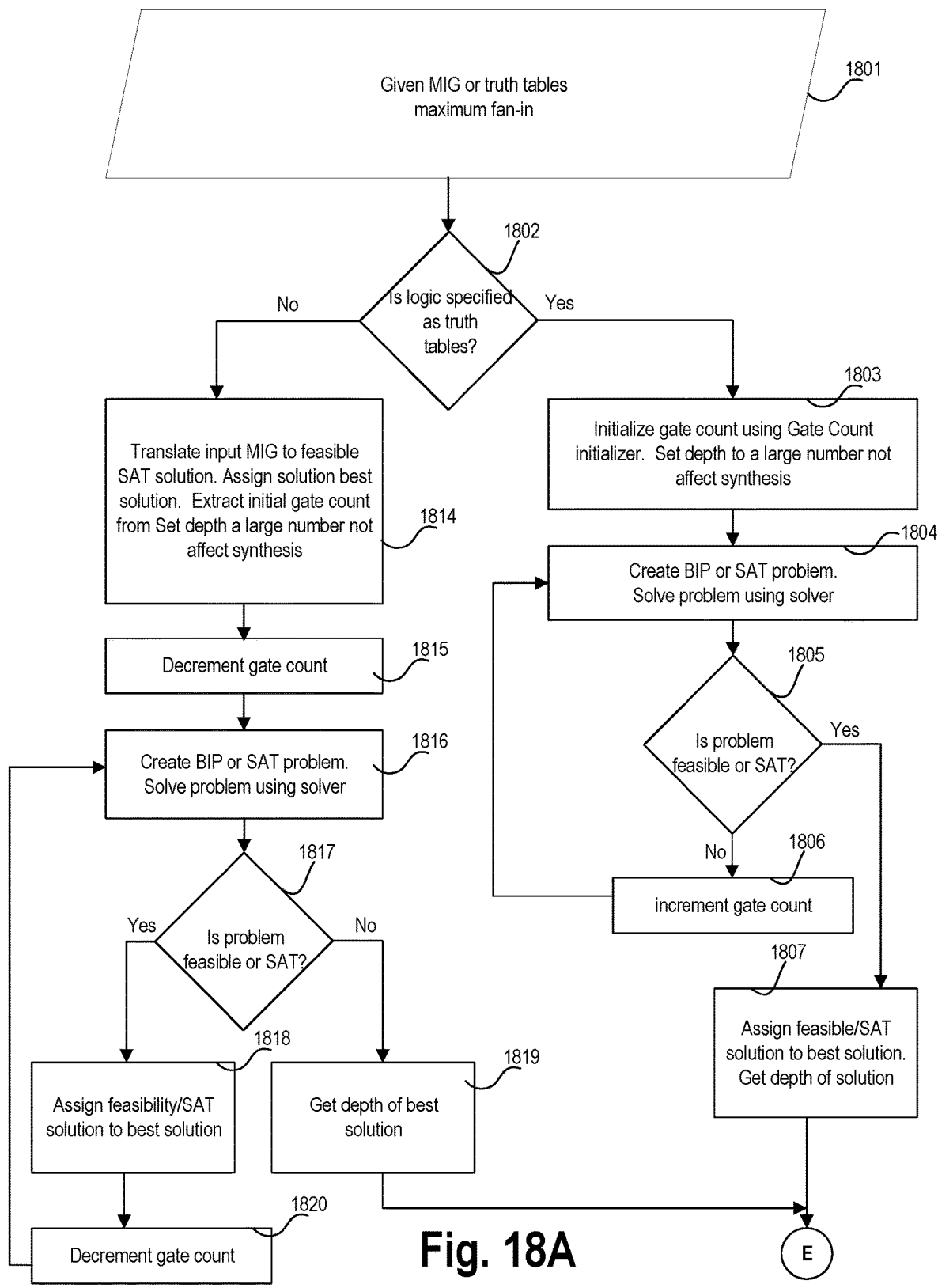
FIGS. 18A-B illustrate a flowchart for area-oriented optimal synthesis flow, in accordance with some embodiments.
Figure 18B:
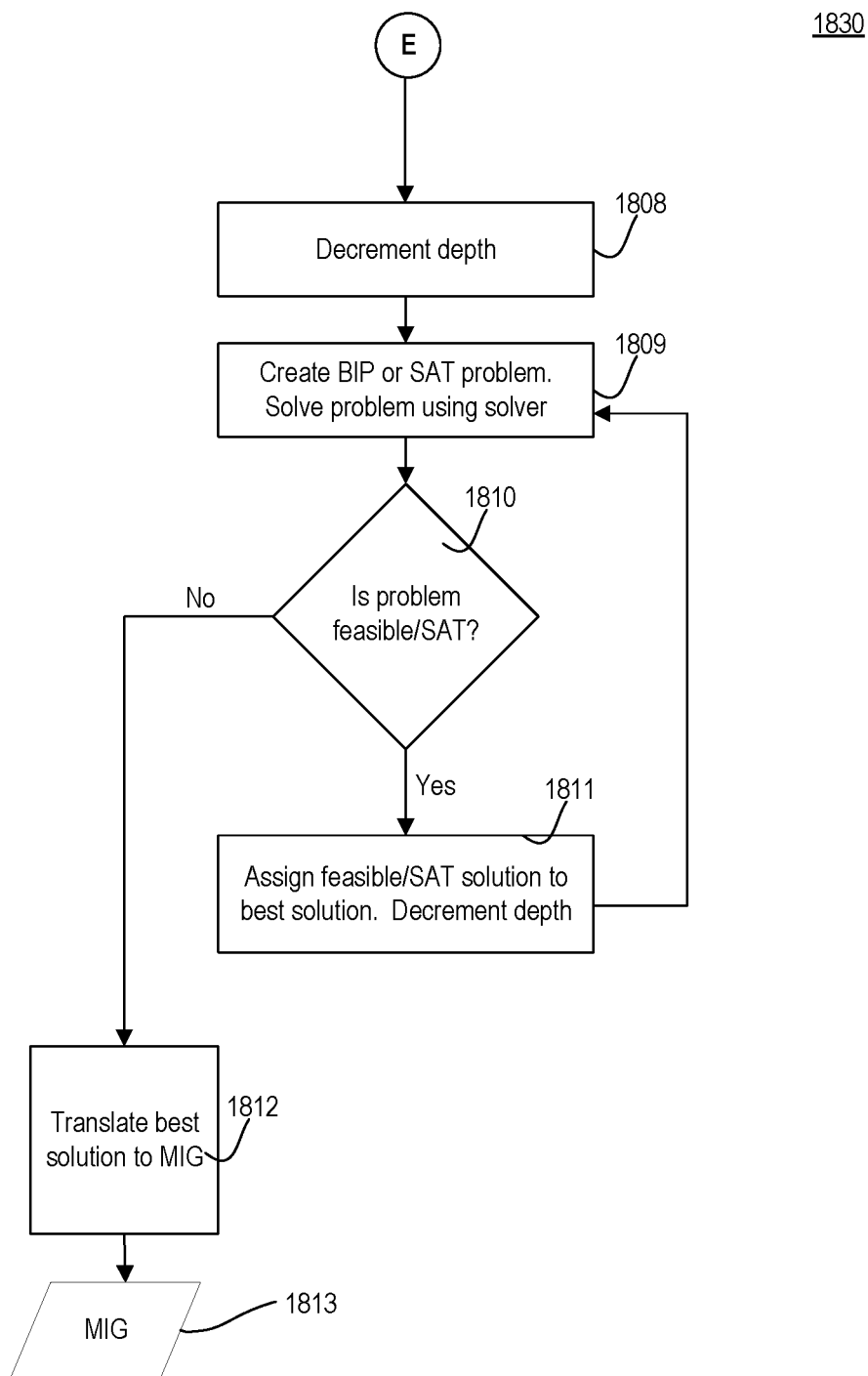

FIGS. 18A-B illustrate flowcharts 1800 and 1830 for area-oriented optimal synthesis flow (e.g., block 1704), in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs. Flowcharts 1800 and 1830 represents the area-oriented optimal synthesis flow used in obtaining area-optimal MIGs.

The CAD tool receive inputs 1801. The inputs include a given MIG or truth tables. The truth tables describe the outputs of a logic as a function of inputs. The inputs also include a maximum fan-in. At block 1802, a determination is made about the description of the logic circuit. To accelerate the search for area-optimal MIGs, the area-oriented optimal synthesis of flowchart 1800 uses two paths for selecting the initial gate counts. When a MIG is specified, the number of M-gates in it are used as an upper bound on the number of M-gates for an area-optimal MIG. When a truth table is specified, a lower bound on the number of M-gates is obtained by the gate count initialization algorithm of FIG. 19. As such, at block 1803, the CAD tool initializes the gate count value using the gate count initializer flow from FIG. 19. The gate count initialization algorithm of FIG. 19 takes advantage of the fact that when there are multiple outputs and they are not correlated with each other, with input variables of constant inputs, the search for an area-optimal MIG can be accelerated by skipping small gate counts and initializing the number of gates to a non-unit minimum value. At block 1803, the logic depth is set to a large number (e.g., 100 or 1000 or more) so it is not a binding constraint to affect synthesis. At block 1804, the CAD tool creates binary integer program (BIP) or satisfiability (SAT) problem and solves that problem using a solver. The purpose of finding a solution is to find a minimum number of gates (e.g., AND gates, OR gates, M-gates, etc.) that are needed to find a solution that obeys or complies with the truth tables. In various embodiments, inverters or buffers are not counted as gates because are they are too small compared to AND gates, OR gates, M-gates. At a later stage in the process, inverter minimization is performed to optimize (e.g., reduce) the number of inverters while meeting timing constraints and logic function.

At block 1805, the CAD tool decides whether the problem (of obtaining the truth table function for the logic circuit) is feasible or satisfiable with the current gate count low bound. If it is not feasible or satisfiable, the gate count is incremented (e.g., the gate count bound is increased by one or more) at block 1806 and the process of establishing the BIP or SAT problem and its solution is performed again. This process continues till the CAD tool determines that the problem is feasible or satisfiable with the new gate count. When the problem is feasible or satisfiable with the new gate count, the process proceeds to block 1807. At block 1807, the solution found by the solver is considered as the best solution that provides the least gate count to meet the function of the truth tables. The process then proceeds to get the best depth solution. Here, best depth solution refers to fastest delay possible from input to output. The process then proceeds to block 1808 as indicated by identifier E.

Blocks 1808, 1809, 1810, 1811, and 1812 determine the best circuit topology in view of area and logic depth. At block 1808, the initial depth value is decremented. This initial depth value may be a small number such as 10. In some embodiments, this initial depth value comes from the best solution with the area objective. From the best area solution, the CAD tool extracts the circuit depth from the interconnection of M-gates specified by the BIP or SAT solution.

At block 1809, BIP or SAT problem is setup and solved using a solver. Any suitable solver can be used to solve the BIP or SAT problem. At block 1810, the CAD tool determines whether the problem is feasible (e.g., solvable) or satisfiable using the decremented depth. The purpose of finding a solution is to find a minimum logic depth needed to find a solution that obeys or complies with the truth tables for the optimized area. If a solution is found, then it means that a better solution may be possible. For example, the depth can be further decreased beyond its current limit. As such, at block 1811, the current feasible or satisfiable solution is considered as the best solution for depth optimization, and then the depth count is decremented again to see if a better solution for depth is possible. The process then repeats till the CAD tool determines that the problem is not feasible or satisfiable. In that case, the process proceeds to block 1812 where the current solution is marked as the best solution and MIG 1813 is formed using the optimized area and the updated lower depth.

If at block 1802, the CAD tool determines that the logic is not specified as truth tables (e.g., the CAD tool input is a MIG), then the process proceeds to block 1814. At block 1814, the input MIG is translated to a feasible solution for BIP or feasible satisfiable (SAT) solution. The feasible BIP or SAT solution is assigned as the best solution. In some embodiments, the initial gate count can be obtained directly from the MIG (number of M-gates in the graph) or extracted from the best feasible/SAT solution. In some embodiments, this initial gate count is obtained directly from the MIG. Like in block 1803, the depth is set to a large number (e.g., 100) so that it does not become a bottleneck to find an optimized area (e.g., reduced number of gates). At block 1815, the current gate count is decremented (e.g., by one or more). The decremented amount herein can be fixed or programmable.

In some embodiments, the search for the optimal gate count and later the circuit depth in the current flowcharts is a linear search with a step size of 1. Other search mechanisms such as bisection search may be used, where there are two extremes (e.g., low and high gate counts or circuit depths with opposite feasibility/satisfiability) which surround the optimum and the interval between the two extremes is shrunk by a factor of 2 after each search iteration until only the optimum remains (interval size is 0). Linear search with step sizes greater than 1 need a backtracking mechanism for when the optimum is overshot. For example, if the best gate count is 2 and the current gate count is 1 and the CAD tool steps by 2, then the CAD tool ends up at a gate count of 3, which will be feasible/SAT. Note, gate count of 1 is not feasible/SAT. For feasibility or satisfiability study between gate counts 1 and 3, it is noted that since the feasibility/satisfiability of the problem at gate counts of 1 and 3 are different, the CAD tool tests the problem feasibility or satisfiability at gate count of 2, in accordance with some embodiments. In some embodiments, a flowchart for linear search with step size >1 or bisection search will be more cumbersome than the linear search with step size=1.

At block 1816, the BIP or SAT problem is then solved using a problem solver. The problem is to find a circuit that functions according to the logic of the MIG with reduced gate count. At block 1817, the CAD tool determines whether the problem is feasible or satisfiable with the reduced gate count. If it is, this means that there may be more room for reducing the number of gates. At block 1818, the current solution is assigned as the best solution and then the gate count is decremented at block 1820, and the process of setting up the problem and finding the solution is repeated. This process is repeated till the problem can no longer find a feasible or satisfiable solution given the gate count. At that point, the minimum gate count is achieved. Thereafter, the process continues with finding the best depth for the logic (e.g., the lowest or shallowest depth possible given the reduced gate count). This process begins at block 1819 and follows blocks 1808, 1809, 1810, 1811, and 1812 as previously discussed.

Figure 19:
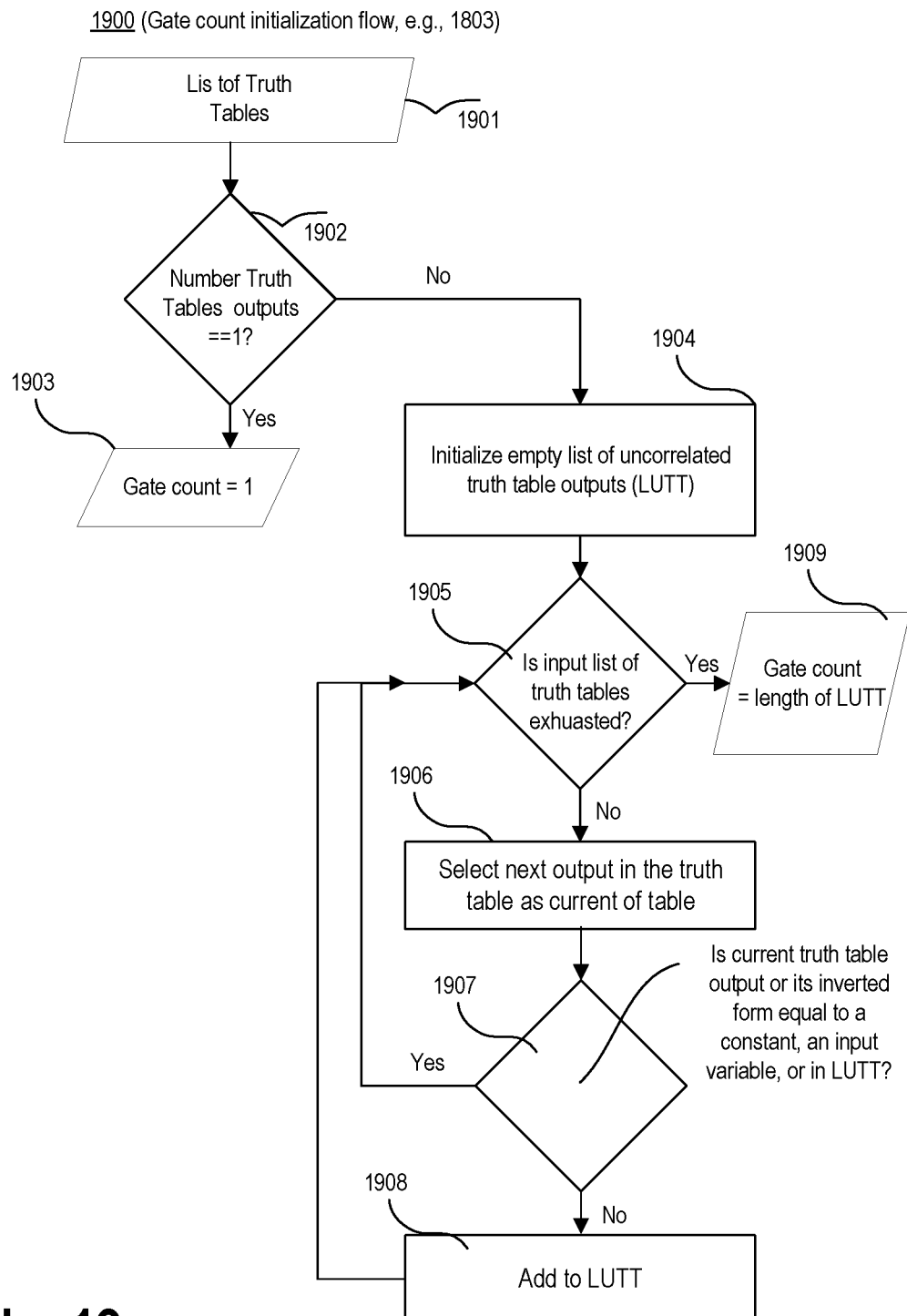
FIG. 19 illustrates a flowchart for gate count initialization for area-oriented optimal synthesis flow, in accordance with some embodiments.

FIG. 19 illustrates flowchart 1900 for gate count initialization for area-oriented optimal synthesis flow (e.g., block 1803), in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs. When the logic functions are truth tables, the CAD tool takes advantage of the fact that when there are multiple outputs and they are not correlated with each other, with input variables or with constant inputs, the search for an initial gate count can be accelerated by skipping small gate counts (e.g., 1, 2, etc.) and initializing the number of gates to a non-unit minimum value (e.g., 5).

Flowchart 1900 begins with input truth tables 1901. These truth tables define logic outputs as function of logic inputs. An example of a truth table is illustrated in the table below for an adder, minority function, and inverted input. Here, inputs are $X_1$, $X_2$, $X_3$, while the outputs are $X_{1\_b}$, (which is inverse of $X_1$), $Min(X_1, X_2, X_3)$, $FA_{Carry}$, and $FA_{sum}$.

TABLE 1

| $X_1$ | $X_2$ | $X_3$ | $X_{1\_b}$ | $Min(X_1,X_2,X_3)$ | $FA_{Carry}$ | $FA_{Sum}$ |
|---|---|---|---|---|---|---|
| 1 | 1 | 1 | 0 | 0 | 1 | 1 |
| 0 | 1 | 1 | 1 | 0 | 1 | 0 |
| 1 | 0 | 1 | 0 | 0 | 1 | 0 |
| 0 | 0 | 1 | 1 | 1 | 0 | 1 |
| 1 | 1 | 0 | 0 | 0 | 1 | 0 |
| 0 | 1 | 0 | 1 | 1 | 0 | 1 |
| 1 | 0 | 0 | 0 | 1 | 0 | 1 |
| 0 | 0 | 0 | 1 | 1 | 0 | 0 |

At block 1902, the CAD tool determines whether the number of outputs represented by the truth tables is equal to 1. If there is only one output, then the gate count is initialized to 1 as indicated by block 1903. If the number of outputs represented by the truth tables is greater than 1, then the process proceeds to block 1904 to determine a gate count value that can be used as a starting point for optimizing area. At block 1904, the CAD tool initializes an empty list of uncorrelated truth table outputs (LUTT). This list is populated by reviewing the truth tables (e.g., outputs of the truth tables). At block 1905, the CAD tool determines whether the list of outputs of the truth tables is exhausted. This process is done to iteratively pass through each output of the truth tables and determine whether the output can be added to the list of uncorrelated truth tables (LUTT).

The outputs of a truth tables can be out1, out2, out3, and so on for a number of inputs in1, in2, etc. At block 1906, the first output (e.g., out1) is made the current output and then checked at block 1907 whether the current output of the truth table or its inverted form is a constant, one of the inputs, or in LUTT. This process is done for each output of the truth table. If the current output of the truth table or its inverted form is a constant, one of the inputs, or in LUTT, the process proceeds to block 1905 and the next output is made the current output and the check is made again. When the current output of the truth table or its inverted form is not a constant, is not one of the inputs, or not in LUTT, then a new unique, non-constant, and non-input truth table output is identified which is added to the LUTT at block 1908. When the entire list of outputs of the truth tables are exhausted and checked for LUTT, the process identifies the gate count which is the length of LUTT as indicated by block 1909.

Figure 20A:
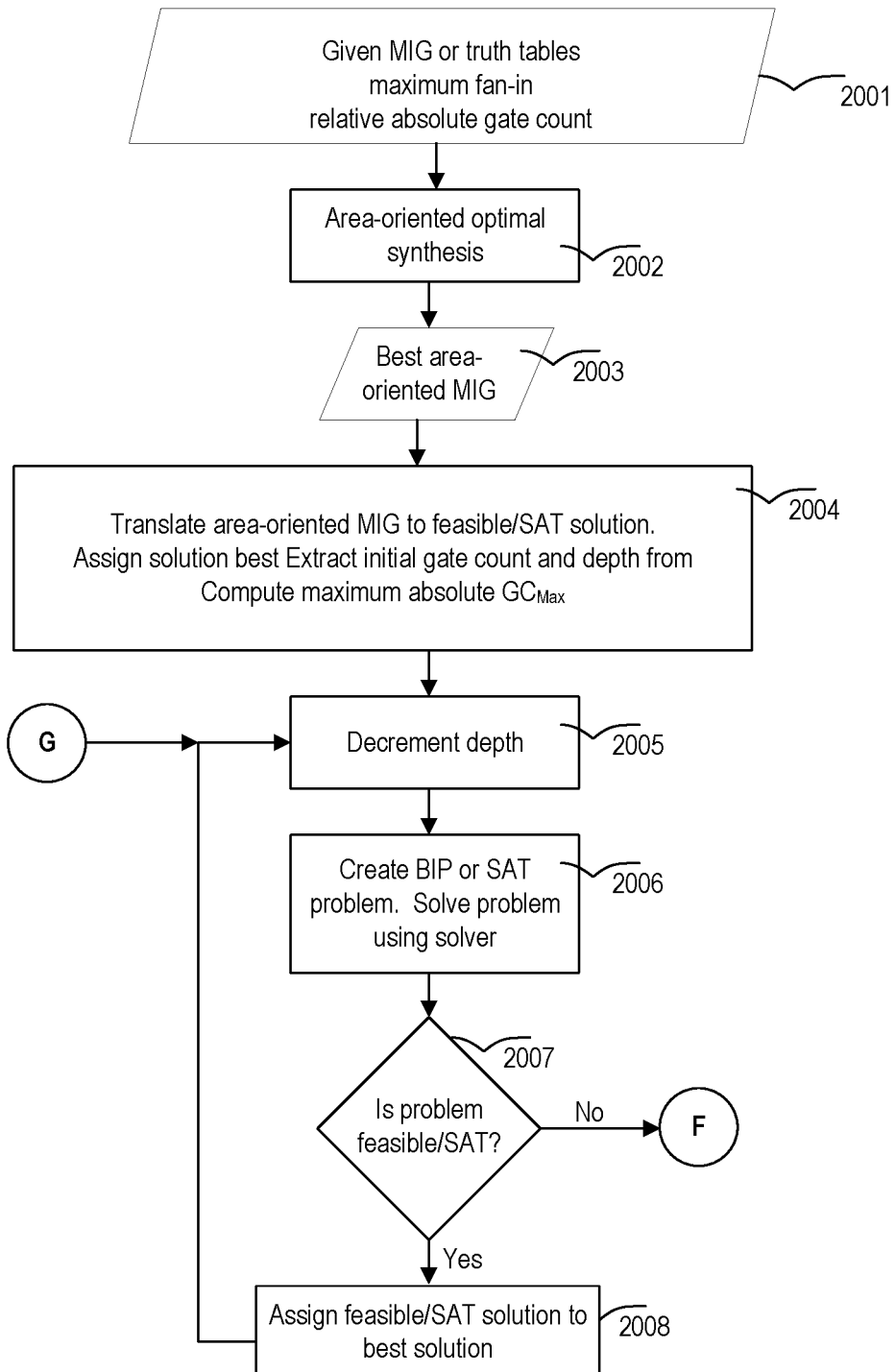
FIGS. 20A-B illustrate a flowchart for delay-oriented optimal synthesis flow, in accordance with some embodiments of the disclosure.
Figure 20B:
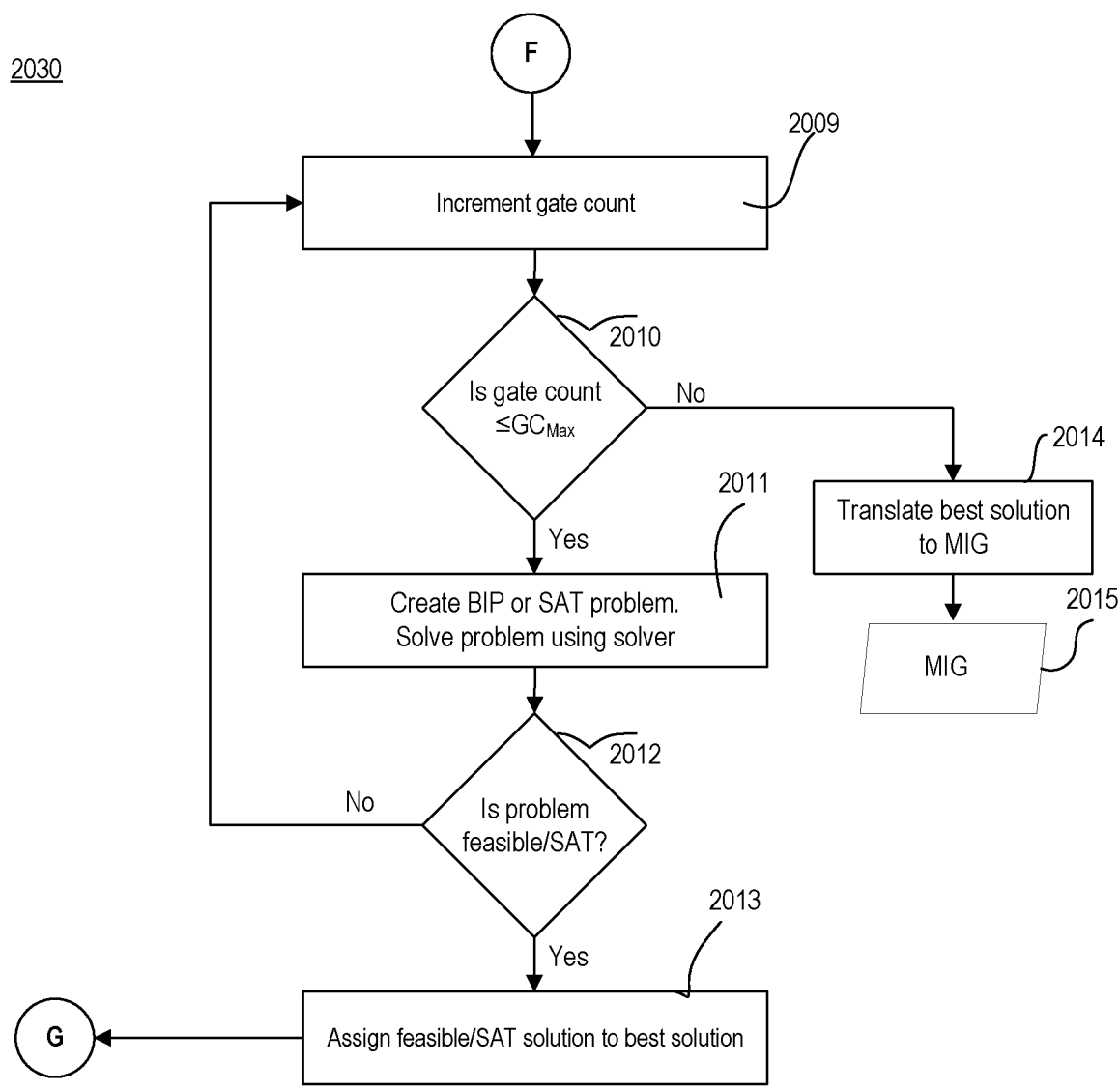

FIGS. 20A-B illustrate flowchart 2000 and 2030 for delay-oriented optimal synthesis flow (e.g., block 1703), in accordance with some embodiments of the disclosure. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs. The delay-oriented optimal synthesis flowcharts 2000 and 2030 kick-starts the search for a delay-optimal MIG by using area-oriented optimal synthesis of flowchart 1800 to establish the minimum number of M-gates, maximum logic depth, and bounding the search for the delay-optimal MIG.

The flowchart begins with inputs 2001 which include a given MIG or truth tables, given maximum fan-in, and a given maximum relative or absolute gate count. At block 2002, area-oriented optimal synthesis is performed to get a minimum count of gates for a logic function. Block 2002 performs the flowcharts of FIG. 18A, FIG. 18B, and FIG. 19 to arrive at a best area oriented MIG 2003. Block 2003 gives the minimum bound on gate count and upper bound on depth (obtained from the graph). At block 2004, the CAD tool translates the area-oriented MIG to a feasible or satisfiable (SAT) solution. This solution is assigned as the best solution until the next best solution is determined. At block 2004, the CAD tool extracts the initial gate count and depth from the best solution, and also computes the maximum absolute gate count $GC_{max}$. In some embodiments, the maximum absolute gate count $GC_{max}$ is a finite maximum. The iterative process to find the lowest obtainable depth then starts at block 2005, where the current depth number from the graph is decremented. The amount decremented may be fixed or programmable. FIGS. 20A-B show the case of using a linear search with unit steps. In some embodiments, the search for the optimal depth can be accomplished by using a linear search with programmable non-unit steps combined with backtracking in case of overshooting the optimal depth, and bisection search.

At block 2006, the CAD tool sets up the BIP or SAT problem and solves it (using any suitable solver) to arrive at a possible solution that satisfies the logic function for the given depth limit. If the CAD tool determines at block 2007 that the problem is feasible or satisfiable, then at block 2008 the solution is considered as the best solution and the depth is decremented to see if further delay minimization can be achieved. After an iterative process, the CAD tool will determine that the problem is not solvable because the solution is not feasible or satisfiable. In that case, the process proceeds to block 2009 as indicated by identifier F. Here, the gate count is incremented. The idea is that after obtaining the minimum depth for an optimized area, the gate count is increased and the depth analysis redone to find an optimal depth, thereby trading off gate count for depth. A strictly minimum depth goal may result in a very wide logic, which may not be feasible to implement. As such, in some embodiments, the area and depth optimization are done iteratively to find the optimal depth for the logic circuit within a fixed area budget.

At block 2010, the CAD tool determines whether the gate count is less than or equal to $GC_{Max}$. If it is, then at block 2011, the CAD tool creates a BIP or SAT problem and solves it. At block 2012, the CAD tool determines if the problem is feasible to solve or satisfiable. If not, then the gate count is incremented again and the process is repeated. If the problem is feasible to solve or satisfiable and the gate count is still below $GC_{Max}$, then the solution is considered the best solution as indicated by block 2013 and the process of depth decrementing starts again as indicated by identifier G. At block 2013, the CAD tool assigns the feasible or satisfiable solution as the best solution. Here, $GC_{Max}$ is the fixed area budget. There is an inherent tradeoff between depth and gate count. Decreasing the depth usually increases the gate count and vice versa. $GC_{Max}$ serves as the overall stopping condition, so that the gate count (and area) doesn't grow ad infinitum. If the area budget has not been reached, the CAD tool can continue trying to decrease the depth. If at block 2010 it is determined that the gate count is greater than $GC_{Max}$, then the best solution is used to generate the MIG at block 2014. The final outcome is MIG 2015 which is delay optimized (with fewer depths) in view of the fixed area budget.

Figure 21:
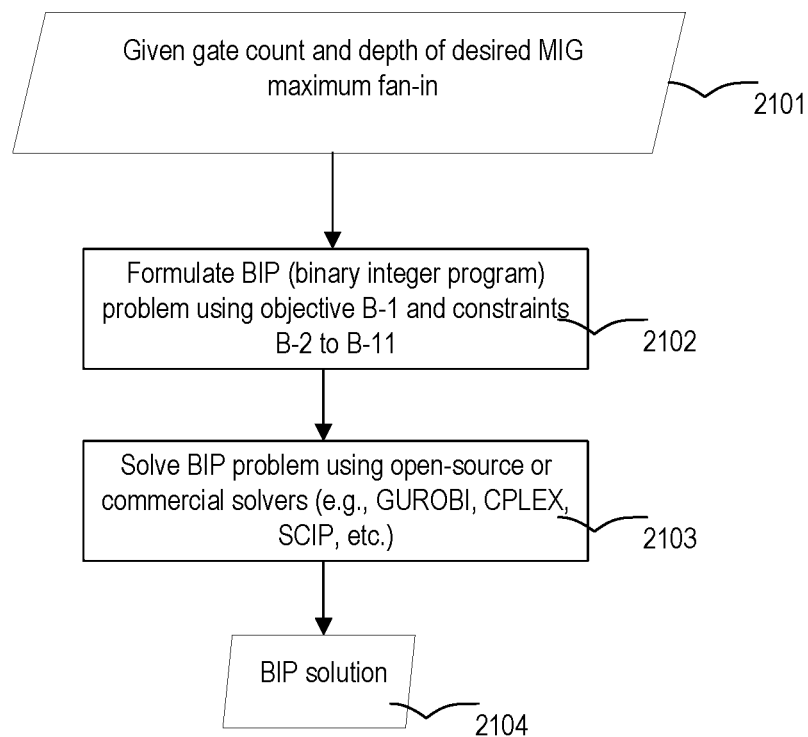
FIG. 21 illustrates a flowchart for synthesis problem formulation as binary integer program (BIP), in accordance with some embodiments.

FIG. 21 illustrates flowchart 2100 for synthesis problem formulation as binary integer program (BIP), in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs. In some embodiments, the CAD tool extends a mixed integer program to a binary integer program by restricting the weights of a threshold gate to the set $\{-1, 0, 1\}$ to reduce them to symmetric gates (of which majority and minority gates are a subset). In some embodiments, the CAD tool introduces a new set of constraints for minority gates and a new set of constraints for delay optimization. In some embodiments, the CAD tool allows the use of single or multiple fan-in M-gates. Synthesis problem formulation as binary integer program (BIP) is a process in the area-oriented and delay-oriented optimal synthesis flows described herein.

In some embodiments, the CAD tool receives inputs 2101 including gate count and depth of the desired MIG, and maximum fan-in. At block 2102, the CAD tool formulates BIP (binary integer program) problem using objectives B1 and constraints B-2 to B-11. At block 2103, the CAD tool solves the BIP problem using a solver (e.g., open source or commercial solves such as GUROBI, CPLEX, SCIP, etc.). The output of the solver is the BIP solution 2104.

Given n binary input variables $x_1, x_2, \ldots, x_n$ and M binary output logic functions $y_1, y_2, \ldots, y_M$, let $x_0$ be the constant representing the low binary state. Let there be r M-gates laid out as a feed-forward network with a depth of d. Let $w_{ik}$ represent the weight of a connection from the i-th input variable to the k-th gate, $\alpha_{lk}$, the weight of a connection from the l-th gate to the k-th gate, $\pi_{im}$, the weight of the connection from the i-th input to the m-th output logic function, and $\phi_{km}$, the weight of a connection from the k-th gate to the m-th output logic function. If $w_{ik}=1$, $\alpha_{lk}=1$, $\pi_{im}=1$, $\phi_{km}=1$, a positive connection exists. If $w_{ik}=-1$, $\alpha_{lk}=-1$, $\pi_{im}=-1$, $\phi_{km}=-1$, an inverted connection exists (the input signal is inverted before connecting to the gate/output). If $w_{ik}=0$, $\alpha_{lk}=0$, $\pi_{im}=0$, $\phi_{km}=0$, no connection exists. Given n binary input variables, there are a total of $2^n$ possible input configurations, corresponding to the rows of a truth table. When there are don't care (x) conditions, the number of truth table rows is less than $2^n$. Let $x_i^{(j)}$ represent the j-th truth table entry of the i-th input variable, $P_k^{(j)}$, the j-th truth table entry of the output from the k-th gate, and $y_m^{(j)}$, the j-th truth table entry of the m-th output logic function. Let $T_k$ represent the threshold of the k-th M-gate. Introduce the binary variables $w_{ik}^+$, $w_{ik}^-$, $\alpha_{ik}^+$, $\alpha_{ik}^-$, $\pi_{im}^+$, $\pi_{im}^-$, $\phi_{km}^+$, $\phi_{km}^-$, $\beta_{lk}^{(j)+}$, $\beta_{lk}^{(j)-}$ such that $w_{ik}=w_{ik}^+-w_{ik}^-$, $\alpha_{lk}=\alpha_{lk}^+-\alpha_{lk}^-$, $\pi_{im}=\pi_{im}^+-\pi_{im}^-$, $\phi_{km}^+-\phi_{km}^-$, and $\beta_{lk}^{(j)}=\beta_{lk}^{(j)+}-\beta_{lk}^{(j)-}$.

Let binary variable $\mu_{ik}$ represent the presence of a connection from the i-th input variable to the k-th gate, $v_{ik}$, the presence of a connection from the l-th gate to the k-th gate, $X_{im}$, the presence of a connection from the i-th input to the m-th output logic function, and $\psi_{km}$, the presence of a connection from the k-th gate to the m-th output logic function. Let U be a large enough constant. Let $d_k$ be the depth of the k-th gate, where $d_1=1$. Assume D is an upper bound of the depth of the circuit. Let $b_{lk}$, be an auxiliary binary variable that indicates an l-th gate that is one-hop away from the k-th gate (that is, which gate achieves the maximum). Assume $b_k$ is an auxiliary binary variable that indicates a terminal gate on the critical path. The integer variables $d_k$ are encoded into binary variables turning the integer linear program into a binary integer linear program.

The binary integer program is given as the minimization of the objective $$\sum\nolimits_{k=1}^{r}\sum\nolimits_{i=0}^{n}\mu_{ik}+\sum\nolimits_{k=2}^{r}\sum\nolimits_{l=1}^{k-1}v_{lk} \quad \text{(B-1)}$$

subject to the following constraints $$\sum\nolimits_{i=0}^{n} w_{ik}x_i^{(j)} + \sum\nolimits_{l=1}^{k-1}\alpha_{lk}P_l^{(j)} - T_k \geq P_k^{(j)}U - U, \quad \text{(B-2a)}$$

and $$-\sum\nolimits_{i=0}^{n} w_{ik}x_i^{(j)} - \sum\nolimits_{l=1}^{k-1}\alpha_{lk}P_l^{(j)} + T_k - 1 \geq -P_k^{(j)}U, \quad \text{(B-2b)}$$

for each $j=1, 2, \ldots, 2^n$ and $k=1, 2, \ldots, r$, for majority gates or $$\sum\nolimits_{i=0}^{n} w_{ik}x_i^{(j)} + \sum\nolimits_{l=1}^{k-1}\alpha_{lk}P_l^{(j)} - T_k \geq -P_k^{(j)}U, \quad \text{(B-2c)}$$

and $$-\sum\nolimits_{i=0}^{n} w_{ik}x_i^{(j)} - \sum\nolimits_{l=1}^{k-1}\alpha_{lk}P_l^{(j)} + T_k - 1 \geq -P_k^{(j)}U - U, \quad \text{(B-2d)}$$

for each j and k, for minority gates, $$P_k^{(j)} + \alpha_{lk}^+ - 2\beta_{lk}^{(j)} \geq 0, j = 1, 2, \ldots, \quad \text{(B-3a)}$$

$$2^n, k = 1, 2, \ldots, r, l = 1, 2, \ldots, k-1$$

$$P_k^{(j)} + \alpha_{lk}^- - 2\beta_{lk}^{(j)-} \geq 0, j = 1, 2, \ldots, \quad \text{(B-3b)}$$

$$2^n, k = 1, 2, \ldots, r, l = 1, 2, \ldots, k-1$$

$$P_k^{(j)} + \alpha_{lk}^+ - \beta_{lk}^{(j)+} \leq 1, j = 1, 2, \ldots, \quad \text{(B-3c)}$$

$$2^n, k = 1, 2, \ldots, r, l = 1, 2, \ldots, k-1$$

$$P_k^{(j)} + \alpha_{lk}^- - \beta_{lk}^{(j)-} \leq 1, j = 1, 2, \ldots, \quad \text{(B-3d)}$$

$$2^n, k = 1, 2, \ldots, r, l = 1, 2, \ldots, k-1$$

$$w_{ik}^+ + w_{ik}^- \leq \mu_{ik}, i = 0, 1, \ldots, n, k = 1, 2, \ldots, r \quad \text{(B-4a)}$$

$$\alpha_{lk}^+ + \alpha_{lk}^- \leq v_{lk}, k = 1, 2, \ldots, r, l = 1, 2, \ldots, k-1 \quad \text{(B-4b)}$$

$$\pi_{im}^+ + \pi_{im}^- \leq \chi_{im}, i = 0, 1, \ldots, n, m = 1, 2, \ldots, M \quad \text{(B-4c)}$$

$$\phi_{km}^+ + \phi_{km}^- \leq \psi_{km}, k = 1, 2, \ldots, r, m = 1, 2, \ldots, M \quad \text{(B-4d)}$$

$$\sum\nolimits_{i=0}^{n}\chi_{im} + \sum\nolimits_{k=1}^{r}\psi_{km} = 1, m = 1, 2, \ldots, M \quad \text{(B-5)}$$

$$y_m^{(j)} \leq x_i^{(j)} + (1 + \chi_{im}) + (1 - \pi_{im}^+), j = 1, 2, \quad \text{(B-6a)}$$

$$\ldots, 2^n, i = 0, 1, \ldots, n, m = 1, 2, \ldots, M$$

$$x_i^{(j)} \leq y_m^{(j)} + (1 - \chi_{im}) + (1 - \pi_{im}^+), j = 1, 2, \quad \text{(B-6b)}$$

$$\ldots, 2^n, i = 0, 1, \ldots, n, m = 1, 2, \ldots, M$$

$$y_m^{(j)} \leq (1 - x_i^{(j)}) + (1 - \chi_{im}) + \pi_{im}^+, j = 1, 2, \quad \text{(B-6c)}$$

$$\ldots, 2^n, i = 0, 1, \ldots, n, m = 1, 2, \ldots, M$$

$$(1 - x_i^{(j)}) \leq y_m^{(j)} + (1 - \chi_{im}) + \pi_{im}^+, j = 1, 2, \quad \text{(B-6d)}$$

$$\ldots, 2^n, i = 0, 1, \ldots, n, m = 1, 2, \ldots, M$$

$$y_m^{(j)} \leq P_k^{(j)} + (1 - \psi_{km}) + (1 - \phi_{km}^+), j = 1, 2, \quad \text{(B-6e)}$$

$$\ldots, 2^n, k = 1, 2, \ldots, r, m = 1, 2, \ldots, M$$

$$P_k^{(j)} \leq y_m^{(j)} + (1 - \psi_{km}) + (1 - \phi_{km}^+), j = 1, 2, \quad \text{(B-6f)}$$

$$\ldots, 2^n, k = 1, 2, \ldots, r, m = 1, 2, \ldots, M$$

$$y_m^{(j)} \leq (1 - P_k^{(j)}) + (1 - \psi_{km}) + \phi_{km}^+, j = 1, 2, \quad \text{(B-6g)}$$

$$\ldots, 2^n, k = 1, 2, \ldots, r, m = 1, 2, \ldots, M$$

$$(1 - P_k^{(j)}) \leq y_m^{(j)} + (1 - \psi_{km}) + \phi_{km}^+, j = 1, 2, \quad \text{(B-6h)}$$

$$\ldots, 2^n, k = 1, 2, \ldots, r, m = 1, 2, \ldots, M$$

$$\sum\nolimits_{i=0}^{n}\mu_{ik} + \sum\nolimits_{l=1}^{k-1}v_{lk} \leq 1, k = 1, 2, \ldots, r \quad \text{(B-7)}$$

$$\sum\nolimits_{k=l+1}^{r} v_{lk} \leq F, l = 1, 2, \ldots, r - 1 \quad \text{(B-8)}$$

$$T_k = 0.5\left(\sum\nolimits_{i=0}^{n}\mu_{ik} + \sum\nolimits_{l=1}^{k-1}v_{lk} + 1\right), k = 1, 2, \ldots, r \quad \text{(B-9)}$$

$$\geq d_l + 1 - D(1 - v_{lk}), k = 1, 2, \ldots, r, l = 1, 2, \ldots, k-1 \quad \text{(B-10a)}$$

$$d_k \leq d_l + 1 + D(1 - v_{lk}) + D(1 - b_{lk}),$$

$$k = 1, 2, \ldots, r, l = 1, 2, \ldots, k-1$$

$$\sum\nolimits_{l=1}^{k-1} b_{lk} \leq 1 + (k-2)(1 - v_{lk}), k = 1, 2, \ldots, r \quad \text{(B-10c)}$$

$$1 \leq \sum\nolimits_{l=1}^{k-1} b_{lk} + (1 - v_{lk}), k = 1, 2, \ldots, r \quad \text{(B-10d)}$$

$$d \geq d_k, k = 1, 2, \ldots, r \quad \text{(B-11a)}$$

$$d \leq d_k + D(1 - b_k), k = 1, 2, \ldots, r \quad \text{(B-11b)}$$

$$\sum\nolimits_{k=1}^{r} b_k = 1 \quad \text{(B-11c)}$$

While area minimization involves incrementing the number of gates r until all constraints are satisfied, depth minimization involves incrementing the circuit delay d until all constraints are satisfied. This may require a tradeoff of increasing r beyond the minimum gate count.

Figure 22:
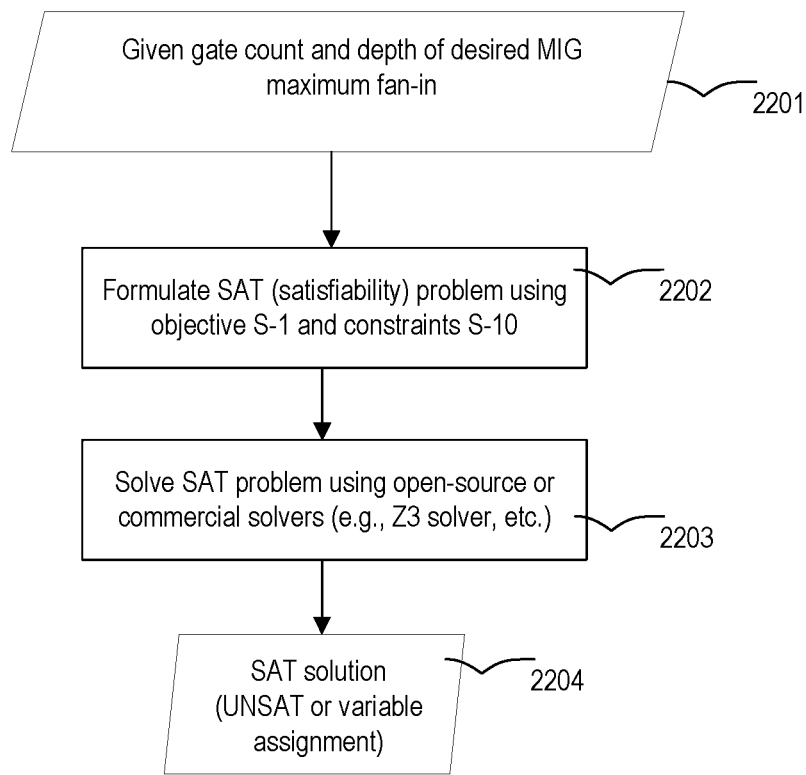
FIG. 22 illustrates a flowchart for synthesis problem formulation as Boolean Satisfiability problem, in accordance with some embodiments.

FIG. 22 illustrates flowchart 2200 for synthesis problem formulation as Boolean Satisfiability (SAT) problem, in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs.

SAT formulation is an alternative step to BIP formulation in the area-oriented and delay-oriented optimal synthesis flows described herein. In some embodiments, the SAT formulation extends the traditional SAT problem by allowing the use of minority gates instead of only majority gates, allowing the use of wide-input, and single/multiple fan-in M-gates.

At block 2201, the CAD tool receives inputs 2201 which include gate count and depth of desired MIG, and maximum fan-in. It then uses these inputs at block 2202 to formulate a SAT (satisfiability) problem using objectives S-1 and constraints S-10. At block 2203, the SAT problem is satisfied using open-source or commercial solvers such as Z3 solver. The output of the solver is the SAT solution (UNSAT) or variable assignment as indicated by block 2204.

Majority/Minority Inverter Graph synthesis can be formulated as a Boolean satisfiability problem with constraints reflective of the PPA requirements.

According to the literature, an MIG of size r over input variables $x_1, x_2, \ldots, x_n$ is a sequence $(x_{n+1}, x_{n+2}, \ldots, X_{n+r})$ of gates that combine previous gates using the majority function $$x_i = <a_1, a_2, a_3> \tag{S-1}$$

for n<i≤n+r, where the three inputs to the gate are defined as $$a_1 = x_{s_{1i}}^{p_{1i}}, a_2 = x_{s_{2i}}^{p_{2i}}, a_3 = x_{s_{3i}}^{p_{3i}}, \tag{S-2}$$

where $0 \leq s_{1i} < s_{2i} < s_{3i} < i$ are indexes pointing to the operands and $0 \leq p_{1i}, p_{2i}, p_{3i} \leq 1$ with $$p_{1i} + p_{2i} + p_{3i} \geq 2 \tag{S-3}$$

are the operands' polarities. The operands are ordered by their index and at most one of the operands is complemented ($P_{ji} = 0$). To represent boolean functions with fan-in less than three e.g., AND and OR gates, the zero variable $x_0 = 0$ is defined. The output logic functions $f_1, f_2, \ldots, f_M$ constrain the output of the gates through $$f_i = x_{s_i}^{p_i} \text{ for } 1 \leq i \leq M,$$

where $0 \leq s_i \leq n+r$ indicates which input variable or gate realizes the i-th output function and $0 \leq p_i \leq 1$ is the output polarity. The depth of the i-th gate is specified as $$l_i = \max\{l_{s_{1i}}, l_{s_{2i}}, l_{s_{3i}}\} + 1 \tag{S-4}$$

for n≤i≤n+r, where the depth of the input variables is set to 0 ($l_i = 0$, for i≤n).

Our formulation extends the literature in two ways. First, we enable the use of either majority or minority gates by representing <.> as either the majority or minority voting function. The minority voting function is the negation of the majority voting function.

Second, and more importantly, we allow wide-input gates with any odd number of inputs greater than or equal to three. To enable wide-input gates, we define the n-input majority function $<.>_n$ either as the conjunction (AND) of the disjunction (OR) of all (n choose (n+1)/2), (n+1)/2-sized combinations of the n inputs $$<a_1, a_2, \ldots, a_n>_n = \bigwedge (a_{s_1} \vee a_{s_2} \vee \ldots \vee a_{s_{(n+1)/2}}) \tag{S-5}$$

or the disjunction of the conjunction of all (n choose (n+1)/2), (n+1)/2-sized combinations of the n inputs $$<a_1, a_2, \ldots, a_n>_n = \bigvee (a_{s_1} \wedge a_{s_2} \wedge \ldots \wedge a_{s_{(n+1)/2}}) \tag{S-6}$$

where ($s_1, s_2, s_{(n+1)/2}$) specifies the indexes of the size (n+1)/2 subset of the input variables. While it is valid to allow each input to be complemented, this will lead to excess inverters in the graph. Because the outputs from the gates can be complemented, not all the inputs should be complementable. To ensure that at most (n−1)/2 operands can be complemented we constrain the input polarities to the i-th gate by the following Boolean expression:

$$<P_{1i}, P_{2i}, \ldots, P_{ni}>_n, \tag{S-7}$$

where $0 \leq P_{1i}, P_{2i}, \ldots, P_{ni} \leq 1$. To allow an M-gate to represent at least two input AND or OR gates, only three operands can be strictly ordered via $s_{ji}$, j=1, 2, ..., n is the input port of the M-gate while i=n+1, n+2, ..., n+r is the gate number. The strict ordering of the last three input ports as in:

$$0 \leq s_{1i} \leq s_{2i} \leq \ldots \leq s_{(n-2)i} < s_{(n-1)i} < s_{ni} < i. \tag{S-8}$$

ensures the flexibility of the M-gate while reducing the redundancy of the representation.

The depth of the i-th gate is now specified as:

$$l_i = \max\{l_{s_{1i}}, l_{s_{2i}}, \ldots, l_{s_{ni}}\} + 1 \tag{S-9}$$

for n<i≤n+r.

The depth of the MIG is the maximum level over all outputs and is given as:

$$\max_{f_i = x_{s_i}^{p_i}} \{l_{s_i}\},$$

and must satisfy the depth constraint:

$$\max_{f_i = x_{s_i}^{p_i}} \{l_{s_i}\} \leq d, \tag{S-10}$$

where d is the desired depth of the MIG.

Figure 23:
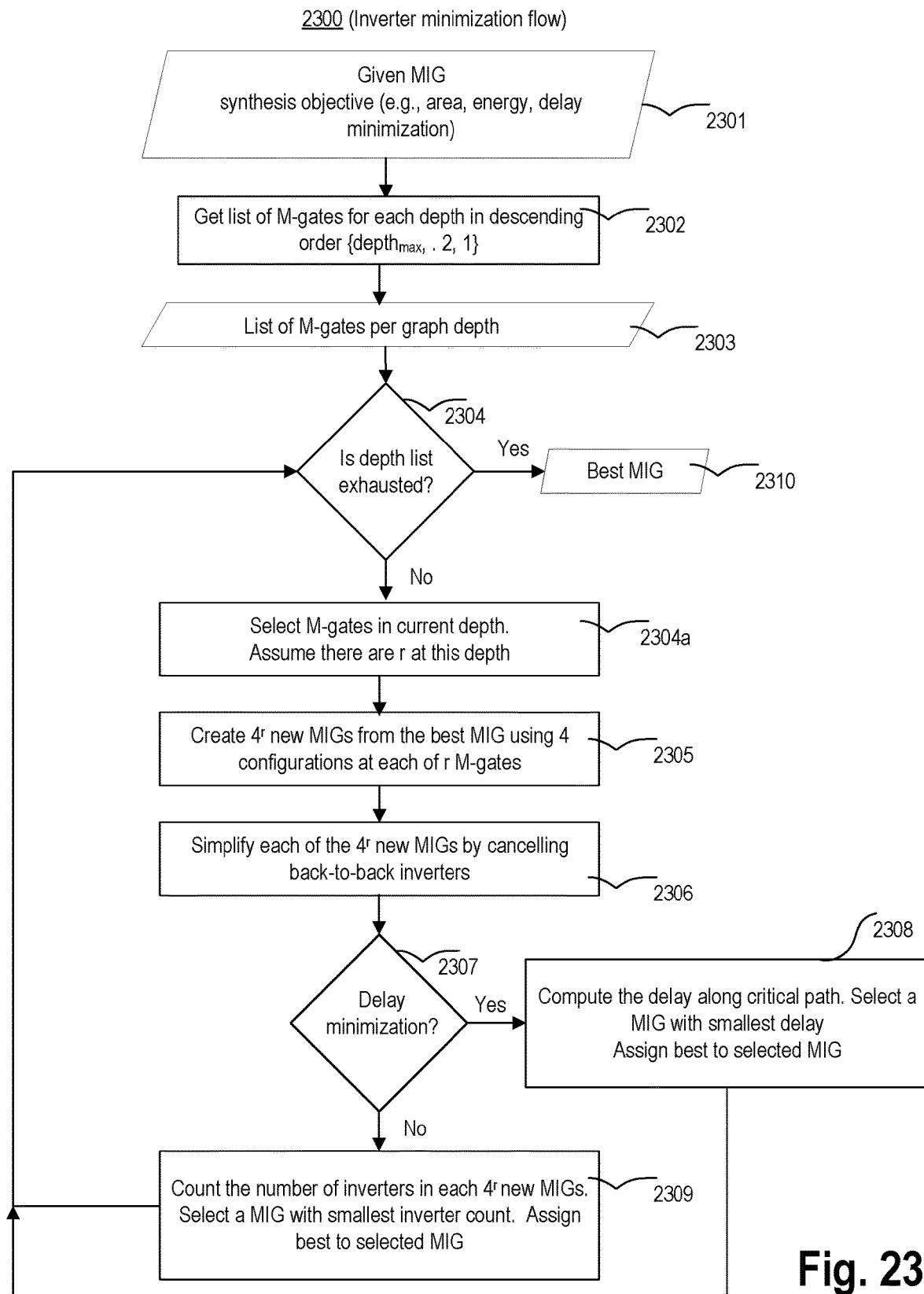
FIG. 23 illustrates a flowchart for inverter minimization flow, in accordance with some embodiments.

FIG. 23 illustrates flowchart 2300 for inverter minimization flow (e.g., 1006 and 1008), in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs. Inverter minimization flow is performed following optimal synthesis 1005 in MIG synthesis flow 1000. Inverter minimization flow is the second stage of logic optimization focusing on the inverter. In some embodiments, inverter minimization flow assumes inverters are less expensive than M-gates and as such does not introduce new M-gates (beyond switching between majority and minority gates) or alter the connection between M-gates (beyond eliminating or introducing an inverter along the connection). Moreover, although the inverter minimization flow is exhaustive, it is efficient, since it is performed in a depth wise manner on small circuits.

At block 2301, the CAD tool receives the input. The input here comprises a MIG and synthesis objective (e.g., area, energy, delay minimization, etc.). With these inputs, the CAD tool at block 2302 gets a list of M-gates for each depth in descending order $\{depth_{max}, \ldots, 2, 1\}$. As such, a list of M-gates per graph depth is collected as indicated by block 2303. In some embodiments, the order for the list of M-gates for each depth is in ascending order. At block 2304, the CAD tool begins an iterative process to find if the number if inverters can be reduced in the whole circuit along its critical path. In this process, the CAD tool processes the list of M-gates per graph depth and determines if inverter optimization is possible. At block 2304a, the CAD tool selects the M-gates in the current depth and assumes that there are 'r' M-gates at this depth. Here, 'r' indicates the width of the current logic depth. If 'r' is too big, then $4^r$ will be huge and the search will be laborious. If all configurations of the entire MIG are considered, r will be the gate count, which can be large, making $4^r$ new MIGs a huge number. The depth wise approach constraints 'r' to be the gate count per logic depth, which will be much smaller than the full circuit's gate count. Due to the equivalence property illustrated in FIG. 24, the depth wise approach gives an equivalent optimal configuration to the full circuit approach, but more efficiently in compute and space. At block 2305, the CAD tool creates $4^r$ new MIGs from the best MIG using the four configurations illustrates in FIG. 24, at each of the r M-gates.

Figure 24:
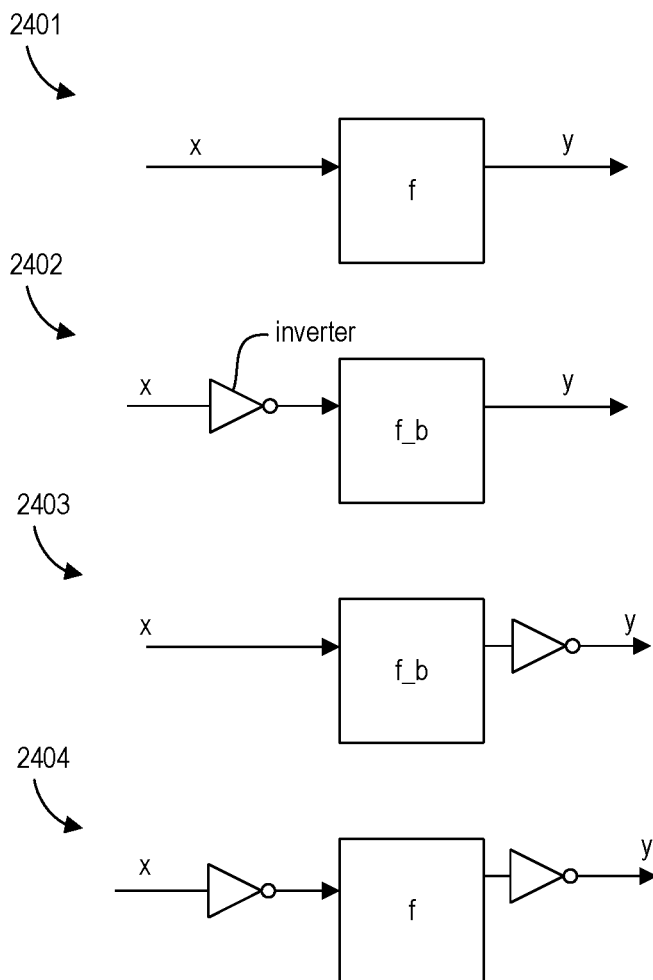
FIG. 24 illustrates equivalent forms of majority and minority function, in accordance with various embodiments.

FIG. 24 illustrates equivalent forms 2400 of majority and minority function, in accordance with various embodiments. Due to the self-duality property of majority or minority functions, functions 2401, 2402, 2403, and 2404 are equivalent, where x are the input bits, y are the output bits, f is the majority/minority function (gate), and f_b is the corresponding minority/majority function. Stated plainly, to maintain the same functionality, an even number of {x, y, f} can be negated. By applying this property from the last level of logic recursively to the input level and keeping track of the inverter count for each application of the self-duality property, one can select a configuration with the minimal inverter count. The levels of logic are obtained by grouping the nodes on the graph by depth. Nodes that have the same depth belong to the same level of logic.

In some embodiments, it is assumed that a M-gate is more expensive in PPA than a CMOS inverter and that there is compatibility between the M-gate technology and CMOS. This is in stark contrast to other beyond CMOS technologies such as QCA which are not compatible with and cannot use CMOS inverters. Such beyond CMOS technologies like Quantum-dot cellular automata (QCA) have native inverter implementation, but such inverters are much more expensive than a majority gate. As such, some embodiments do not allow an increase in the M-gate count during inverter propagation. When counting the number of inverters, it is assumed that the inverters are connected to the source M-gate, so that multiple inverted connections to target M-gates only count as one inverter.

Figure 25:
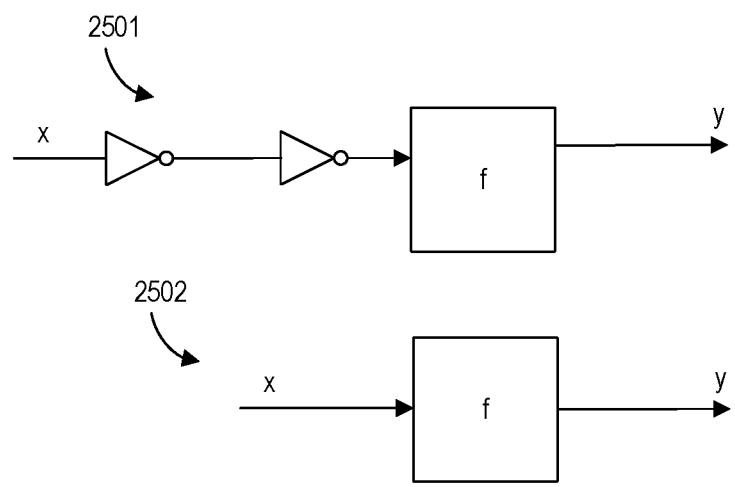
FIG. 25 illustrates the concept of inverter cancellation, in accordance with some embodiments.

Referring back to FIG. 23, at block 2306, the CAD tool simplifies each of the $4^r$ new MIGs by cancelling back-to-back inverters as illustrated in FIG. 25. FIG. 25 illustrates the concept 2500 of inverter cancellation, in accordance with some embodiments. During inverter minimization it can happen that two inverters are between the connection of two M-gates. By the property of inversion, the following two functions are equivalent. Configuration 2501 can be minimized to configuration 2502. As such, the back-to-back inverters cancel each other, leading to an inverter count decrease of 2. To avoid explosion in computation, inverter propagation is performed after the synthesis of each K-MIG as opposed to after the synthesis of the full logic circuit, in accordance with some embodiments.

Referring back to FIG. 23, at block 2307, the CAD tool determines whether the synthesis objective is delay minimization. If delay minimization is the primary synthesis objective, the process proceeds to block 2308 where the delay along the timing critical path is computed. At block 2308, a MIG is selected with the smallest delay, and the best MIG is assigned as the selected MIG. The process then proceeds to block 2304 to perform inverter minimization for the next graph depth. If at block 2307, the CAD tool determines that delay minimization is not the primary synthesis objective (e.g., the objective is area or energy), the process proceeds to block 2309. At block 2309, the CAD tool counts the number of inverters in each of the $4^r$ new MIGs, and selects a MIG with the smallest inverter count. The CAD tool then assigns the best MIG to the selected MIG. The process then moves to block 2304 to check whether the entire depth list is processed for inverter minimization. If so, then the last selected MIG is the best MIG as indicated by block 2310. This selected MIG is minimized for inverters. In some embodiments, a similar process can also be performed for buffers (e.g., for buffer minimization).

Figure 26A:
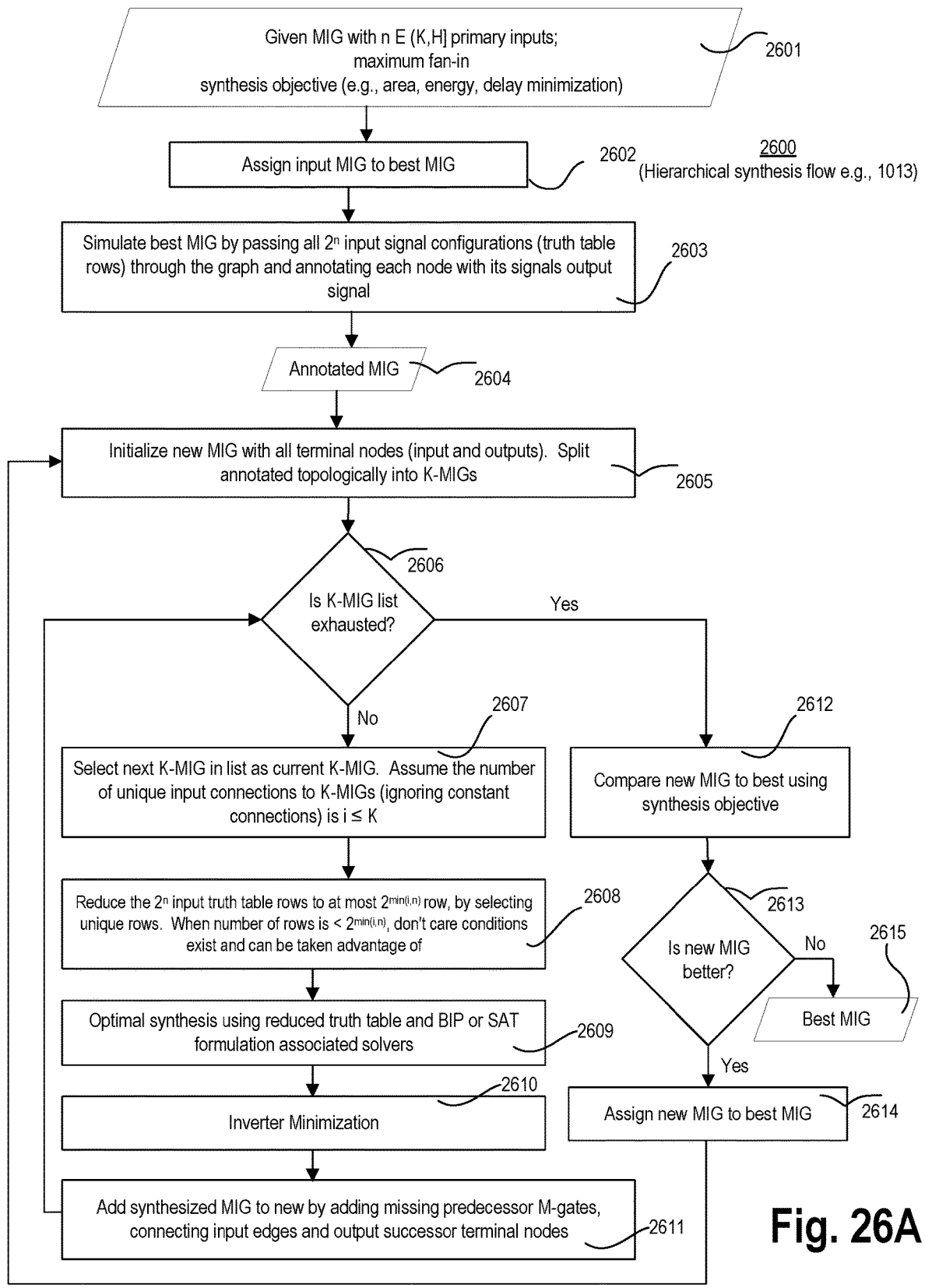
FIG. 26A illustrates a flowchart of hierarchical synthesis flow, in accordance with some embodiments.

FIG. 26 illustrates flowchart 2600 of hierarchical synthesis flow (e.g., 1008 and 1013), in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs. Hierarchical synthesis flow is a process in the MIG synthesis flow of FIGS. 10A-B. Hierarchical synthesis is used for larger circuits for which optimal synthesis using FIG. 10A becomes time consuming, in accordance with some embodiments.

At block 2601, the CAD tool receives inputs including MIG with n primary inputs, where n belongs to (K,H]. The inputs also include maximum fan-in and synthesis objective (e.g., area, energy, delay minimization). The CAD tool then assigns the input MIG to the best MIG at block 2602. When a logic circuit has ≤H input bits, then at block 2603, the CAD tool simulates the initialized MIG and annotates each edge in the graph with its truth table (signal). Note that the truth tables of the output edges from the graph represent output of the logic circuit. The CAD tool simulates the best MIG by passing all $2^n$ input signal configurations (truth table input rows) through the graph and annotates each node with its input signals and output signal. The output of block 2603 is the annotated MIG as indicated by block 2604. Here, $2^H$ represents the largest truth table that should be computed and stored in memory for each edge in the graph. Hierarchical synthesis flow takes advantage of don't care conditions (rows of truth table that can be ignored during synthesis) in the internal subgraphs of MIG to further decrease PPA of the synthesized circuit. This occurs because as signals flow from the primary inputs of a circuit into its internal sections, the signals are shaped such that not all possibilities available at the periphery are present on the circuit's interior.

When a logic circuit has more than H input bits, the CAD tool first topologically splits its underlying MIG into non-overlapping subgraphs, such that the number of input edges (bits) to each subgraph is less than or equal to H. Each of these subgraphs are called an H-MIG. This makes it computationally feasible for the CAD tool to simulate each H-MIG, annotate its edges with truth tables (signals), and take advantage of don't care conditions in synthesizing the H-MIG. In some embodiments, the synthesis of the H-MIGs are independent and can be performed in parallel. To ensure that the dependency structure of the logic components (nodes in the graph) is maintained, the nodes in the graph are first topologically sorted before they are segmented into H-MIGs, in accordance with some embodiments. The segmentation can be done greedily by adding nodes to a subgraph until the input bit condition of ≤H is satisfied. It can also be done using other graph-cut heuristics, in accordance with some embodiments. In some embodiments, each H-MIG can be considered a smaller logic circuit. The edges connected to input pins of the original logic circuit or nodes in other upstream H-MIGs represent the input pins to the current H-MIG. The edges connected to output pins of the original logic circuit or nodes in other downstream H-MIGs represent the output pins from the current H-MIG.

Each H-MIG cannot be synthesized optimally due to NP hardness, so in some embodiments, the CAD tool splits it into smaller synthesizable graphs called K-MIGs (or K-feasible cones, K-subgraphs) as indicated by block 2605. In block 2605, the new MIG is initialized with all terminal nodes (inputs and outputs). The CAD tool then splits annotated MIG topologically into K-MIGs. In computational complexity theory, NP-hardness is the defining property of a class of problems. This class of problems are informally at least as hard as the hardest problems in NP. A simple example of an NP-hard problem is the subset sum problem. Greedy algorithm or area or delay-oriented heuristics can be used to create the set of K-MIGs, in accordance with some embodiments. The greedy algorithm splits the H-MIG into K-MIGs by adding nodes to a subgraph until the input bit condition of ≤K is satisfied. At block 2606, an iterative process begins where the K-MIG list from block 2605 is processed till its exhausted. At block 2607, the next K-MIG is selected in the list as the current K-MIG. Here, the number of input edges to the K-MIGs is i≤K.

At block 2608, the CAD tool reduces the $2^n$ input truth table rows to at most $2^{min(i,n)}$ row, by selecting the unique rows. When the number of unique rows is $<2^{min(i,n)}$, don't care conditions exist and can be taken advantage of Each of the i inputs to a K-MIG will have $2^n$ entries (a truth table column) because n primary inputs to an H-MIG results in $2^n$ input signal configurations (truth table rows). Let us consider the $2^n$-bit long bit strings for each of the i unique input connections (ignoring constant connections) to the K-MIG as the inputs in a new truth table for the K-MIG and the $2^n$-bit long bit strings for each of the output connections emanating from the K-MIG as the truth table outputs. The K-MIG's truth table has i input columns. This implies that at most $2^{min(i,n)}$ of the rows can be unique. In some embodiments, the number of unique truth table rows will be less than $2^{min(i,n)}$, which amounts to less restrictions in synthesizing the K-MIG and ultimately a more compact circuit. At block 2609, the CAD tool performs optimal synthesis using reduced truth table and BIP or SAT formulation and associated solvers.

Figure 26B:
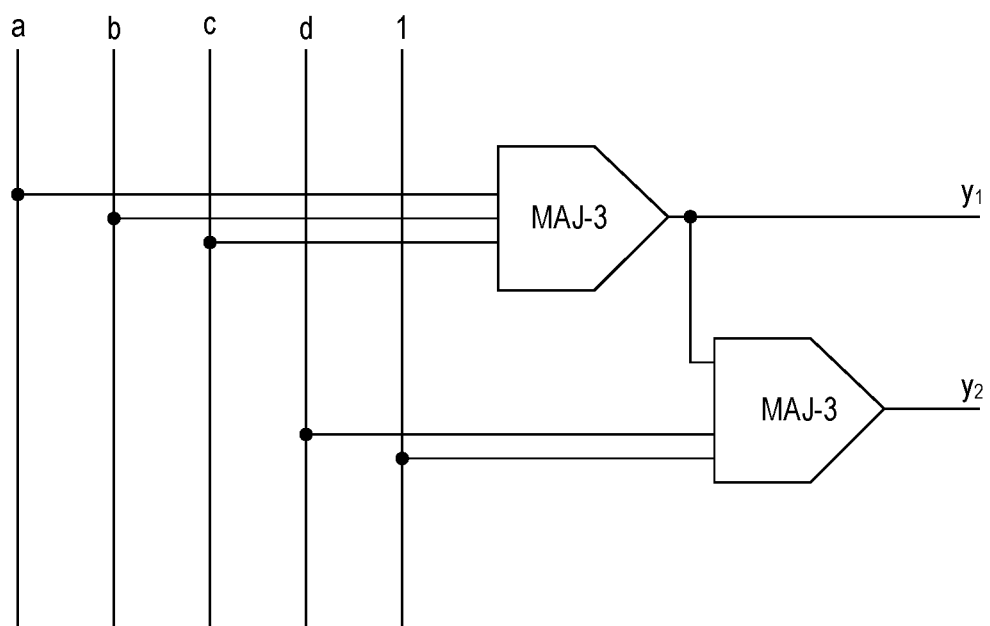
FIG. 26B illustrates majority-3 OR gate, in accordance with some embodiments.

To illustrate the reduction of the truth table from $2^n$ rows to $\leq 2^{min(i,n)}$ rows for a K-MIG with i unique input connections (ignoring constant connections), consider the MIG for a Majority-OR circuit 2620 in FIG. 26B. Assume the full circuit is an H-MIG and the second majority gate (an OR gate) with its inputs and output in the dashed box is a K-MIG. In this example, n=4 and i=2 (note, here constant inputs don't count as input variables). The H-MIG truth table has 16 rows as shown in Table 2. Extracting the inputs and output columns of the K-MIG from the overall truth table, we obtain the truth table for the K-MIG is obtained as shown in Table 3. Removing duplicate rows, we obtain the reduced truth table shown in Table 4, which has 4 rows.

TABLE 2

Overall truth table

| a | b | c | d | 1 | $Y_1$ | $Y_2$ |
|---|---|---|---|---|---|---|
| 1 | 1 | 1 | 1 | 1 | 1 | 1 |
| 0 | 1 | 1 | 1 | 1 | 1 | 1 |
| 1 | 0 | 1 | 1 | 1 | 1 | 1 |
| 0 | 0 | 1 | 1 | 1 | 0 | 1 |
| 1 | 1 | 0 | 1 | 1 | 1 | 1 |
| 0 | 1 | 0 | 1 | 1 | 0 | 1 |
| 1 | 0 | 0 | 1 | 1 | 0 | 1 |
| 0 | 0 | 0 | 1 | 1 | 0 | 1 |
| 1 | 1 | 1 | 0 | 1 | 1 | 1 |
| 0 | 1 | 1 | 0 | 1 | 1 | 1 |
| 1 | 0 | 1 | 0 | 1 | 1 | 1 |
| 0 | 0 | 1 | 0 | 1 | 0 | 0 |
| 1 | 1 | 0 | 0 | 1 | 1 | 1 |
| 0 | 1 | 0 | 0 | 1 | 0 | 0 |
| 1 | 0 | 0 | 0 | 1 | 0 | 0 |
| 0 | 0 | 0 | 0 | 1 | 0 | 0 |

TABLE 3

OR (second majority gate) truth table extracted from overall truth table

| d | 1 | $Y_1$ | $Y_2$ |
|---|---|---|---|
| 1 | 1 | 1 | 1 |
| 1 | 1 | 1 | 1 |
| 1 | 1 | 1 | 1 |
| 1 | 1 | 0 | 1 |
| 1 | 1 | 1 | 1 |

TABLE 3-continued

OR (second majority gate) truth table extracted from overall truth table

| d | 1 | $Y_1$ | $Y_2$ |
|---|---|---|---|
| 1 | 1 | 0 | 1 |
| 1 | 1 | 0 | 1 |
| 1 | 1 | 0 | 1 |
| 0 | 1 | 1 | 1 |
| 0 | 1 | 1 | 1 |
| 0 | 1 | 1 | 1 |
| 0 | 1 | 0 | 0 |
| 0 | 1 | 1 | 1 |
| 0 | 1 | 0 | 0 |
| 0 | 1 | 0 | 0 |
| 0 | 1 | 0 | 0 |

TABLE 4

OR reduced truth table

| d | 1 | $Y_1$ | $Y_2$ |
|---|---|---|---|
| 1 | 1 | 1 | 1 |
| 1 | 1 | 0 | 1 |
| 0 | 1 | 1 | 1 |
| 0 | 1 | 0 | 0 |

After synthesizing each K-MIG followed by inverter minimization at block 2610, the CAD tool connects the optimal K-MIG to other optimally synthesized K-MIGs within a new H-MIG, using their input and output edges (ports). At block 2611, the CAD tool adds synthesized MIG to new MIG by adding missing predecessor M-gates, connecting input edges to predecessor M-gates, and output edges to successor terminal output nodes. For circuits with input bits >H, once each new H-MIG is synthesized in parallel, the H-MIGs are connected with each other to create a new bigger MIG. Once the new H-MIG (e.g., circuit with input bits ≤H) or MIG (e.g., circuit with input bits >H) is created, then at block 2612 the new H-MIGs/MIG is compared to the current best H-MIG/MIG based on the synthesis PPA objective. At block 2613, the CAD tool decides about the H-MIG/MIG. If the new H-MIG/MIG is better, it becomes the new best H-MIG/MIG and the optimization is repeated as indicated by blocks 2614 and 2606. However, if the CAD tool determines at block 2613 the new H-MIG/MIG is worse, the optimization is terminated, and the best H-MIG/MIG is retuned as the optimal MIG as indicated as bock 2615.

Figure 27:
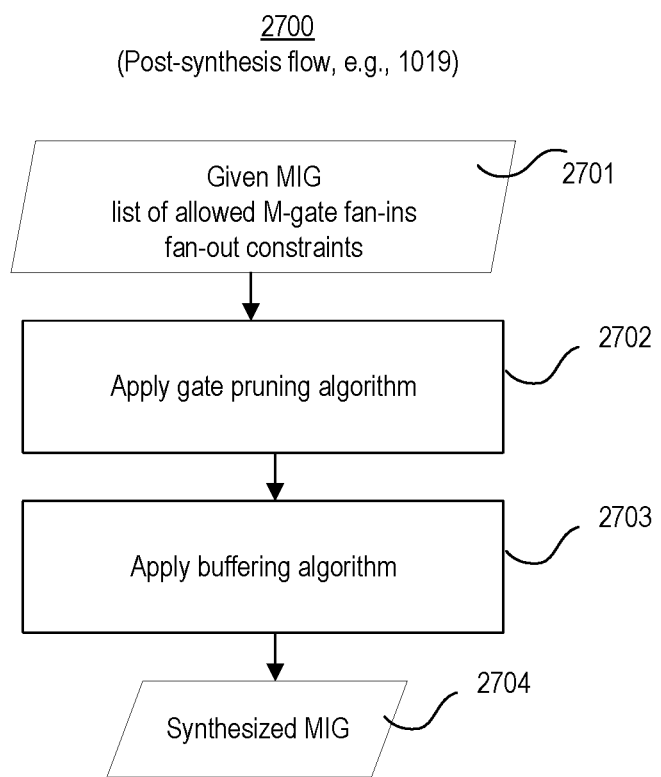
FIG. 27 illustrates a flowchart for post-synthesis flow, in accordance with some embodiments.

FIG. 27 illustrates flowchart 2700 for post-synthesis flow (e.g., 1019), in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs. Post-synthesis flow of flowchart 2700 is performed by MIG synthesis of FIGS. 10A-B. The post-synthesis flow of flowchart 2700 ensures that the fan-in and fan-out requirements are observed by the overall synthesis flow. Flowchart 2700 begins with inputs 2701 which include a given MIG, a list of allowed M-gate fan-ins, and M-gate fan-out constraints. At block 2702, the CAD tool applies a gate pruning algorithm of FIG. 28. At block 2703, the CAD tool applies a buffering algorithm of FIG. 29. The output after applying the gate pruning algorithm and the buffering algorithm is the synthesized MIG as indicated by block 2704.

Figure 28:
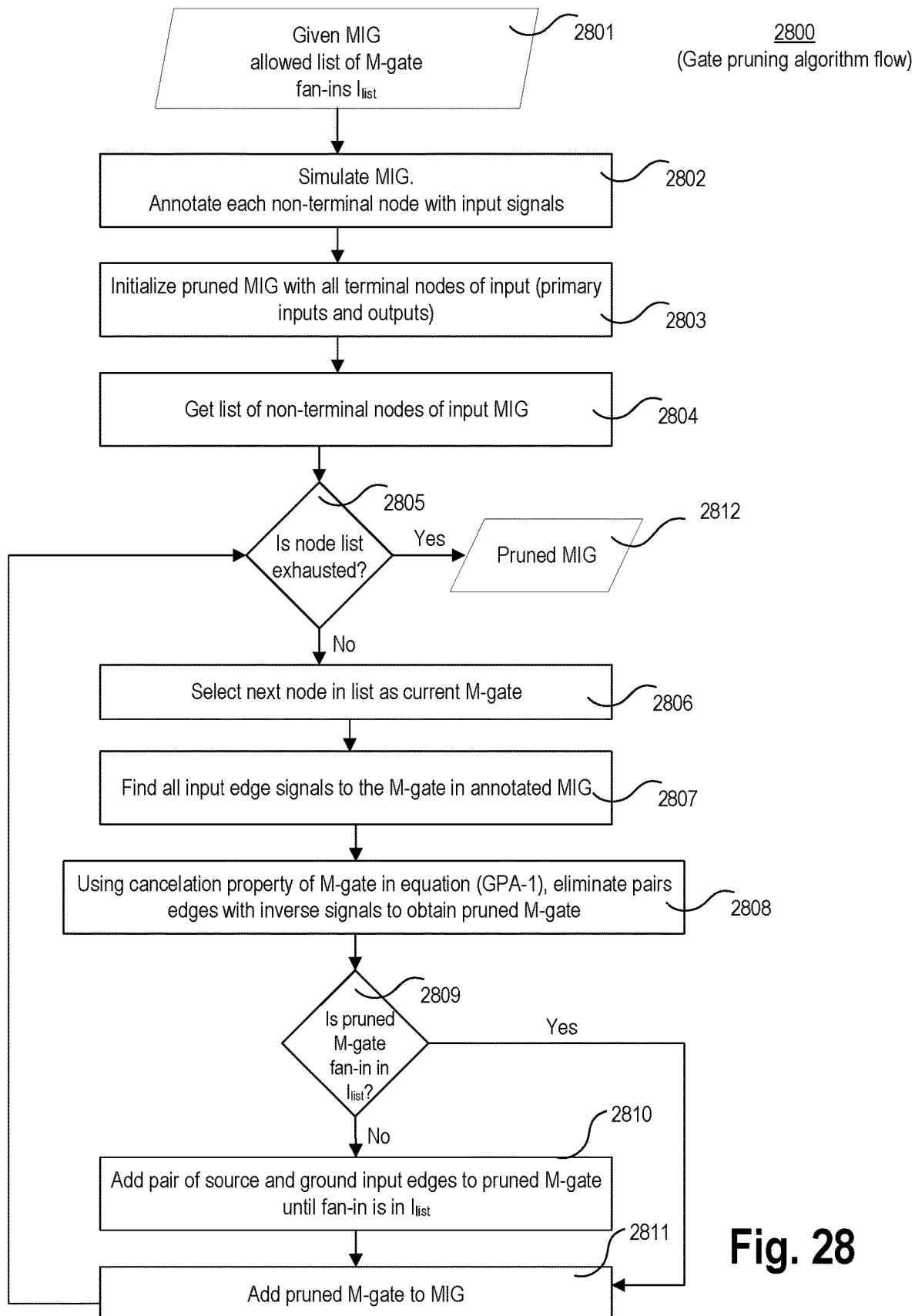
FIG. 28 illustrates a flowchart for gate pruning algorithm flow, in accordance with some embodiments.

FIG. 28 illustrates flowchart 2800 for gate pruning algorithm flow, in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs.

After the BIP/SAT solution is obtained and translated into an MIG, each gate can be simplified to the smallest possible input width (fan-in) by pruning input connections or expanded to the next larger allowed fan-in by using the gate pruning algorithm of flowchart 2800. At block 2801, the CAD tool receives input to simulate the MIG. The inputs include a given MIG, allowed list of M-gate fan-ins OW. At block 2802, the CAD tool simulates the MIG, and annotates each non-terminal node with input signals. At block 2803, the CAD tool initializes pruned MIG with all terminal nodes of input (e.g., primary inputs and outputs). At block 2804, the CAD tool gets a list of non-terminal nodes of input MIG. The CAD tool then starts an iterative process (blocks 2805 through 2811). Given a majority or minority inverter graph, each gate is simplified to the smallest possible width by pruning input connections using the following relation for M-gates:

$$M(x_1, x_2, \ldots, x_j, x_{j+1}, \overline{x_{j+1}}, x_{j+2}, \ldots, x_I) = M(x_1, x_2, \ldots, x_j, x_{j+2}, \ldots, x_I).\quad \text{(GPA-1)}$$

When a signal and its inverted form are inputs to an I-input M-gate, the pruned version will be an (I-2)-input gate. This pruning can be performed until no pair of signals and their inverted form remain. In some embodiments, if a single fan-in is desired for circuit uniformity, following the gate pruning, a pair of source and ground signals can be connected to each pruned M-gate until the maximum fan-in is achieved. This corresponds to applying equation GPA-1 in reverse, from right to left, where $x_{j+1}$ is the ground signal.

At block 2805, the CAD tool checks if the list of non-terminal nodes of input MIG is exhausted (e.g., all items in the list are processed). In the beginning of the flow, the CAD tool proceeds to block 2806 since it begins to process the list of non-terminal nodes. At block 2806, the CAD tool selects the net node in the list as the current M-gate. At block 2807, the CAD tool finds all input edge signals to the M-gate in the annotated MIG. At block 2808, the CAD tool, using the cancellation property of M-gate in equation (GPA-1), eliminates pairs edges with inverse signals to obtain pruned M-gate. At block 2809, the CAD tool makes a determination whether the pruned M-gate fan-in is in the $I_{list}$. If the pruned M-gate fan-in is not in the $I_{list}$, the process proceeds to block 2810 where the CAD tool adds a pair of source and ground input edges to the pruned M-gate until the fan-in is in the $I_{list}$. At block 2811, the CAD tool adds the pruned M-gate to the MIG. The process is repeated for all the non-terminal nodes of the input MIG. Once all the non-terminal nodes in the list are exhausted, a pruned MIG is achieved as indicated by block 2812.

Figure 29:
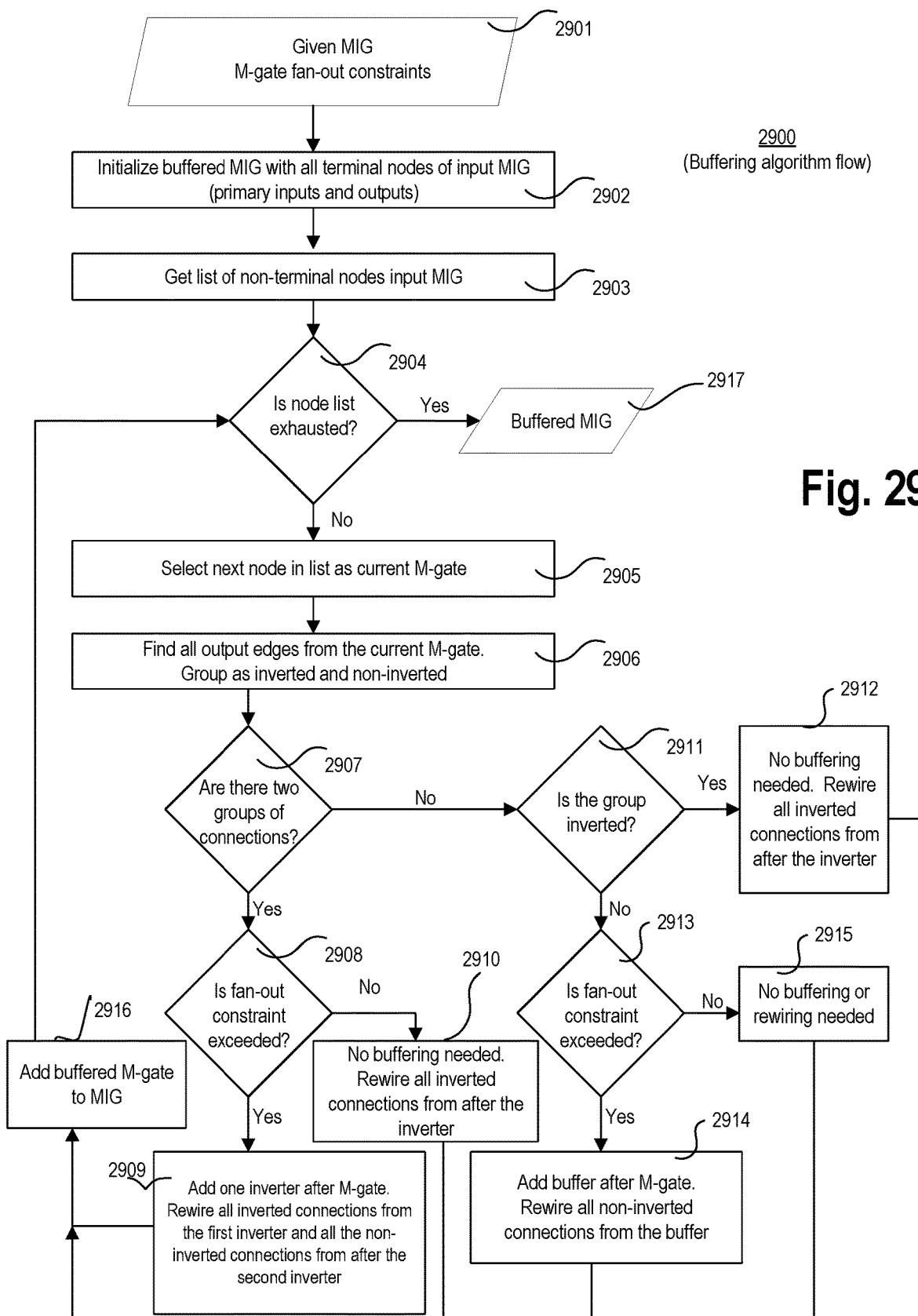
FIG. 29 illustrates a flowchart for buffering algorithm flow, in accordance with some embodiments.

FIG. 29 illustrates flowchart 2900 for buffering algorithm flow, in accordance with some embodiments. While various blocks are shown in a particular order, the order can be modified. For example, some blocks can be performed before others or performed simultaneously. The various blocks can be performed by software, hardware, or a combination of both. Here, the trapezoidal shaped blocks are inputs or outputs. In some embodiments, to address the fan-out constraints on M-gates, it is assumed that there are no fan-out constraints and perform the synthesis. In the buffering algorithm of the post-synthesis flow shown in flowchart 2900, this assumption is modified or corrected by introducing inverters and buffers as needed to ensure the functionality of the circuit. When all outward connections (fan-out) from each M-gate are considered, if one of the connections is inverted, an inverter is already present in the circuit. As such, only one more inverter may be needed to buffer the non-inverted connections. On the other hand, if there are no inverted connections, a buffer (e.g., two inverters connected back-to-back) may be used.

At block 2901, the CAD tool receives input 2901 which includes the MIG and M-gate fan-out constraints. At block 2902, the CAD tool initializes the buffered MIG with all terminal nodes of input MIG (e.g., primary inputs and outputs). At block 2903, the CAD tool gets a list of non-terminal nodes of input MIG. The iterative process then begins at block 2904, and the CAD tool checks whether the list of nodes is exhausted. At block 2904, if the CAD tool determines that the list is not exhausted (or processed), then at block 2905 the CAD tool selects the next node in the list as the current M-gate. At block 2906, the CAD tool finds all output edges from the current M-gate group as inverted and non-inverted. At block 2907, the CAD tool determines whether there are two groups of connections. If there are two groups of connections, then at block 2908, the CAD tool determines whether the fan-out constraint exceeded. If the fan-out constraint exceeded, then at block 2909, the CAD tool adds one inverter after the M-gate. The CAD tool then re-wires all inverted connections after the first inverter and all the non-inverted connections from after the second inverter. At block 2916, the CAD tool adds the buffered M-gate to the MIG and the process repeats.

If the fan-out constrain is not exceeded, then at block 2910, the CAD tool decides not to add buffers (e.g., no buffering needed). The CAD tool then rewires all inverted connections from after the inverter. The process then proceeds to block 2916, where the CAD tool adds the buffered M-gate to the MIG and the process repeats. If there are no two groups of connections (see block 2907), then the process proceeds to block 2911 where the CAD tool determines whether the group is inverted. If the group is inverted, then at block 2912, the CAD tool decides that no buffering is needed, and rewires all inverted connections from after the inverter. The process then proceeds to block 2916, where the CAD tool adds the buffered M-gate to the MIG and the process repeats.

If the group is inverted (see block 2911), then at block 2913 the CAD tool determines whether the fan-out constraint is exceeded. If the fan-out constraint is exceeded, then at block 2914, the CAD tool adds buffer after M-gate and rewires all non-inverted connections from the buffer. The process then proceeds to block 2916, where the CAD tool adds the buffered M-gate to the MIG and the process repeats. If the fan-out constraint is not exceeded (see block 2913), then at block 2915, the CAD tool decides that no buffering or rewiring is needed. The process then proceeds to block 2916, where the CAD tool adds the buffered M-gate to the MIG and the process repeats. After the CAD tool determines that the node list is exhausted (see block 2904), the buffered MIG is provided as indicated by block 2917.

Figure 30:
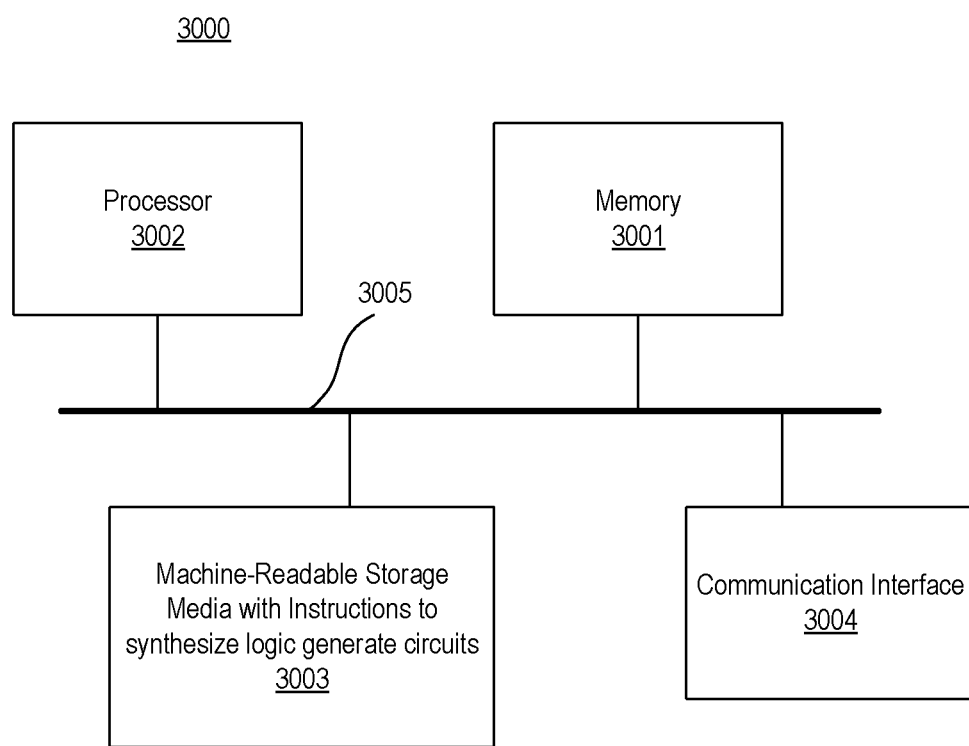
FIG. 30 illustrates a processor system with machine-readable storage media having instructions that when executed cause the processor to perform logic synthesis, in accordance with various embodiments.

FIG. 30 illustrates processor system 3000 with machine-readable storage media having instructions that when executed cause the processor to perform logic synthesis, in accordance with various embodiments. Elements of embodiments (e.g., the various flowcharts described herein) are also provided as a machine-readable medium (e.g., memory) for storing the computer-executable instructions (e.g., instructions to implement any other processes discussed herein). In some embodiments, computing platform 3000 comprises memory 3001, processor 3002, machine-readable storage media 3003 (also referred to as tangible machine-readable medium), communication interface 3004 (e.g., wireless or wired interface), and network bus 3005 coupled together as shown.

In some embodiments, processor 3002 is a Digital Signal Processor (DSP), an Application Specific Integrated Circuit (ASIC), a general-purpose Central Processing Unit (CPU), or a low power logic implementing a simple finite state machine to perform the method of the various flowcharts, etc.

In some embodiments, the various logic blocks of system 3000 are coupled together via network bus 3005. Any suitable protocol may be used to implement network bus 3005. In some embodiments, machine-readable storage medium 3003 includes instructions (also referred to as the program software code/instructions) for logic synthesis of a mix of CMOS gates and majority and minority logic circuits as described with reference to various embodiments and flowchart.

Program software code/instructions associated with the flowcharts (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with the flowcharts of various embodiments are executed by system 3000.

In some embodiments, the program software code/instructions associated with the flowcharts of various embodiments are stored in a computer executable storage medium 3003 and executed by processor 3002. Here, computer executable storage medium 503 is a tangible machine-readable medium that can be used to store program software code/instructions and data that, when executed by a computing device, causes one or more processors (e.g., processor 3002) to perform a method(s) as may be recited in one or more accompanying claims directed to the disclosed subject matter.

The tangible machine-readable medium 3003 may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions associated with the various flowcharts and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine-readable medium in entirety at a particular instance of time.

Examples of tangible computer-readable media 3003 include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine-readable medium 3003 includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Android®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 31:
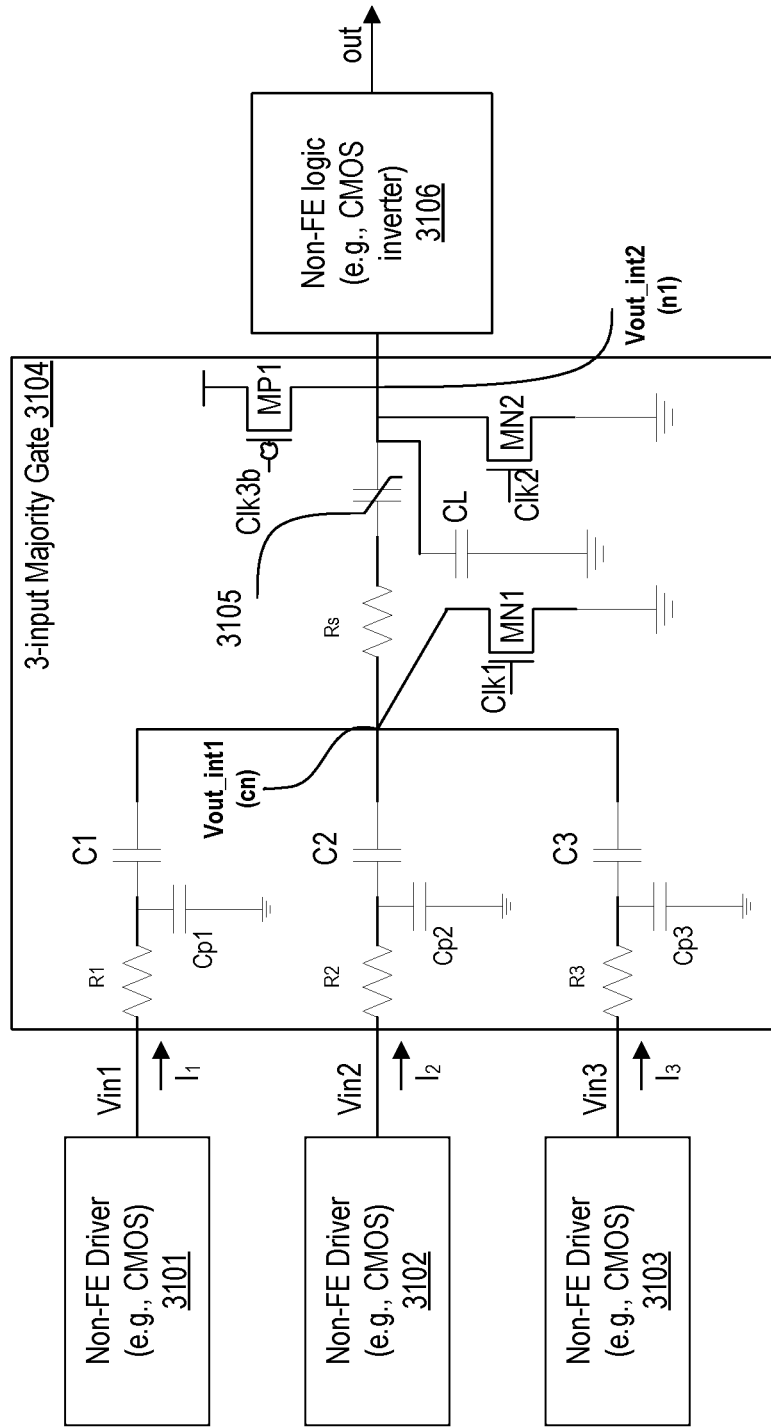
FIG. 31 illustrates a 3-input majority gate with linear input capacitors and a non-linear output capacitor, in accordance with some embodiments.

FIG. 31 illustrates 3-input majority gate 3100 with linear input capacitors and a non-linear output capacitor, in accordance with some embodiments. Logic Gate 3100 comprises first, second, and third drivers 3101, 3102, and 3103, respectively. These drivers can be analog drivers generating analog signals or digital drivers generating signals that toggle between ground and the power supply rail, or a combination of analog or digital drivers. For example, driver 3101 is a CMOS driver such as a buffer, inverter, a NAND gate, NOR gate, etc., while driver 3102 is an amplifier generating a bias signal. The drivers provide input signals Vin1 (and current $I_1$), Vin2 (and current $I_2$), and Vin3 (and current $I_3$) to the three inputs of 3-input majority gate 3104.

In various embodiments, 3-input majority gate 3104 comprises three input nodes Vin1, Vin2, and Vin3. Here, signal names and node names are interchangeably used. For example, Vin1 refers to node Vin1 or signal Vin1 depending on the context of the sentence. 3-input majority gate 3103 further comprises capacitors C1, C2, and C3. Here, resistors R1, R2, and R3 are interconnect parasitic resistances coupled to capacitors C1, C2, and C3 respectively. In various embodiments, capacitors C1, C2, and C3 are non-ferroelectric capacitors. In some embodiments, the non-ferroelectric capacitor includes one of: dielectric capacitor, para-electric capacitor, or non-linear dielectric capacitor.

A dielectric capacitor comprises first and second metal plates with a dielectric between them. Examples of such dielectrics are: HfO, ABO3 perovskites, nitrides, oxy-fluorides, oxides, etc.

A para-electric capacitor comprises first and second metal plates with a para-electric material between them. In some embodiments, f-orbital materials (e.g., lanthanides) are doped to the ferroelectric materials to make paraelectric material. Examples of room temperature paraelectric material include: SrTiO3, Ba(x)Sr(y)TiO3 (where x is −0.5, and y is 0.95)), HfZrO2, Hf—Si—O, La-substituted PbTiO3, PMN-PT based relaxor ferroelectrics.

A dielectric capacitor comprises first and second metal plates with non-linear dielectric capacitor between them. The range for dielectric constant is 1.2 to 10000. The capacitors C1, C2, and C3 can be implemented as MIM (metal-insulator-metal) capacitor technology, transistor gate capacitor, hybrid of metal capacitors or transistor capacitor. The capacitors C1, C2, and C3 can be implemented as MIM (metal-insulator-metal) capacitor technology, transistor gate capacitor, or hybrid of metal capacitors or transistor capacitor.

One terminal of the capacitors C1, C2, and C3 is coupled to a common node cn. This common node is coupled to node n1, which is coupled to a first terminal of a non-linear polar capacitor 3105. The majority function is performed at the common node cn, and the resulting voltage is projected on to capacitor 3105. For example, the majority function of the currents ($I_1$, $I_2$, and $I_3$) on node cn results in a resultant current that charges capacitor 105. Table 5 illustrates the majority function f(Majority Vin1, Vin2, Vin3).

TABLE 5

| Vin1 | Vin2 | Vin3 | cn (f(Majority Vin1, Vin2, Vin3)) |
|------|------|------|-----------------------------------|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

Figure 32:
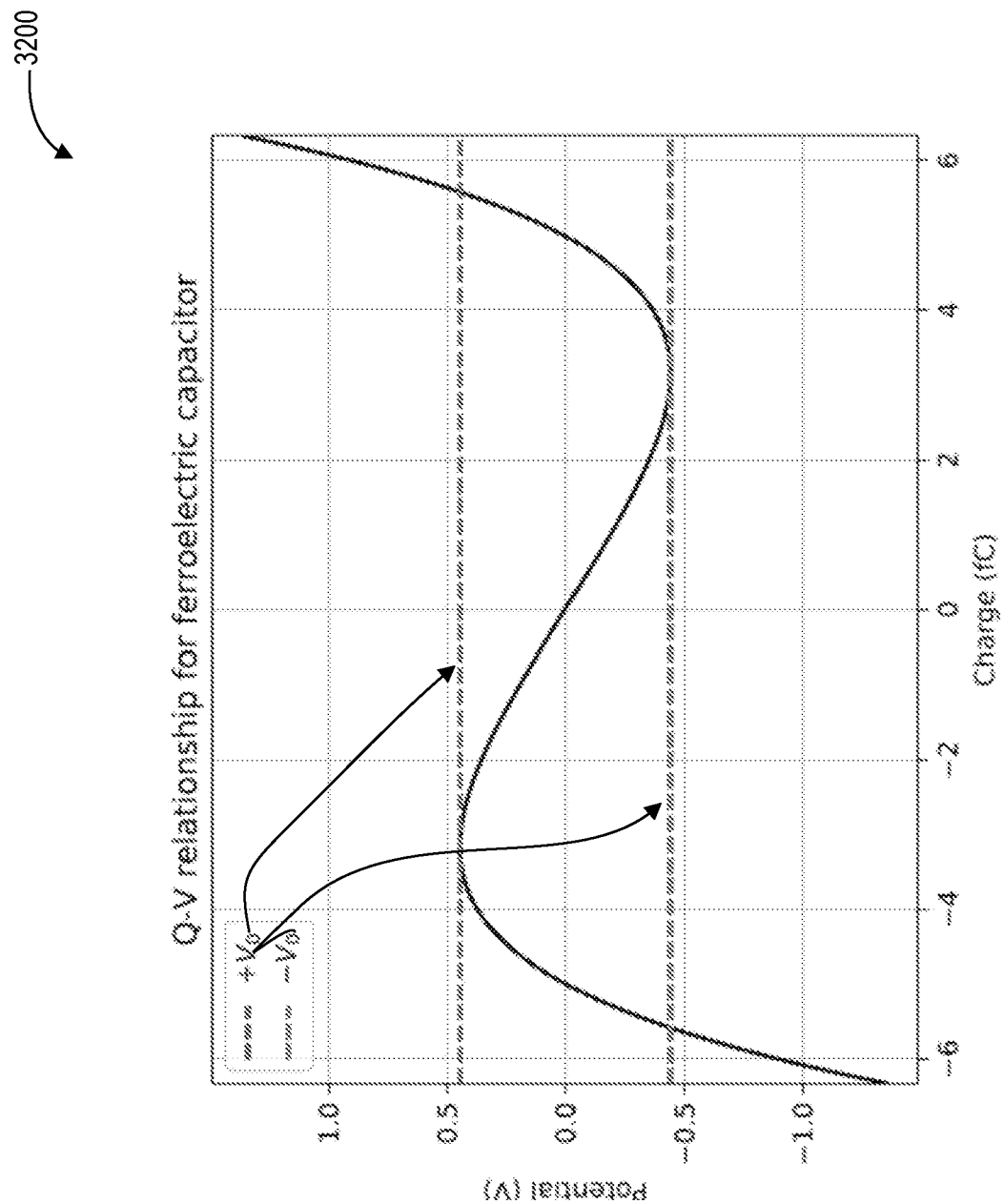
FIG. 32 illustrates a plot showing Q-V relationship for ferroelectric capacitor, in accordance with some embodiments.

A capacitor with FE material (also referred to as a FEC) is a non-linear capacitor with its potential $V_F(Q_F)$ as a cubic function of its charge. FIG. 32 illustrates plot 3200 showing characteristics of a FEC. Plot 3200 is a charge-voltage (Q-V) plot for a block f Pb(Zr$_{0.5}$Ti$_{0.5}$)O$_3$ of area (100 nm)$^2$ and thickness 20 nm (nanometer). Plot 3200 shows local extrema at $+/-V_o$ indicated by the dashed lines. Here, the term $V_c$ is the coercive voltage. In applying a potential V across the FEC, its charge can be unambiguously determined only for $|V|>V_o$. Otherwise, the charge of the FEC is subject to hysteresis effects.

Referring back to FIG. 31, in some embodiments, N odd number of capacitors are coupled to a single FEC to form a majority gate. In this case, N=3. The measured charge on the FEC ($Q_F$) is the output of the majority gate. Solving for a steady-state solution, the parasitic resistors are ignored and the input potentials Vi (or Vin) are assumed to be constant. In this case, the charge across each linear capacitor (C1, C2, C3) is:

$$Q_i = C_i \cdot (V_i - V_F) \tag{1}$$

The charge summed at node Cn and across FEC 105 is express as:

$$Q_F = \sum_i Q_i \tag{2}$$

$$Q_F = \sum_i C_i V_i - \sum_i C_i V_F \tag{3}$$

$$Q_F = \sum_i C_i V_i - C V_F(Q_F) \tag{4}$$

$$V_F(Q_F) = \sum_i \frac{C_i}{C} V_i - \frac{Q_F}{C} \tag{5}$$

Here, $C = \Sigma_i C_i$ is the sum of the capacitances. In the limit, $C \to \infty$, the following is achieved:

$$V_F(Q_F) = \sum_i \frac{C_i}{C} V_i = \overline{V} \tag{6}$$

The potential across FEC 3105 is the average of all the input potentials weighted by the capacitances (e.g., C1, C2, and C3).

When $C_i = C/N$ are all equal, $V_F$ is just a simple mean. To ensure that $$Q_F = V_F^{-1}(\overline{V}) \tag{7}$$

is well defined, all possible values of $\overline{V}$ have magnitudes greater than $V_c$, the coercive potential. Assuming binary input of $+/-V_s$, the potential with the smallest magnitude is:

$$\overline{V} = V_s/N \tag{8}$$

This occurs when (N+1)/2 of the inputs are $+V_s$ and (N−1)/2 are $−V_s$. Then, $$V_s > NV_c \tag{9}$$

Figure 33:
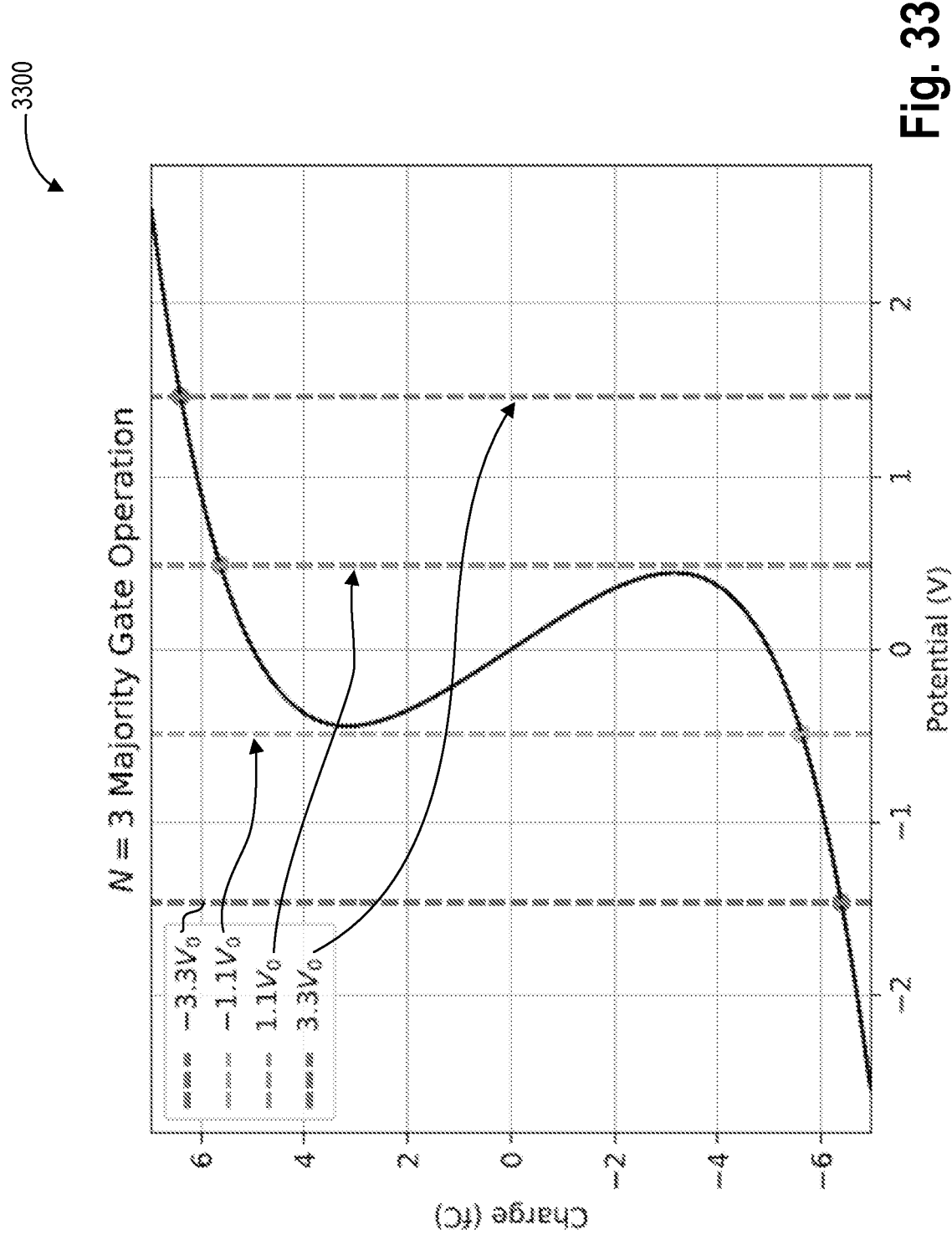
FIG. 33 illustrates a plot showing Q-V relationship for ferroelectric capacitor for a majority gate operation, in accordance with some embodiments.

The output of the majority gate at node n1 is expressed by FIG. 33. FIG. 33 illustrates plot 3300 showing the output of a 3-input majority gate, in accordance with some embodiments.

As an example, for N=3, the possible inputs are:

$$\overline{V} \in \left\{ -\frac{3}{3}V_s, -\frac{1}{3}V_s, +\frac{1}{3}V_s, +\frac{3}{3}V_s \right\} \tag{10}$$

Referring back to FIG. 31, since capacitor 3105 is a non-linear polar capacitor, both terminals of the capacitor are pre-discharged to ground or to a known predetermined voltage via n-type transistors pull-down transistors MN1 and MN2, and p-type pull-up transistors. The predetermined voltage can be programmable. The pre-determined voltage can be positive or negative. In some embodiments, n-type transistor MN1 is coupled to node Vout_int1 (internal Vout node) and is controllable by clock or reset signal Clk1. In some embodiments, n-type transistor MN2 is coupled to node Vout_int2 (internal Vout node) and is controllable by clock or reset signal Clk2. In some embodiments, p-type transistor MP1 is coupled to node Vout_int2, and is controllable by Clk3b.

In some embodiments, the n-type transistors MN1 and MN2 are replaced with p-type transistors to pre-charge both terminals (Vout_int1 and Vout_int2) of capacitor 3105 to a supply voltage or another predetermined voltage, while the p-type transistor MP1 is replaced with an n-type transistor coupled to ground or a negative supply rail. The predetermined voltage can be programmable. The pre-determined voltage can be positive or negative.

Figure 34:
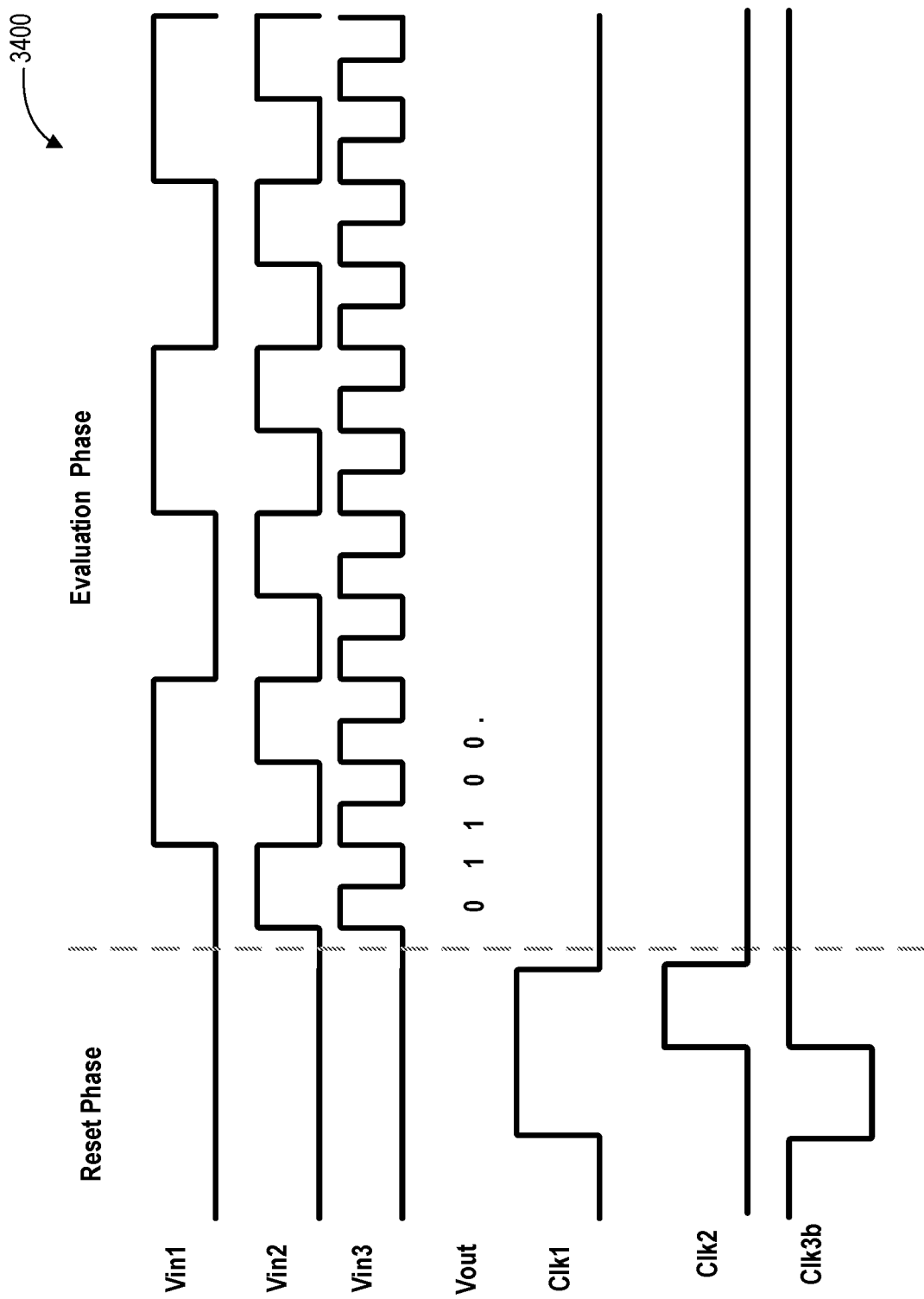
FIG. 34 illustrates timing diagram of the 3-input majority gate of FIG. 31, in accordance with some embodiments.

In some embodiments, the pre-charge or pre-discharge of the terminals of capacitor 3105 (or nodes cn and n1) is done periodically by a clock signals Clk1, Clk2, and Clk3b. The controls can be a non-clock signal that is generated by a control logic (not shown). For example, the control can be issued every predetermined or programmable time. In some embodiments, clock signals Clk1, Clk2, and Clk3b are issued in a reset phase, which is followed by an evaluation phase where inputs Vin1, Vin2, and Vin3 are received, and majority function is performed on them. FIG. 34 illustrates timing diagram 3400 for resetting the ferroelectric capacitor for majority gate of FIG. 31, in accordance with some embodiments.

Clk1 has a pulse larger than the pulse widths of Clk2 and Clk3b. Clk3b is an inverse of Clk3 (not shown). In some embodiments, Clk1 is first asserted which begins to discharge node Vout_int1. While node Vout_int1 is being discharged, Clk2 is asserted. Clk2 may have a pulse width which is substantially half of the pulse width of Clk1. When Clk2 is asserted, node Vout_int2 is discharged. This sequence assures that both terminals of the non-linear polar material of capacitor 3105 are discharged sequentially. In various embodiments, before discharging node Vout_int2, Clk3b is de-asserted which turns on transistor MP1, causing Vout_int2 to be charged to a predetermined value (e.g., supply level). The pulse width of Clk3b is smaller than the pulse width of clk1 to ensure the Clk3b pulsing happens within the Clk1 pulse window. This is useful to ensure non-linear polar capacitor 3105 is initialized to a known programmed state along with the other capacitors (e.g., C1, C2, C3) which are initialized to 0 V across them. The pulsing on Vout_int2 creates the correct field across the non-linear polar capacitor 3105 in conjunction with Vout_int1 to put it in the correct state, such that during operating mode, if Vout_int1 goes higher than Vc value (coercive voltage value), it triggers the switching for non-linear polar capacitor 3105, thereby resulting into a voltage build up on Vout_int2.

In some embodiments, load capacitor CL is added to node Vout_int2. In some embodiments, load capacitor CL is a regular capacitor (e.g., a non-ferroelectric capacitor). The capacitance value of CL on Vout_int2 is useful to ensure that the FE switching charge (of FE capacitor 3105) provides the right voltage level. For a given FE size (area A), with polarization switching density (dP) and desired voltage swing of Vdd (supply voltage), the capacitance of CL should be approximately CL=dP*A/Vdd. There is slight deviation from the above CL value as there is charge sharing on Vout_int2 due to dielectric component of FE capacitor 3105. The charge sharing responds relative to voltage on Vout_int1, and capacitor divider ratio between the dielectric component of the FE capacitor 3105, and load capacitor (CL). Note, the capacitance of CL can be aggregate of all the capacitances (e.g., parasitic routing capacitance on the node, gate capacitance of the output stage 3106, and drain or source capacitance of the reset devices (e.g., MN2, MP1) on the Vout_int2 node. In some embodiments, for a given size of non-linear polar capacitor 3105, CL requirement can be met by just the load capacitance of non-FE logic 3106, and parasitic component itself, and may not need to have it as a separate linear capacitor.

In some embodiments, the non-linear polar material of capacitor 105 includes one of: ferroelectric (FE) material, para-electric material, relaxor ferroelectric, or non-linear dielectric. In various embodiments, para-electric material is the same as FE material but with chemical doping of the active ferroelectric ion by an ion with no polar distortion. In some cases, the non-polar ions are non-s orbital ions formed with p, d, f external orbitals. In some embodiments, non-linear dielectric materials are same as para-electric materials, relaxors, and dipolar glasses.

In some embodiments, f-orbital materials (e.g., lanthanides) are doped to the ferroelectric material to make paraelectric material. Examples of room temperature paraelectric material include: SrTiO3, Ba(x)Sr(y)TiO3 (where x is −0.5, and y is 0.95), HfZrO2, Hf—Si—O, La-substituted PbTiO3, PMN-PT based relaxor ferroelectrics.

In various embodiments, the FE material can be any suitable low voltage FE material that allows the FE material to switch its state by a low voltage (e.g., 100 mV). In some embodiments, the FE material comprises a perovskite of the type $ABO_3$, where 'A' and 'B' are two cations of different sizes, and 'O' is oxygen which is an anion that bonds to both the cations. Generally, the size of A atoms is larger than the size of B atoms. In some embodiments, the perovskite can be doped (e.g., by La or Lanthanides). Perovskites can be suitably doped to achieve a spontaneous distortion in a range of 0.3 to 2%. For example, for chemically substituted lead titanate such as Zr in Ti site; La, Nb in Ti site, the concentration of these substitutes is such that it achieves the spontaneous distortion in the range of 0.3 to 2%. For chemically substituted BiFeO3, BiCrO3, BiCoO3 class of materials, La or rare earth substitution into the Bi site can tune the spontaneous distortion.

Threshold in the FE material has a highly non-linear transfer function in the polarization vs. voltage response. The threshold is related to a) non-linearity of switching transfer function; and b) the squareness of the FE switching. The non-linearity of switching transfer function is the width of the derivative of the polarization vs. voltage plot. The squareness is defined by the ratio of the remnant polarization to the saturation polarization; perfect squareness will show a value of 1.

The squareness of the FE switching can be suitably manipulated with chemical substitution. For example, in PbTiO3 a P-E (polarization-electric field) square loop can be modified by La or Nb substitution to create an S-shaped loop. The shape can be systematically tuned to ultimately yield a non-linear dielectric. The squareness of the FE switching can also be changed by the granularity of the FE layer. A perfect epitaxial, single crystalline FE layer will show higher squareness (e.g., ratio is closer to 1) compared to a poly crystalline FE. This perfect epitaxial can be accomplished using lattice matched bottom and top electrodes. In one example, BiFeO (BFO) can be epitaxially synthesized using a lattice matched SrRuO3 bottom electrode yielding P-E loops that are square. Progressive doping with La will reduce the squareness.

In some embodiments, the FE material is contacted with a conductive metal oxide that includes one of the conducting perovskite metallic oxides exemplified by: La—Sr—CoO3, SrRuO3, La—Sr—MnO3, YBa2Cu3O7, Bi2Sr2CaCu2O8, LaNiO3, and ReO3.

In some embodiments, the FE material comprises a stack of layers including low voltage FE material between (or sandwiched between) conductive oxides. In various embodiments, when FE material is a perovskite, the conductive oxides are of the type AA'BB'O3. A' is a dopant for atomic site A, it can be an element from the Lanthanides series. B' is a dopant for atomic site B, it can be an element from the transition metal elements especially Sc, Ti, V, Cr, Mn, Fe, Co, Ni, Cu, Zn. A' may have the same valency of site A, with a different ferroelectric polarizability.

In some embodiments, the FE material comprises hexagonal ferroelectrics of the type h-RMnO3, where R is a rare earth element such as: cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). The ferroelectric phase is characterized by a buckling of the layered MnO5 polyhedra, accompanied by displacements of the Y ions, which lead to a net electric polarization. In some embodiments, hexagonal FE includes one of: YMnO3 or LuFeO3. In various embodiments, when the FE material comprises hexagonal ferroelectrics, the conductive oxides adjacent to the FE material are of A2O3 (e.g., In2O3, Fe2O3) and AB2O3 type, where 'A' is a rare earth element and B is Mn.

In some embodiments, the FE material comprises improper FE material. An improper ferroelectric is a ferroelectric where the primary order parameter is an order mechanism such as strain or buckling of the atomic order. Examples of improper FE material are LuFeO3 class of materials or super lattice of ferroelectric and paraelectric materials PbTiO3 (PTO) and SnTiO3 (STO), respectively, and LaAlO3 (LAO) and STO, respectively. For example, a super lattice of [PTO/STO]n or [LAO/STO]n, where 'n' is between 1 to 100. While various embodiments here are described with reference to ferroelectric material for storing the charge state, the embodiments are also applicable for paraelectric material. For example, the capacitor of various embodiments can be formed using paraelectric material instead of ferroelectric material.

In some embodiments, the FE material includes one of: Hafnium (Hf), Zirconium (Zr), Aluminum (Al), Silicon (Si), their oxides or their alloyed oxides. In some embodiments, FE material includes one of: Al(1-x)Sc(x)N, Ga(1-x)Sc(x)N, Al(1-x)Y(x)N or Al(1-x-y)Mg(x)Nb(y)N, y doped HfO2, where x includes one of: Al, Ca, Ce, Dy, Er, Gd, Ge, La, Sc, Si, Sr, Sn, or Y, wherein 'x' is a fraction. In some embodiments, the FE material includes Bismuth ferrite (BFO), lead zirconate titanate (PZT), BFO with doping material, or PZT with doping material, wherein the doping material is one of Nb or; and relaxor ferroelectrics such as PMN-PT.

In some embodiments, the FE material includes Bismuth ferrite (BFO), BFO with a doping material where in the doping material is one of Lanthanum, or any element from the lanthanide series of the periodic table. In some embodiments, the FE material 105 includes lead zirconium titanate (PZT), or PZT with a doping material, wherein the doping material is one of La, Nb. In some embodiments, the FE material includes a relaxor ferroelectric includes one of lead magnesium niobate (PMN), lead magnesium niobate-lead titanate (PMN-PT), lead lanthanum zirconate titanate (PLZT), lead scandium niobate (PSN), Barium Titanium-Bismuth Zinc Niobium Tantalum (BT-BZNT), or Barium Titanium-Barium Strontium Titanium (BT-BST).

In some embodiments, the FE material includes Hafnium oxides of the form, Hf1-x Ex Oy where E can be Al, Ca, Ce, Dy, er, Gd, Ge, La, Sc, Si, Sr, Sn, or Y. In some embodiments, FE material 105 includes Niobate type compounds LiNbO3, LiTaO3, Lithium iron Tantalum Oxy Fluoride, Barium Strontium Niobate, Sodium Barium Niobate, or Potassium strontium niobate.

In some embodiments, the FE material comprises multiple layers. For example, alternating layers of [Bi2O2]2+, and pseudo-perovskite blocks (Bi4Ti3O12 and related Aurillius phases), with perovskite layers that are n octahedral layers in thickness can be used.

In some embodiments, the FE material comprises organic material. For example, Polyvinylidene fluoride or polyvinylidene difluoride (PVDF).

The FE material is between two electrodes. These electrodes are conducting electrodes. In some embodiments, the electrodes are perovskite templated conductors. In such a templated structure, a thin layer (e.g., approximately 10 nm) of a perovskite conductor (such as SrRuO3) is coated on top of IrO2, RuO2, PdO2, or PtO2 (which have a non-perovskite structure but higher conductivity) to provide a seed or template for the growth of pure perovskite ferroelectric at low temperatures. In some embodiments, when the ferroelectric comprises hexagonal ferroelectric material, the electrodes can have hexagonal metals, spinels, or cubic metals. Examples of hexagonal metals include: PtCoO2, PdCoO2, and other delafossite structured hexagonal metallic oxides such as Al-doped ZnO. Examples of spinels include Fe3O4 and LiV2O4. Examples of cubic metals include Indium Tin Oxide (ITO) such as Sn-doped In2O3.

The charge developed on node n1 produces a voltage and current that is the output of the majority gate 3104. Any suitable driver 3106 can drive this output. For example, a non-FE logic, FE logic, CMOS logic, BJT logic, etc. can be used to drive the output to a downstream logic. Examples of the drivers include inverters, buffers, NAND gates, NOR gates, XOR gates, amplifiers, comparators, digital-to-analog converters, analog-to-digital converters, etc. In some embodiments, output "out" is reset by driver 106 via Clk1 signal. For example, NAND gate with one input coupled to Vout_int2 and the other input coupled to Clk1 can be used to reset "out" during a reset phase.

While FIG. 31 illustrates a 3-input majority gate, the same concept can be extended to more than 3 inputs to make an N-input majority gate, where N is greater than 2. For example, a 5-input majority gate is similar to 3-input majority gate 104 but for additional inputs Vin4 and Vin5. These inputs can come from the same drivers (e.g., any one of drivers 101, 102, 103) or from different drivers. Input Vin4 and Vin5 can be analog, digital, or a combination of them. For example, Vin4 is a digital signal while Vin5 is an analog signal. The additional inputs Vin4 and Vin5 are coupled to additional non-ferroelectric capacitors C4 and C5, respectively (not shown). The composition and size of the capacitors C4 and C5 are similar to that of C1, C2, and C3. Here, resistors R4 and R5 are parasitic resistors.

The majority function is performed at the common node cn, and the resulting voltage is projected on to capacitor 3105. For example, the majority function of the currents ($I_1$, $I_2$, $I_3$, $I_4$, and $I_5$) on node cn results in a resultant current that charges capacitor 3105. Table 6 illustrates the majority function f(Majority Vin1, Vint, Vin3, Vin4, Vin5) of a 5-input majority gate.

TABLE 6

| Vin1 | Vin2 | Vin3 | Vin4 | Vin5 | cn (f(Majority Vin1, Vin2, Vin3, Vin4, Vin5)) |
|---|---|---|---|---|---|
| 0 | 0 | 0 | 0 | 0 | 0 |
| 0 | 0 | 0 | 0 | 1 | 0 |
| 0 | 0 | 0 | 1 | 0 | 0 |
| 0 | 0 | 0 | 1 | 1 | 0 |
| 0 | 0 | 1 | 0 | 0 | 0 |
| 0 | 0 | 1 | 0 | 1 | 0 |
| 0 | 0 | 1 | 1 | 0 | 0 |
| 0 | 0 | 1 | 1 | 1 | 1 |

TABLE 6-continued

| Vin1 | Vin2 | Vin3 | Vin4 | Vin5 | cn (f(Majority Vin1, Vin2, Vin3, Vin4, Vin5)) |
|---|---|---|---|---|---|
| 0 | 1 | 0 | 0 | 0 | 0 |
| 0 | 1 | 0 | 0 | 1 | 0 |
| 0 | 1 | 0 | 1 | 0 | 0 |
| 0 | 1 | 0 | 1 | 1 | 1 |
| 0 | 1 | 1 | 0 | 0 | 0 |
| 0 | 1 | 1 | 0 | 1 | 1 |
| 0 | 1 | 1 | 1 | 0 | 1 |
| 0 | 1 | 1 | 1 | 1 | 1 |
| 1 | 0 | 0 | 0 | 0 | 0 |
| 1 | 0 | 0 | 0 | 1 | 0 |
| 1 | 0 | 0 | 1 | 0 | 0 |
| 1 | 0 | 0 | 1 | 1 | 1 |
| 1 | 0 | 1 | 0 | 0 | 0 |
| 1 | 0 | 1 | 0 | 1 | 1 |
| 1 | 0 | 1 | 1 | 0 | 1 |
| 1 | 0 | 1 | 1 | 1 | 1 |
| 1 | 1 | 0 | 0 | 0 | 0 |
| 1 | 1 | 0 | 0 | 1 | 1 |
| 1 | 1 | 0 | 1 | 0 | 1 |
| 1 | 1 | 0 | 1 | 1 | 1 |
| 1 | 1 | 1 | 0 | 0 | 1 |
| 1 | 1 | 1 | 0 | 1 | 1 |
| 1 | 1 | 1 | 1 | 0 | 1 |
| 1 | 1 | 1 | 1 | 0 | 1 |

Figure 35:
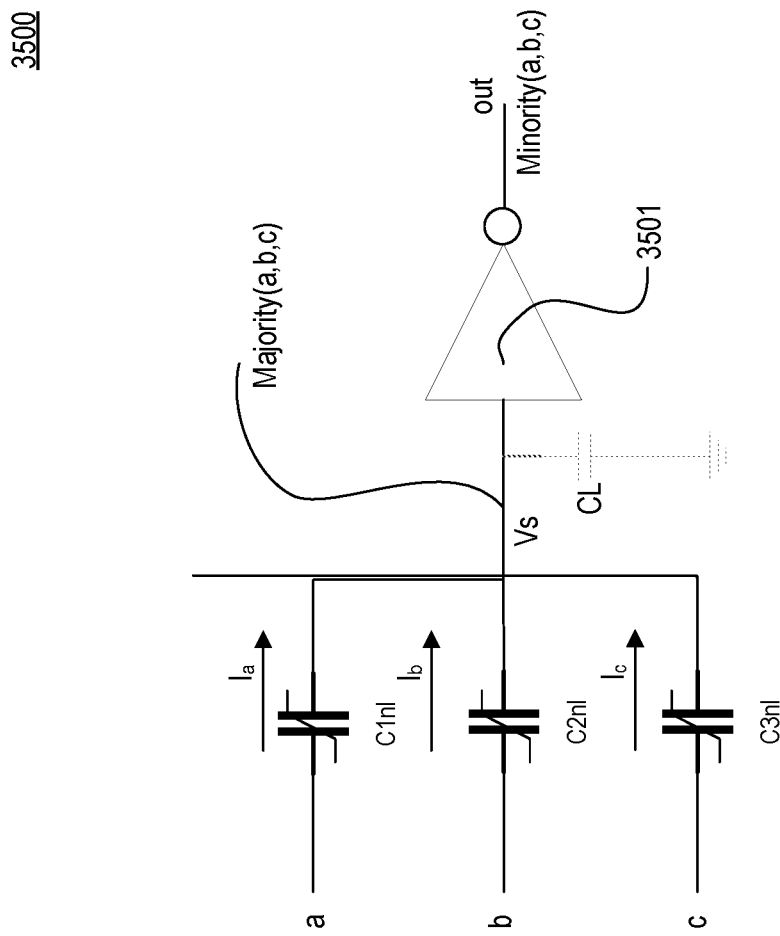
FIG. 35 illustrates a 3-input minority gate with non-linear input capacitors, in accordance with some embodiments.

FIG. 35 illustrates 3-input minority gate 3500 with non-linear input capacitors, in accordance with some embodiments. In some embodiments, 3-input majority gate 3500 comprises non-linear input capacitors C1$n$1, C2$n$1, and C3$n$1 that receives digital signals a, b, and c, respectively. Here, signal names and node names are interchangeably used. For example, 'a' refers to node 'a' or signal 'a' depending on the context of the sentence. One end or terminal of capacitor C1$n$1 is coupled to node a while the other end of capacitor C1$n$1 is coupled to summing node Vs. The same is true for other non-linear capacitors C2$n$1 and C3$n$1 as shown. In some embodiments, 3-input majority gate 3500 comprises a driver circuitry 3501. In this example, driver circuitry 3501 is an inverter. In other embodiments, other types of driver circuitries can be used such as NAND gate, NOR gate, multiplexer, buffer, and other logic gates. The majority function is performed at summing node Vs as Majority(a,b,c). In this example, since driver 3501 is an inverter, minority function is performed at output "out" as Minority(a,b,c).

In some embodiments, in addition to the gate capacitance of driver circuitry 3501, an additional linear capacitor CL is coupled to summing node Vs and ground as shown. In some embodiments, this linear capacitor CL is a non-ferroelectric capacitor. In some embodiments, the non-ferroelectric capacitor includes one of: dielectric capacitor, para-electric capacitor, or non-linear dielectric capacitor. A dielectric capacitor comprises first and second metal plates with a dielectric between them. Examples of such dielectrics are: HfO, ABO3 perovskites, nitrides, oxy-fluorides, oxides, etc. A para-electric capacitor comprises first and second metal plates with a para-electric material between them. In some embodiments, f-orbital materials (e.g., lanthanides) are doped to the ferroelectric materials to make paraelectric material. Examples of room temperature paraelectric material include: SrTiO3, Ba(x)Sr(y)TiO3 (where x is −0.5, and y is 0.95)), HfZrO2, Hf—Si—O, La-substituted PbTiO3, PMN-PT based relaxor ferroelectrics. A dielectric capacitor comprises first and second metal plates with non-linear dielectric capacitor between them. The range for dielectric constant is 1.2 to 10000. The capacitor CL can be implemented as MIM (metal-insulator-metal) capacitor technology, transistor gate capacitor, hybrid of metal capacitors or transistor capacitor. The capacitor CL can be implemented as MIM (metal-insulator-metal) capacitor technology, transistor gate capacitor, or hybrid of metal capacitors or transistor capacitor.

In some embodiments, the non-linear input capacitors C1$n$1, C2$n$1, and C3$n$1 comprise non-linear polar material. In some embodiments, the non-linear polar material includes one of: ferroelectric (FE) material, para-electric material, relaxor ferroelectric, or non-linear dielectric. In various embodiments, para-electric material is the same as FE material but with chemical doping of the active ferroelectric ion by an ion with no polar distortion. In some cases, the non-polar ions are non-s orbital ions formed with p, d, f external orbitals. In some embodiments, non-linear dielectric materials are same as para-electric materials, relaxors, and dipolar glasses.

In some embodiments, f-orbital materials (e.g., lanthanides) are doped to the ferroelectric material to make para-electric material. Examples of room temperature paraelectric material include: SrTiO3, Ba(x)Sr(y)TiO3 (where x is −0.5, and y is 0.95), HfZrO2, Hf—Si—O, La-substituted PbTiO3, and PMN-PT based relaxor ferroelectrics.

In various embodiments, the FE material can be any suitable low voltage FE material that allows the FE material to switch its state by a low voltage (e.g., 100 mV). In some embodiments, the FE material comprises a perovskite of the type $ABO_3$, where 'A' and 'B' are two cations of different sizes, and 'O' is oxygen which is an anion that bonds to both the cations. Generally, the size of A atoms is larger than the size of B atoms. In some embodiments, the perovskite can be doped (e.g., by La or Lanthanides). Perovskites can be suitably doped to achieve a spontaneous distortion in a range of 0.3 to 2%. For example, for chemically substituted lead titanate such as Zr in Ti site; La, Nb in Ti site, the concentration of these substitutes is such that it achieves the spontaneous distortion in the range of 0.3 to 2%. For chemically substituted BiFeO3, BiCrO3, BiCoO3 class of materials, La or rare earth substitution into the Bi site can tune the spontaneous distortion. In some embodiments, perovskite includes one of: BaTiO3, PbTiO3, KNbO3, or NaTaO3.

Threshold in the FE material has a highly non-linear transfer function in the polarization vs. voltage response. The threshold is related to: a) non-linearity of switching transfer function; and b) the squareness of the FE switching. The non-linearity of switching transfer function is the width of the derivative of the polarization vs. voltage plot. The squareness is defined by the ratio of the remnant polarization to the saturation polarization; perfect squareness will show a value of 1.

The squareness of the FE switching can be suitably manipulated with chemical substitution. For example, in PbTiO3 a P-E (polarization-electric field) square loop can be modified by La or Nb substitution to create an S-shaped loop. The shape can be systematically tuned to ultimately yield a non-linear dielectric. The squareness of the FE switching can also be changed by the granularity of the FE layer. A perfect epitaxial, single crystalline FE layer will show higher squareness (e.g., ratio is closer to 1) compared to a poly crystalline FE. This perfect epitaxial can be accomplished using lattice matched bottom and top electrodes. In one example, BiFeO (BFO) can be epitaxially synthesized using a lattice matched SrRuO3 bottom electrode yielding P-E loops that are square. Progressive doping with La will reduce the squareness.

In some embodiments, the FE material is contacted with a conductive metal oxide that includes one of the conducting perovskite metallic oxides exemplified by: La—Sr—CoO3, SrRuO3, La—Sr—MnO3, YBa2Cu3O7, Bi2Sr2CaCu2O8, LaNiO3, and ReO3.

In some embodiments, the FE material comprises a stack of layers including low voltage FE material between (or sandwiched between) conductive oxides. In various embodiments, when FE material is a perovskite, the conductive oxides are of the type AA'BB'O$_3$. A' is a dopant for atomic site A, it can be an element from the Lanthanides series. B' is a dopant for atomic site B, it can be an element from the transition metal elements especially Sc, Ti, V, Cr, Mn, Fe, Co, Ni, Cu, Zn. A' may have the same valency of site A, with a different ferroelectric polarizability.

In some embodiments, the FE material comprises hexagonal ferroelectrics of the type h-RMnO3, where R is a rare earth element such as: cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). The ferroelectric phase is characterized by a buckling of the layered MnO5 polyhedra, accompanied by displacements of the Y ions, which lead to a net electric polarization. In some embodiments, hexagonal FE includes one of: YMnO3 or LuFeO3. In various embodiments, when the FE material comprises hexagonal ferroelectrics, the conductive oxides adjacent to the FE material are of A2O3 (e.g., In2O3, Fe2O3) and AB2O3 type, where 'A' is a rare earth element and B is Mn.

In some embodiments, FE material comprises improper FE material. An improper ferroelectric is a ferroelectric where the primary order parameter is an order mechanism such as strain or buckling of the atomic order. Examples of improper FE material are LuFeO3 class of materials or super lattice of ferroelectric and paraelectric materials PbTiO3 (PTO) and SnTiO3 (STO), respectively, and LaAlO3 (LAO) and STO, respectively. For example, a super lattice of [PTO/STO]n or [LAO/STO]n, where 'n' is between 1 to 100. While various embodiments here are described with reference to ferroelectric material for storing the charge state, the embodiments are also applicable for paraelectric material. For example, the capacitor of various embodiments can be formed using paraelectric material instead of ferroelectric material.

In some embodiments, the FE material includes one of: Hafnium (Hf), Zirconium (Zr), Aluminum (Al), Silicon (Si), their oxides or their alloyed oxides. In some embodiments, FE material includes one of: Al(1-x)Sc(x)N, Ga(1-x)Sc(x)N, Al(1-x)Y(x)N or Al(1-x-y)Mg(x)Nb(y)N, y doped HfO2, where x includes one of: Al, Ca, Ce, Dy, Er, Gd, Ge, La, Sc, Si, Sr, Sn, or Y, wherein 'x' is a fraction. In some embodiments, the FE material includes Bismuth ferrite (BFO), lead zirconate titanate (PZT), BFO with doping material, or PZT with doping material, wherein the doping material is one of Nb or relaxor ferroelectrics such as PMN-PT.

In some embodiments, the FE material includes Bismuth ferrite (BFO), BFO with a doping material where in the doping material is one of Lanthanum, or any element from the lanthanide series of the periodic table. In some embodiments, the FE material includes lead zirconium titanate (PZT), or PZT with a doping material, wherein the doping material is one of La, Nb. In some embodiments, the FE material includes a relaxor ferroelectric including one of lead magnesium niobate (PMN), lead magnesium niobate-lead titanate (PMN-PT), lead lanthanum zirconate titanate (PLZT), lead scandium niobate (PSN), Barium Titanium-Bismuth Zinc Niobium Tantalum (BT-BZNT), or Barium Titanium-Barium Strontium Titanium (BT-BST).

In some embodiments, the FE material includes Hafnium oxides of the form, Hf1-x Ex Oy where E can be Al, Ca, Ce, Dy, Er, Gd, Ge, La, Sc, Si, Sr, Sn, or Y. In some embodiments, FE material 105 includes Niobate type compounds LiNbO3, LiTaO3, Lithium iron Tantalum Oxy Fluoride, Barium Strontium Niobate, Sodium Barium Niobate, or Potassium strontium niobate.

In some embodiments, the FE material comprises multiple layers. For example, alternating layers of [Bi2O2]2+, and pseudo-perovskite blocks (Bi4Ti3O12 and related Aurivillius phases), with perovskite layers that are n octahedral layers in thickness can be used.

In some embodiments, the FE material comprises organic material. For example, Polyvinylidene fluoride or polyvinylidene difluoride (PVDF). The FE material is between two electrodes. These electrodes are conducting electrodes. In some embodiments, the electrodes are perovskite templated conductors. In such a templated structure, a thin layer (e.g., approximately 10 nm) of a perovskite conductor (such as SrRuO3) is coated on top of IrO2, RuO2, PdO2, or PtO2 (which have a non-perovskite structure but higher conductivity) to provide a seed or template for the growth of pure perovskite ferroelectric at low temperatures. In some embodiments, when the ferroelectric comprises hexagonal ferroelectric material, the electrodes can have hexagonal metals, spinels, or cubic metals. Examples of hexagonal metals include: PtCoO2, PdCoO2, and other delafossite structured hexagonal metallic oxides such as Al-doped ZnO. Examples of spinels include Fe3O4 and LiV2O4. Examples of cubic metals include Indium Tin Oxide (ITO) such as Sn-doped In2O3.

The majority function is performed at the summing node Vs, and the resulting voltage is projected on to capacitance of driver circuitry 3501. For example, the majority function of the currents ($I_a$, $I_b$, and $I_c$) on node Vs results in a resultant current that charges capacitor 3501. Table 7 illustrates the majority function f(Majority a, b, c).

TABLE 7

| a | b | c | Vs (f(Majority a, b, c)) |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

The charge developed on node Vs produces a voltage and current that is the output of the majority gate 3500. Any suitable driver 3501 can drive this output. For example, a non-FE logic, FE logic, CMOS logic, BJT logic, etc. can be used to drive the output to a downstream logic. Examples of the drivers include inverters, buffers, NAND gates, NOR gates, XOR gates, amplifiers, comparators, digital-to-analog converters, analog-to-digital converters, multiplexers, etc.

While FIG. 35 illustrates a 3-input majority gate, the same concept can be extended to more than 3 inputs to make an N-input majority gate, where N is greater than 2. In various embodiments, 'N' is an odd number. For example, a 5-input majority gate is like an input majority gate 3500 but for additional inputs 'd' and 'e'. These inputs can come from the same drivers or from different drivers.

In some embodiments, the 3-input majority gate can be configured as a fast inverter with a much faster propagation delay compared to a similar sized (in terms of area footprint) CMOS inverter. This is particularly useful when the inputs have a significantly slower slope compared to the propagation delay through the non-linear input capacitors. One way to configure the 3-input majority gate as an inverter is to set one input to a logic high (e.g., b=1) and set another input to a logic low (e.g., b=0). The third input is the driving input which is to be inverted. The inversion will be at the Vs node. The same technique can also be applied to N-input majority gate, where 'N' is 1 or any other odd number. In an N-input majority gate, (N−1)/2 inputs are set to '1' and (N−1)/2 inputs are set to '0', and one input is used to decide the inversion function. It will be appreciated that the various embodiments are described as a majority gate, the same concepts are applicable to a minority gate. In a minority gate the driving circuitry is an inverting circuitry coupled to the summing node Vs. The minority function is seen at the output of the inverting circuitry.

In some embodiments, (2N−1) input majority gate can operate as an N-input AND gate where (N−1) inputs of the majority gate are set to zero. The AND function will be seen at the summing node Vs. Similarly, N-input NAND, OR, NOR gates can be realized. In various embodiments, the summing node Vs is driven by a driver circuitry (e.g., inverter, buffer, NAND gate, AND gate, OR gate, NOR gate, or any other logic circuitry). However, driver circuitry 3501 can be replaced with another majority or minority gate. In one such embodiment, the storage node Vs is directly coupled to a non-linear capacitor of another majority or minority gate.

Any logic function $f(x_1, x_2, \ldots x_n)$ can be represented by two levels of logic as given by the min-term expansion:

$$f(x_1, x_2, \ldots x_n) = V_{c_1, c_2, \ldots c_n} f(x_1, x_2, \ldots x_n) \wedge x_1^{c_1} \wedge x_2^{c_2} \wedge x_3^{c_3} \ldots \wedge x_n^{c_n}$$

where $C_i$ is either 0 or 1. When $C_i$ is 1, $x_i^{c_i} = x_i$ (the input is used in its original form). When $C_i$ is 0, $x_i^{c_i} = $ (the input is used in its inverted form). The first level of logic is represented by at most $2^n$ AND gates ($\Delta$), one for each of the $2^n$ possible combinations of 0 and 1 for $C_1, C_2, \ldots C_n$. The second level of logic is represented by a single OR gate (V). Each operand of the OR gate is a representation of a row in the truth table for $$f(x_1, x_2, \ldots x_n).$$

A (2N−1)-input majority gate can represent an N-input AND gate, by tying (N−1) of the majority gate's inputs to a ground level. Similarly, a (2N−1)-input majority gate can represent an N-input OR gate, by tying (N−1) of the majority gate's inputs to a supply level (Vdd). Since a majority gate can represent AND and OR gates, and the inputs to the AND and OR gates are either original or inverted forms of the input digital signals, any logic function can be represented by majority gates and inverters only, in accordance with some embodiments.

Figure 36:
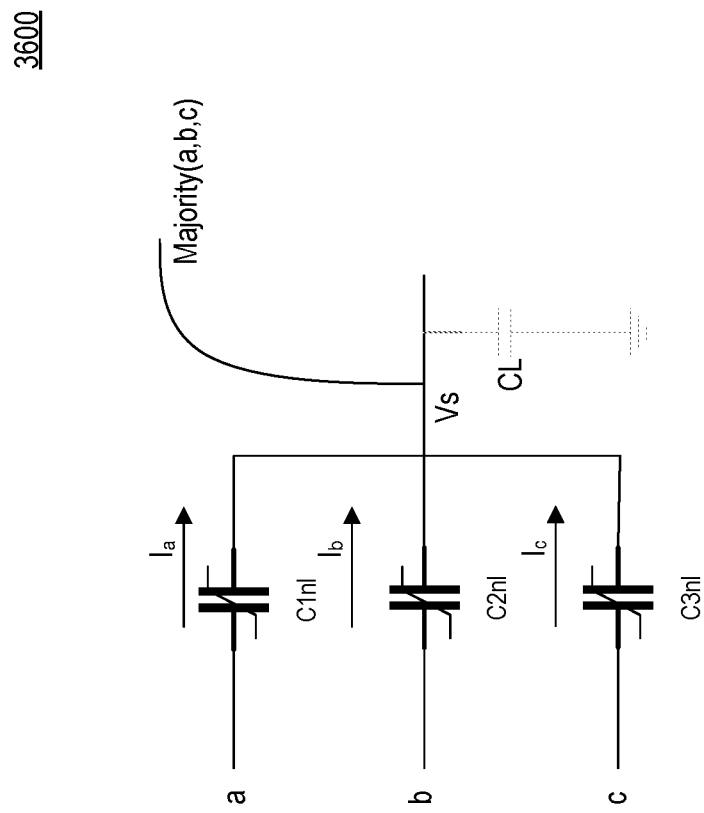
FIG. 36 illustrates a 3-input majority gate with non-linear input capacitors, in accordance with some embodiments.

FIG. 36 illustrates 3-input majority gate 3600 with non-linear input capacitors, in accordance with some embodiments. In some embodiments, the summing node Vs is not coupled to a CMOS driver (e.g., buffer, inverter, NAND gate, or any other CMOS logic gate). In one example, Vs is coupled to another majority or minority gate. For instance, Vs is coupled to a terminal of another non-linear capacitor of another majority or minority gate.

Figure 37:
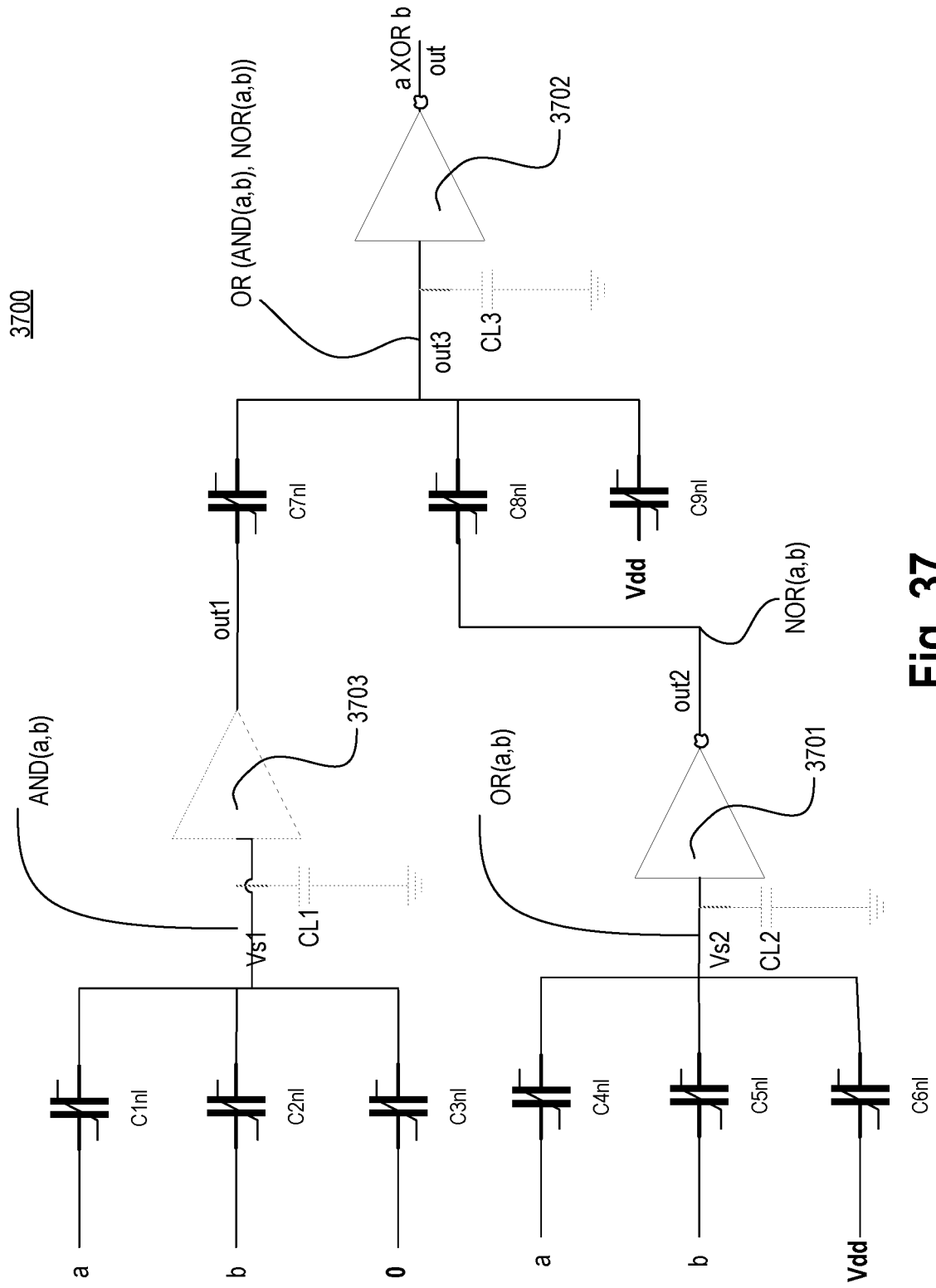
FIG. 37 illustrates a 3-input majority XOR gate with non-linear input capacitors, in accordance with some embodiments.

FIG. 37 illustrates 3-input majority XOR gate 3700 with non-linear input capacitors, in accordance with some embodiments. XOR gate 3700 is a 2-input XOR gate that performs XOR function on inputs a and b. In various embodiments, XOR gate 3700 comprises non-linear input capacitors C1*n*1, C2*n*1, C3*n*1, C4*n*1, C5*n*1, and C6*n*1, inverter 3703, and non-linear output capacitors C7*n*1, C8*n*1, and C9*n*1. Capacitors C1*n*1, C2*n*1, and C3*n*1 receive inputs a, b, and 0, and perform majority AND function on node Vs1. Capacitors C4*n*1, C5*n*1, and C6*n*1 receive inputs a, b, and Vdd, and perform majority OR function on node Vs2. The NAND output on node out1 is received by output capacitor C7*n*1. The OR output on node Vs2 is received by capacitor C8*n*1. Capacitor C9*n*1 receives a predetermined input 0 in this example. The majority function on node out3 is an AND of out1, out2, and 0. In some embodiments, instead of driving voltage on node Vs2 to out2, buffer 3701 is used between nodes Vs2 and out2. In some embodiments, instead of driving output out3 as the XOR output, buffer 3702 is used to output the XOR output on node out. In some embodiments, Vs2 is directly connected to node out2. In some embodiments, out3 is directly connected to node out. In some embodiments, linear or non-linear capacitors CL1, CL2, and CL3 are added on the summing nodes Vs1, Vs2, and out3, respectively. By swapping the voltages '0' and 'Vdd' different logic functions can be realized, in accordance with various embodiments.

Figure 38:
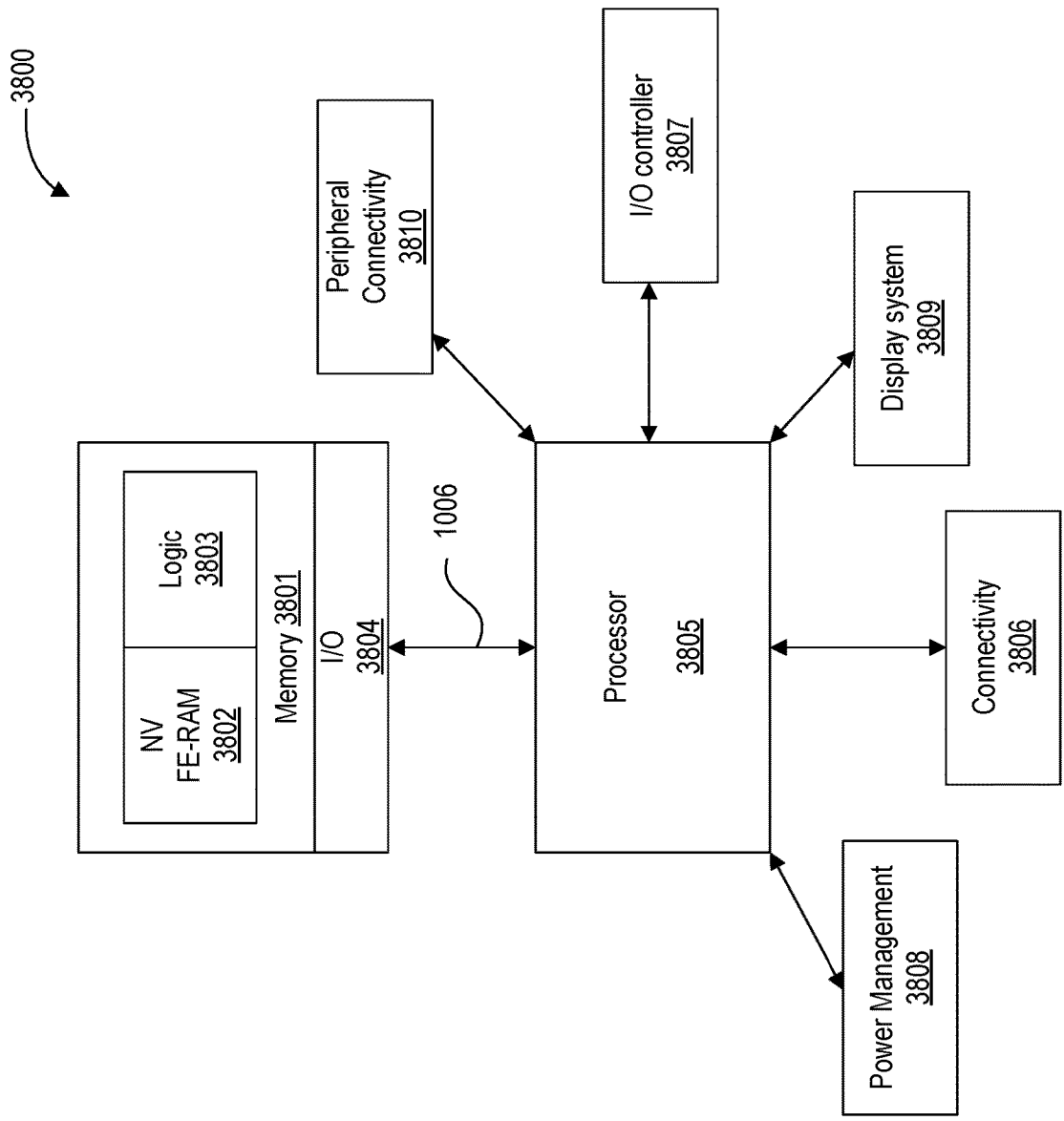
FIG. 38 illustrates a system-on-chip having logic which is synthesized using the CAD tool of various embodiments.

FIG. 38 illustrates a system-on-chip 3800 having logic which is synthesized using the CAD tool of various embodiments. In some embodiments, SOC 3800 comprises memory 3801 having static random-access memory (SRAM) or FE based random access memory FE-RAM, or any other suitable memory. The memory can be non-volatile (NV) or volatile memory. Memory 3801 may also comprise logic 3803 to control memory 3802. For example, write and read drivers are part of logic 3803. These drivers and other logic are implemented using the majority or threshold gates of various embodiments. The logic can comprise majority or threshold gates and traditional logic (e.g., CMOS based NAND, NOR etc.).

SOC further comprises a memory I/O (input-output) interface 3804. The interface may be double-data rate (DDR) compliant interface or any other suitable interface to communicate with a processor. Processor 3805 of SOC 3800 can be a single core or multiple core processor. Processor 3805 can be a general-purpose processor (CPU), a digital signal processor (DSP), a graphics processing unit (GPU), or an Application Specific Integrated Circuit (ASIC) processor. In some embodiments, processor 3805 is an artificial intelligence (AI) processor (e.g., a dedicated AI processor, a processor circuitry, a graphics processor configured as an AI processor). In various embodiments, processor 3805 (or processor circuitry 3805) is configured to execute one or more instructions.

AI is a broad area of hardware and software computations where data is analyzed, classified, and then a decision is made regarding the data. For example, a model describing classification of data for a certain property or properties is trained over time with large amounts of data. The process of training a model requires large amounts of data and processing power to analyze the data. When a model is trained, weights or weight factors are modified based on outputs of the model. Once weights for a model are computed to a high confidence level (e.g., 95% or more) by repeatedly analyzing data and modifying weights to get the expected results, the model is deemed "trained." This trained model with fixed weights is then used to make decisions about new data.

Training a model and then applying the trained model for new data is hardware intensive activity. In some embodiments, AI processor 3805 has reduced latency of computing the training model and using the training model, which reduces the power consumption of such AI processor systems.

Processor 3805 may be coupled to a number of other chip-lets that can be on the same die as SOC 3800 or on separate dies. These chip-lets include connectivity circuitry 3806, I/O controller 3807, power management 3808, and display system 3809, and peripheral connectivity 3810.

Connectivity 3806 represents hardware devices and software components for communicating with other devices. Connectivity 3806 may support various connectivity circuitries and standards. For example, connectivity 3806 may support GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. In some embodiments, connectivity 3806 may support non-cellular standards such as WiFi.

I/O controller 3807 represents hardware devices and software components related to interaction with a user. I/O controller 3807 is operable to manage hardware that is part of an audio subsystem and/or display subsystem. For example, input through a microphone or other audio device can provide input or commands for one or more applications or functions of SOC 3800. In some embodiments, I/O controller 3807 illustrates a connection point for additional devices that connect to SOC 3800 through which a user might interact with the system. For example, devices that can be attached to the SOC 3800 might include microphone devices, speaker or stereo systems, video systems or other display devices, keyboard or keypad devices, or other I/O devices for use with specific applications such as card readers or other devices.

Power management 3808 represents hardware or software that perform power management operations, e.g., based at least in part on receiving measurements from power measurement circuitries, temperature measurement circuitries, charge level of battery, and/or any other appropriate information that may be used for power management. By using majority and threshold gates of various embodiments, non-volatility is achieved at the output of these logic. Power management 3808 may accordingly put such logic into low power state without the worry of losing data. Power management may select a power state according to Advanced Configuration and Power Interface (ACPI) specification for one or all components of SOC 3800.

Display system 3809 represents hardware (e.g., display devices) and software (e.g., drivers) components that provide a visual and/or tactile display for a user to interact with the processor 3805. In some embodiments, display system 3809 includes a touch screen (or touch pad) device that provides both output and input to a user. Display system 3809 may include a display interface, which includes the particular screen or hardware device used to provide a display to a user. In some embodiments, the display interface includes logic separate from processor 3805 to perform at least some processing related to the display.

Peripheral connectivity 3810 may represent hardware devices and/or software devices for connecting to peripheral devices such as printers, chargers, cameras, etc. Peripheral connectivity 3810 say support communication protocols, e.g., PCIe (Peripheral Component Interconnect Express), USB (Universal Serial Bus), Thunderbolt, High Definition Multimedia Interface (HDMI), Firewire, etc.

Here, multiple non-silicon semiconductor material layers may be stacked within a single fin structure. The multiple non-silicon semiconductor material layers may include one or more "P-type" layers that are suitable (e.g., offer higher hole mobility than silicon) for P-type transistors. The multiple non-silicon semiconductor material layers may further include one or more "N-type" layers that are suitable (e.g., offer higher electron mobility than silicon) for N-type transistors. The multiple non-silicon semiconductor material layers may further include one or more intervening layers separating the N-type from the P-type layers. The intervening layers may be at least partially sacrificial, for example to allow one or more of a gate, source, or drain to wrap completely around a channel region of one or more of the N-type and P-type transistors. The multiple non-silicon semiconductor material layers may be fabricated, at least in part, with self-aligned techniques such that a stacked CMOS device may include both a high-mobility N-type and P-type transistor with a footprint of a single FET (field effect transistor).

It is pointed out that those elements of the figures having the same reference numbers (or names) as the elements of any other figure can operate or function in any manner similar to that described, but are not limited to such.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

Here, the term "backend" generally refers to a section of a die which is opposite of a "frontend" and where an IC (integrated circuit) package couples to IC die bumps. For example, high-level metal layers (e.g., metal layer 6 and above in a ten-metal stack die) and corresponding vias that are closer to a die package are considered part of the backend of the die. Conversely, the term "frontend" generally refers to a section of the die that includes the active region (e.g., where transistors are fabricated) and low-level metal layers and corresponding vias that are closer to the active region (e.g., metal layer 5 and below in the ten-metal stack die example).

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

Following examples illustrates the various embodiments. Any one example can be combined with other examples described herein.

Example 1: A machine-readable storage media having machine-readable instructions stored thereon that when executed cause one or more machines to perform a method comprising: receiving one or more input files indicative of a logic function of a logic circuit; classify, from the one or more input files, inputs, outputs, and state elements as terminal nodes; segmenting the logic circuit into sub-circuits with the terminal nodes as input and output ports; generating a list of combinational circuits and sequential circuits by analyzing feedback paths in each of the sub-circuits; for each item in the list, performing combinational circuit synthesis on an individual sub-circuit of the sub-circuits if it is determined that the individual sub-circuit does not include a feedback path, for each item in the list, performing sequential circuit synthesis on the individual sub-circuit if it is determined that the individual sub-circuit includes a feedback path, adding synthesized outputs from performing the combinational circuit synthesis and from performing the sequential circuit synthesis to a list of synthesized circuits; and wiring circuits, to generate a synthesized circuit, in the list of synthesized circuits using the inputs and the outputs of the logic circuit.

Example 2: The machine-readable storage media of claim 1, wherein performing the combinational circuit synthesis comprises: iteratively breaking each sub-circuit of the sub-circuits into non-overlapping blocks; selecting an option that maximizes power, performance, and area for a block of the non-overlapping blocks; for each block of the non-overlapping blocks, synthesizing the block in view of the selected option using standard CMOS logic gates and majority or minority gates of any fan-in or fan-out, or a combination of them, wherein synthesizing the block results in a synthesized block; adding the synthesized block to a list of synthesized blocks; and combining synthesized blocks from the list of synthesized blocks, to hierarchically create larger cells and a complete circuit, wherein a larger cell of the larger cells is larger than a block of the non-overlapping blocks.

Example 3: The machine-readable storage media of claim 1, wherein performing the combinational circuit synthesis comprises: for each sub-circuit of the sub-circuits, performing majority inverter graph (MIG) synthesis to generate a MIG with connected nodes of majority gates and inverter gates; and heuristically pattern matching the MIG, with standard cell library comprising logic gates, to generate a synthesized circuit.

Example 4: The machine-readable storage media of claim 3, wherein the logic gates include an n-bit adder and an n-bit multiplier.

Example 5: The machine-readable storage media of claim 3, wherein heuristically pattern matching the MIG comprises: ordering the logic gates in the standard cell library from largest to smallest or smallest to largest, to generate ordered logic gates; defining a current pattern as a representation of a current standard cell in the ordered logic gates; determining whether a match exists between the current pattern and a subgraph of the MIG; and replacing the subgraph of the MIG with the current pattern if the match exists.

Example 6: The machine-readable storage media of claim 1, wherein performing the sequential circuit synthesis comprises: determining whether the individual sub-circuit of the sub-circuits is level-triggered; and performing level-triggered sequential synthesis on the individual sub-circuit if it is determined that the individual sub-circuit of the sub-circuits is level-triggered.

Example 7: The machine-readable storage media of example 6, wherein performing the level-triggered sequential synthesis comprises: determining whether the individual sub-circuit is a netlist or specified as a hardware description language; introducing an auxiliary primary input to the individual sub-circuit for each feedback connection from an output of the individual sub-circuit to an input of the individual sub-circuit, if it is determined that the individual sub-circuit is a netlist or specified as a hardware description language; and performing combinational circuit synthesis on the individual sub-circuit after the auxiliary primary input is introduced.

Example 8: The machine-readable storage media of example 7, wherein performing the combinational circuit synthesis comprises introducing a first majority or minority gate and a second majority or minority gate, wherein performing level-triggered sequential synthesis comprises: feedback wiring from an output of the first majority or minority gate to the second majority or minority gate receiving input from the auxiliary primary input; or feedback wiring from an output of the first majority or minority gate to an input of the first majority or minority gate.

Example 9: The machine-readable storage media of claim 6, wherein performing the level-triggered sequential synthesis comprises: determining whether the individual sub-circuit is a netlist; for each previous state in a Boolean expression for the individual sub-circuit, introducing an auxiliary input if it is determined that individual sub-circuit is not a netlist; performing combinational circuit synthesis on the individual sub-circuit after the auxiliary input is introduced, wherein performing the combinational circuit synthesis comprises introducing a first majority or minority gate and a second majority or minority gate; and feedback wiring from an output of the first majority or minority gate to the second majority or minority gate receiving input from the auxiliary input.

Example 10: The machine-readable storage media of claim 1, wherein performing the sequential circuit synthesis comprises: determining whether the individual sub-circuit of the sub-circuits is pulse-triggered; and performing pulse-triggered sequential synthesis on the individual sub-circuit if it is determined that the individual sub-circuit of the sub-circuits is pulse-triggered.

Example 11: The machine-readable storage media of claim 10, wherein performing the pulse-triggered sequential synthesis comprises: performing level-triggered sequential synthesis to generate a latch circuit; duplicated the latch circuit to generate a duplicate latch circuit; placing the duplicate latch circuit in back-to-back configuration with the latch circuit; and wiring a first clock to the latch circuit and a second clock to the duplicate latch circuit, wherein the second clock is an inverse of the first clock.

Example 12: The machine-readable storage media of claim 11, wherein performing the level-triggered sequential synthesis comprises: determining whether the individual sub-circuit is a netlist; introducing an auxiliary primary input to the individual sub-circuit for each feedback connection from an output of the individual sub-circuit to an input of the individual sub-circuit, if it is determined that the individual sub-circuit is a netlist; and performing combinational circuit synthesis on the individual sub-circuit after the auxiliary primary input is introduced.

Example 13: The machine-readable storage media of claim 12, wherein performing the combinational circuit synthesis comprises introducing a first majority or minority gate and a second majority or minority gate, wherein performing level-triggered sequential synthesis comprises: feedback wiring from an output of the first majority or minority gate to the second majority or minority gate receiving input from the auxiliary primary input.

Example 14: The machine-readable storage media of claim 11, wherein performing the level-triggered sequential synthesis comprises: determining whether the individual sub-circuit is a netlist; for each previous state in a Boolean expression for the individual sub-circuit, introducing an auxiliary input if it is determined that individual sub-circuit is not a netlist; performing combinational circuit synthesis on the individual sub-circuit after the auxiliary input is introduced, wherein performing the combinational circuit synthesis comprises introducing a first majority or minority gate and a second majority or minority gate; and feedback wiring from an output of the first majority or minority gate to the second majority or minority gate receiving input from the auxiliary input.

Example 15: The machine-readable storage media of claim 1, wherein performing the sequential circuit synthesis comprises: determining whether the individual sub-circuit of the sub-circuits is edge-triggered; and performing edge-triggered sequential synthesis on the individual sub-circuit if it is determined that the individual sub-circuit of the sub-circuits is edge-triggered.

Example 16: The machine-readable storage media of claim 15, wherein performing the edge-triggered sequential synthesis comprises: adding an auxiliary input to the individual sub-circuit, wherein the auxiliary input represents a delayed clock signal; initializing an empty list of synthesized circuits with a plurality of majority or minority gates with different fan-in; identifying a majority or minority gate, from the plurality of majority or minority gates, having a largest fan-in; iteratively performing level-triggered sequential synthesis on the individual sub-circuit after the auxiliary input is added and using the majority or minority gate starting with the largest fan-in and then using a next largest fan-in; for each circuit output obtained after performing level-triggered sequential synthesis, adding wire delay to the delayed clock signal to generate a wire delayed clock; and for each circuit output obtained after performing level-triggered sequential synthesis, connecting the wire delayed clock to a delay element to generate a plurality of synthesized circuits.

Example 17: The machine-readable storage media of claim 16, wherein performing the edge-triggered sequential synthesis comprises: checking for oscillation in the plurality of synthesized circuits; and identifying a synthesized circuit, from the plurality of synthesized circuits, that meets power, performance, and area objectives.

Example 18: The machine-readable storage media of claim 16, wherein performing the level-triggered sequential synthesis comprises: determining whether the individual sub-circuit is a netlist; introducing an auxiliary primary input to the individual sub-circuit for each feedback connection from an output of the individual sub-circuit to an input of the individual sub-circuit, if it is determined that the individual sub-circuit is a netlist; and performing combinational circuit synthesis on the individual sub-circuit after the auxiliary primary input is introduced.

Example 19: The machine-readable storage media of claim 18, wherein performing the combinational circuit synthesis comprises introducing a first majority or minority gate and a second majority or minority gate, wherein performing level-triggered sequential synthesis comprises: feedback wiring from an output of the first majority or minority gate to the second majority or minority gate receiving input from the auxiliary primary input.

Example 20: The machine-readable storage media of claim 16, wherein performing the level-triggered sequential synthesis comprises: determining whether the individual sub-circuit is a netlist; for each previous state in a Boolean expression for the individual sub-circuit, introducing an auxiliary input if it is determined that individual sub-circuit is not a netlist; performing combinational circuit synthesis on the individual sub-circuit after the auxiliary input is introduced, wherein performing the combinational circuit synthesis comprises introducing a first majority or minority gate and a second majority or minority gate; and feedback wiring from an output of the first majority or minority gate to the second majority or minority gate receiving input from the auxiliary input.

Example 21: The machine-readable storage media of claim 3, wherein performing the majority inverter graph (MIG) synthesis, to generate a MIG with connected nodes of majority gates and inverter gates, comprises: computing a maximum fan-in for majority or minority gates while ignoring fan-out constraints, wherein a maximum fan-in for a majority or minority gate is equal to a maximum number of inputs bits of the majority or minority gate; performing logic initialization for each sub-circuit of the sub-circuits; determining whether a number of input bits of a sub-circuit of the sub-circuits is less than or equal to K; if the number of input bits is less than or equal to K, applying optimal synthesis to the sub-circuit using one or more of a truth table of the sub-circuit, a binary integer programming (BIP), or a Boolean satisfiability; and performing inverter minimization in response to applying the optimal synthesis to generate a synthesized MIG circuit.

Example 22: The machine-readable storage media of claim 21, wherein K is less than 10.

Example 23: The machine-readable storage media of claim 21, wherein performing the majority inverter graph (MIG) synthesis comprises: if the number of input bits is greater than K, determining whether the number of input bits of a sub-circuit of the sub-circuits is less than or equal to H, where H is greater than K; and performing inverter minimization on the sub-circuit to generate the synthesized MIG circuit.

Example 24: The machine-readable storage media of claim 23, wherein H is 20 or more.

Example 25: The machine-readable storage media of claim 23, wherein performing the majority inverter graph (MIG) synthesis comprises: if the number of input bits is greater than H, independently applying a plurality of hierarchical synthesis to the sub-circuit and results from the plurality of hierarchical synthesis are glued together to generate the synthesized MIG circuit.

Example 26: The machine-readable storage media of claim 21, wherein performing the logic initialization comprises: determining whether the number of input bits of the sub-circuit of the sub-circuits is less than or equal to K; determining whether logic of the sub-circuit is specified as a truth table; outputting the truth table if it is determined that the logic of the sub-circuit is specified as a truth table; and simulating or determining the truth table if it is determined that the logic of the sub-circuit is not specified as a truth table.

Example 27: The machine-readable storage media of claim 21, wherein performing the logic initialization comprises: determining whether the logic of the sub-circuit is specified as a hardware description language or a netlist if the number of input bits of the sub-circuit of the sub-circuits is greater than K; determining whether logic of the sub-circuit is specified as a truth table if it is determined that the logic of the sub-circuit is specified as a hardware description language or a netlist; and mapping the netlist to a MIG using majority or minority gates from the standard cell library if it is determined that the logic is not specified as a truth table.

Example 28: The machine-readable storage media of claim 21, wherein performing the logic initialization comprises: determining whether the logic of the sub-circuit is specified as a hardware description language or a netlist if the number of input bits of the sub-circuit of the sub-circuits is greater than K; determining whether logic of the sub-circuit is specified as a truth table if it is determined that the logic of the sub-circuit is specified as a hardware description language or a netlist; applying logic synthesis on the sub-circuit to obtain a netlist if it is determined that the logic is specified as a truth table; and mapping the netlist to a MIG using majority or minority gates from the standard cell library if it is determined that the logic is not specified as a truth table.

Example 29: The machine-readable storage media of claim 27, wherein performing the logic initialization comprises: determining whether the logic of the sub-circuit is specified as a graph of higher-level blocks, it is determined that the logic of the sub-circuit is not specified as a hardware description language or a netlist; and mapping the graph of the higher-level blocks to a MIG using the majority or minority gates from the standard cell library if it is determined that the logic is specified as a graph.

Example 30: The machine-readable storage media of claim 29, wherein performing the logic initialization comprises: determining whether the logic of the sub-circuit is specified as a truth table, if it is determined that the logic is not specified as a graph; parsing and simulating for a truth table if it is determined that the logic of the sub-circuit is not specified as a truth table; and generating a MIG using wide-input majority or minority gates by applying the truth table.

Example 31: The machine-readable storage media of claim 29, wherein generating a MIG using wide-input majority or minority gates comprises: generating a list of product terms of the logic of the sub-circuit; order the product terms in descending or ascending order of literal frequency of the product terms, to generate a list of ordered product terms; determining whether there is delay minimization for the list of ordered product terms; and applying logarithmic breakdown and majority gate synthesis of each product term in the list of ordered product terms if delay minimization is possible.

Example 32: The machine-readable storage media of claim 31, wherein generating a MIG using wide-input majority or minority gates comprises: applying linear breakdown and majority gate synthesis of each product term in the list of ordered product terms if delay minimization is not possible.

Example 33: The machine-readable storage media of claim 31, wherein generating a MIG using wide-input majority or minority gates comprises: generating a list of sum terms of the logic of the sub-circuit; tallying the product terms across the list of sum terms; order the list of sum terms in descending or ascending order of product term frequency, to generate a list of ordered sum terms; determining whether there is delay minimization for the list of ordered sum terms; and applying logarithmic breakdown and majority gate synthesis of each sum term in the list of ordered sum terms if delay minimization is possible, to generate the MIG.

Example 34: The machine-readable storage media of claim 33, wherein generating a MIG using wide-input majority or minority gates comprises: applying linear breakdown and majority gate synthesis of each sum term in the list of ordered sum terms if delay minimization is not possible, to generate the MIG.

Example 35: The machine-readable storage media of claim 31, wherein generating the list of product terms comprises: applying one or more of Karnaugh map, Quine McCluskey algorithm, or Espresso heuristic on the sub-circuit.

Example 36: A machine-readable storage media having machine-readable instructions stored thereon that when executed cause one or more machines to perform a method comprising: receiving one or more input files indicative of a logic function; generating a graph from the one or more input files; identifying inputs, state elements, and outputs from the graph; segregating the graph into subgraphs by grouping logic components between the inputs and the state elements, between the state elements, between the state elements and the outputs, and between the input and the outputs; and determining whether a subgraph from among the subgraphs includes a feedback path; performing combinational circuit synthesis on the subgraph if it is determined that the subgraph does not include a feedback path; performing sequential circuit synthesis on the subgraph if it is determined that the subgraph includes a feedback path; synthesizing a circuit using outputs from the combinational circuit synthesis and the sequential circuit synthesis.

Example 37: The machine-readable storage media of claim 36, wherein performing combinational circuit synthesis or performing sequential circuit synthesis comprises: selecting standard CMOS logic gates and majority or minority gates of any fan-in or fan-out to synthesize the circuit.

Example 38: The machine-readable storage media of claim 36, wherein the majority or minority gates include non-linear polar material.

Example 39: The machine-readable storage media of claim 38, wherein the non-linear polar material includes one of: ferroelectric material, para-electric material, or non-linear dielectric.

Example 40: The machine-readable storage media of claim 39, wherein the ferroelectric material includes one of: Bismuth ferrite (BFO), BFO with a doping material where in the doping material is one of Lanthanum, or elements from lanthanide series of periodic table; Lead zirconium titanate (PZT), or PZT with a doping material, wherein the doping material is one of La, Nb; relaxor ferroelectric which includes one of lead magnesium niobate (PMN), lead magnesium niobate-lead titanate (PMN-PT), lead lanthanum zirconate titanate (PLZT), lead scandium niobate (PSN), Barium Titanium-Bismuth Zinc Niobium Tantalum (BT-BZNT), or Barium Titanium-Barium Strontium Titanium (BT-BST); perovskite includes one of: BaTiO3, PbTiO3, KNbO3, or NaTaO3; hexagonal ferroelectric includes one of: YMnO3, or LuFeO3; hexagonal ferroelectrics of a type h-RMnO3, where R is a rare earth element which includes one of: cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), or yttrium (Y); Hafnium (Hf), Zirconium (Zr), Aluminum (Al), Silicon (Si), their oxides or their alloyed oxides; Hafnium oxides as Hfl-x Ex Oy, where E can be Al, Ca, Ce, Dy, er, Gd, Ge, La, Sc, Si, Sr, Sn, or Y; Al(1-x)Sc(x)N, Ga(1-x)Sc(x)N, Al(1-x)Y(x)N or Al(1-x-y)Mg(x)Nb(y)N, y doped HfO2, where x includes one of: Al, Ca, Ce, Dy, Er, Gd, Ge, La, Sc, Si, Sr, Sn, or Y, wherein 'x' is a fraction; Niobate type compounds LiNbO3, LiTaO3, Lithium iron Tantalum Oxy Fluoride, Barium Strontium Niobate, Sodium Barium Niobate, or Potassium strontium niobate; or improper ferroelectric includes one of: [PTO/STO]n or [LAO/STO]n, where 'n' is between 1 to 100.

Example 41: The machine-readable storage media of claim 36, wherein the input is in one or more forms of Verilog, truth table, Boolean expression, graph, or netlist.

Example 42: The machine-readable storage media of claim 36, wherein performing combinational circuit synthesis on the subgraph comprises iteratively breaking subgraph into smaller blocks.

Example 43: The machine-readable storage media of claim 42, wherein performing combinational circuit synthesis comprises: selecting an option that maximizes power, performance, and area for the block; for each block of the smaller blocks, synthesizing the block in view of the selected option, using CMOS cells, or a combination of CMOS cells and majority or minority gate cells, wherein synthesizing the block results in a synthesized block; and combining the synthesized block, associated with each block of the smaller blocks, to hierarchically create larger cells and a complete circuit.

Example 44: The machine-readable storage media of claim 36, wherein performing combinational circuit synthesis on the subgraph comprises: breaking subgraph into blocks; selecting an option that maximizes power, performance, and area for each block of the blocks of the subgraph; performing majority-minority inverter graph (MIG) synthesis on the blocks to generate MIG subgraphs; and matching a functionality of one or more standard building block cells to sections of the MIG subgraphs that maximizes power, performance, and area of the sections of the MIG subgraphs.

Example 45: The machine-readable storage media of claim 44, wherein performing combinational circuit synthesis on the subgraph comprises: replacing the sections of the MIG subgraphs with the one or more standard building block cells if a matching functionality is determined; and combining the replaced sections of the MIG subgraphs with other sections of the MIG subgraphs to generate a complete circuit.

Example 46: The machine-readable storage media of claim 44, wherein the one or more standard building block cells include CMOS cells, majority or minority gate cells, or a combination of CMOS cells and majority or minority gate cells.

Example 47: The machine-readable storage media of claim 44, wherein performing combinational circuit synthesis on the subgraph comprises: prioritizing and selecting one or more larger building block cells over the one or more standard building block cells if the one or more larger building block cells match a functionality of the sections of the MIG subgraphs that maximizes power, performance, and area of the sections of the MIG subgraphs; replacing the sections of the MIG subgraphs with the one or more larger building block cells if a matching functionality is determined; and combining the replaced sections of the MIG subgraphs with other sections of the MIG subgraphs to generate a complete circuit.

Example 48: The machine-readable storage media of claim 36, wherein performing sequential circuit synthesis on the subgraph, comprises: determining if the subgraph indicates an edge triggered sequential; adding an input variable to the subgraph to represent a previous output state, if it is determined that the subgraph indicates a non-edge triggered sequential; applying a truth table for a latch to the subgraph with the input variable; performing majority-minority inverter graph (MIG) synthesis to the subgraph, in response to applying the truth table, to generate MIG subgraphs; modifying the MIG subgraphs by wiring an output of the latch to one or more nodes of a majority or minority gate cell to receive input from the previous output state; and generating a synthesized circuit in response to modifying the MIG subgraphs.

Example 49: The machine-readable storage media of claim 36, wherein performing sequential circuit synthesis on the subgraph, comprises: determining if the subgraph indicates an edge triggered sequential; if the subgraph indicates the edge triggered sequential, determining if the edge triggered sequential is a master-slave architecture; if the edge triggered sequential is a master-slave architecture, adding an input variable to the subgraph to represent a previous output state; applying a truth table for a latch to the subgraph with the input variable; performing majority-minority inverter graph (MIG) synthesis to the subgraph, in response to applying the truth table, to generate MIG subgraphs; and modifying the MIG subgraphs by wiring an output of the latch to one or more nodes of a majority or minority gate cell to receive input from the previous output state; duplicating the latch to generate a duplicated latch; coupling the latch with duplicated latch to generate a master-slave architecture; wiring a clock to the latch and an inverted clock to the duplicated latch after modifying the MIG subgraphs; and generating a synthesized circuit in response to wiring the clock to the latch and the inverted clock to the duplicated latch.

Example 50: The machine-readable storage media of claim 36, wherein performing sequential circuit synthesis on the subgraph, comprises: determining if the subgraph indicates an edge triggered sequential; if the subgraph indicates the edge triggered sequential, determining if the edge triggered sequential is a master-slave architecture; if the edge triggered sequential is not a master-slave architecture, adding a first input variable to represent to the subgraph to represent a previous output state; if the edge triggered sequential is not a master-slave architecture, adding a second input variable to represent to the subgraph to represent a delayed clock; applying a truth table for a flip-flop to the subgraph; performing majority-minority inverter graph (MIG) synthesis to the subgraph, in response to applying the truth table, to generate MIG subgraphs; modifying the MIG subgraphs by wiring an output of the flip-flop to one or more nodes of a majority or minority gate cell to receive input from the previous output state; modifying the MIG subgraphs by wiring the delayed clock as a clock to a delay element; and generating a synthesized circuit in response to wiring the output of the flip-flop and wiring the delayed clock as the clock to the delay element.

Example 51: The machine-readable storage media of claim 44, wherein performing majority-minority inverter graph (MIG) synthesis to the subgraph, comprises: receiving inputs on the blocks of the subgraph; identifying a number of blocks in the subgraph; comparing the number of blocks with a first threshold; exacting synthesis of the subgraph using one or more solvers if it is determined that the number of blocks is less than or equal to the first threshold; performing inverter minimization in response to exacting synthesis; and synthesizing the subgraph in response to performing inverter minimization.

Example 52: The machine-readable storage media of claim 44, wherein performing majority-minority inverter graph (MIG) synthesis to the subgraph, comprises: identifying a number of blocks in the subgraph; comparing the number of blocks with a first threshold; comparing the number of blocks with a second threshold, if it is determined that the number of blocks is greater than the first threshold, wherein the second threshold is larger than the first threshold; simulating the subgraph to determine signal flowing through each edge of the subgraph if it is determined that the number of blocks is less than or equal to the second threshold; topologically splitting the subgraph into first subgraphs, equivalent to the first threshold, using heuristics that maximizes power, performance, and area for each block of the blocks of the subgraph; exacting synthesis of each subgraphs of the first subgraphs topologically, using the signal flowing through each edge of the graph, to generate synthesized first subgraphs; performing inverter minimization in response to exacting synthesis; adding the synthesized first subgraphs to a new graph; determining whether the new graph has better power, performance, and area than the subgraph to which MIG synthesis is performed; and synthesizing the synthesized first subgraphs if it is determined that the new graph is worst in power, performance, and area than the subgraph to which MIG synthesis is performed.

Example 53: The machine-readable storage media of claim 52, wherein performing majority-minority inverter graph (MIG) synthesis to the subgraph, comprises simulating the subgraph to determine the signal flowing through each edge of the subgraph if it is determined that the new graph is better in power, performance, and area than the subgraph to which MIG synthesis is performed.

Example 54: The machine-readable storage media of claim 52, wherein the signal flowing through each edge of the graph is determined by applying one or more solvers.

Example 55: The machine-readable storage media of claim 54, wherein the one or more solvers include: satisfiability solver (SAT) and Mixed Integer Linear Programming (MIP).

Example 56: The machine-readable storage media of claim 54, wherein the one or more solvers include: satisfiability solver (SAT) and Mixed Integer Linear Programming (MIP).

Example 57: The machine-readable storage media of claim 52, wherein the inputs include: gate type, maximum gate fan-in, area or delay target, and description of blocks.

Example 58: The machine-readable storage media of claim 54, wherein the description of blocks includes one or more of: Verilog, graph netlist, or truth table.

Example 59: The machine-readable storage media of claim 44, wherein performing majority-minority inverter graph (MIG) synthesis to the subgraph, comprises: identifying a number of blocks in the subgraph; comparing the number of blocks with a first threshold; comparing the number of blocks with a second threshold, if it is determined that the number of blocks is greater than the first threshold, wherein the second threshold is larger than the first threshold; topologically splitting the subgraph into second subgraphs, wherein each second subgraph has blocks less than or equal to the second threshold; simulating each of the second subgraphs to determine signal flowing through each edge of the second subgraph; topologically splitting each of the second subgraphs into third subgraphs using heuristics that maximizes power, performance, and area for each block of the blocks of the second subgraphs; exacting synthesis of each subgraphs of the third subgraphs topologically, signal flowing through each edge of the second subgraph and by applying one or more solvers, wherein exacting synthesis of each subgraphs of the third subgraphs generates exacted third subgraphs; performing inverter minimization in response to exacting synthesis; adding the synthesized second subgraphs to the exacted third subgraphs, to generate a new graph; determining whether the new graph has better power, performance, and area than the subgraph to which MIG synthesis is performed; and synthesizing the new graph if it is determined that the new graph is worst in power, performance, and area than the subgraph to which MIG synthesis is performed.

Example 60: The machine-readable storage media of claim 59, wherein performing majority-minority inverter graph (MIG) synthesis to the subgraph, comprises: topologically splitting the subgraph if it is determined that the new graph has better power, performance, and area than the subgraph to which MIG synthesis is performed.

Example 61: The machine-readable storage media of claim 59, wherein the second subgraphs are overlapping subgraphs.

Example 62: A machine-readable storage media having machine-readable instructions stored thereon that when executed cause one or more machines to perform a method comprising: receiving one or more input files indicative of a logic function; generating a graph from the one or more input files; identifying inputs, state elements, and outputs from the graph; segregating the graph into subgraphs by grouping logic components between the inputs and the state elements, between the state elements, between the state elements and the outputs, and between the input and the outputs; determining whether a subgraph from among the subgraphs includes a feedback path; selecting standard CMOS logic gates and majority or minority gates of any fan-in or fan-out; performing combinational circuit synthesis on the subgraph, using the selected standard CMOS logic gates and majority or minority gates, if it is determined that the subgraph does not include a feedback path; performing sequential circuit synthesis on the subgraph, using the selected standard CMOS logic gates and majority or minority gates, if it is determined that the subgraph includes a feedback path; and synthesizing a circuit using outputs from the combinational circuit synthesis and the sequential circuit synthesis.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A non-transitory machine-readable storage media having machine-readable instructions stored thereon that when executed cause one or more machines to perform a method comprising:
   receiving one or more input files indicative of a logic function of a logic circuit;
   classify, from the one or more input files, inputs, outputs, and state elements as terminal nodes;
   segmenting the logic circuit into sub-circuits with the terminal nodes as input and output ports;
   generating a list of combinational circuits and sequential circuits by analyzing feedback paths in each of the sub-circuits;
   for each item in the list of combinational circuits and sequential circuits, performing combinational circuit synthesis on an individual sub-circuit of the sub-circuits if it is determined that the individual sub-circuit does not include a feedback path,
   for each item in the list of combinational circuits and sequential circuits, performing sequential circuit synthesis on the individual sub-circuit if it is determined that the individual sub-circuit includes a feedback path;

adding synthesized outputs from performing the combinational circuit synthesis and from performing the sequential circuit synthesis to a list of synthesized circuits; and wiring circuits, to generate a synthesized circuit, in the list of synthesized circuits using the inputs and the outputs of the logic circuit.

2. The non-transitory machine-readable storage media of claim 1, wherein performing the combinational circuit synthesis comprises:

iteratively breaking each sub-circuit of the sub-circuits into non-overlapping blocks;

selecting an option that maximizes power, performance, and area for a block of the non-overlapping blocks;

for each block of the non-overlapping blocks, synthesizing the block in view of the selected option using standard CMOS logic gates and majority or minority gates of any fan-in or fan-out, or a combination of them, wherein synthesizing the block results in a synthesized block;

adding the synthesized block to a list of synthesized blocks; and combining synthesized blocks from the list of synthesized blocks, to hierarchically create larger cells and a complete circuit, wherein a larger cell of the larger cells is larger than a block of the non-overlapping blocks.

3. The non-transitory machine-readable storage media of claim 1, wherein performing the combinational circuit synthesis comprises:

for each sub-circuit of the sub-circuits, performing majority inverter graph (MIG) synthesis to generate a MIG with connected nodes of majority or minority gates and inverter gates; and heuristically pattern matching the MIG, with a standard cell library comprising logic gates, to generate a synthesized circuit.

4. The non-transitory machine-readable storage media of claim 3, wherein the logic gates include an n-bit adder and an n-bit multiplier.

5. The non-transitory machine-readable storage media of claim 3, wherein heuristically pattern matching the MIG comprises:

ordering the logic gates in the standard cell library from largest to smallest or smallest to largest, to generate ordered logic gates;

defining a current pattern as a representation of a current standard cell in the ordered logic gates;

determining whether a match exists between the current pattern and a subgraph of the MIG; and replacing the subgraph of the MIG with the current pattern if the match exists.

6. The non-transitory machine-readable storage media of claim 1, wherein performing the sequential circuit synthesis comprises:

determining whether the individual sub-circuit of the sub-circuits is level-triggered; and performing level-triggered sequential synthesis on the individual sub-circuit if it is determined that the individual sub-circuit of the sub-circuits is level-triggered.

7. The non-transitory machine-readable storage media of claim 6, wherein performing the level-triggered sequential synthesis comprises:

determining whether the individual sub-circuit is a netlist or specified as a hardware description language;

introducing an auxiliary primary input to the individual sub-circuit for each feedback connection from an output of the individual sub-circuit to an input of the individual sub-circuit, if it is determined that the individual sub-circuit is a netlist or specified as a hardware description language; and performing combinational circuit synthesis on the individual sub-circuit after the auxiliary primary input is introduced.

8. The non-transitory machine-readable storage media of claim 7, wherein performing the combinational circuit synthesis comprises introducing a first majority or minority gate and a second majority or minority gate, wherein performing level-triggered sequential synthesis comprises:

feedback wiring from an output of the first majority or minority gate to the second majority or minority gate receiving input from the auxiliary primary input; or feedback wiring from an output of the first majority or minority gate to an input of the first majority or minority gate.

9. The non-transitory machine-readable storage media of claim 6, wherein performing the level-triggered sequential synthesis comprises:

determining whether the individual sub-circuit is a netlist or specified as a hardware description language;

for each previous state in a Boolean expression for the individual sub-circuit, introducing an auxiliary input if it is determined that individual sub-circuit is not a netlist and not specified as a hardware description language;

performing combinational circuit synthesis on the individual sub-circuit after the auxiliary input is introduced, wherein performing the combinational circuit synthesis comprises introducing a first majority or minority gate and a second majority or minority gate; and feedback wiring from an output of the first majority or minority gate to the second majority or minority gate receiving input from the auxiliary input.

10. The non-transitory machine-readable storage media of claim 1, wherein performing the sequential circuit synthesis comprises:

determining whether the individual sub-circuit of the sub-circuits is pulse-triggered; and performing pulse-triggered sequential synthesis on the individual sub-circuit if it is determined that the individual sub-circuit of the sub-circuits is pulse-triggered.

11. A non-transitory machine-readable storage media having machine-readable instructions stored thereon that when executed cause one or more machines to perform a method comprising:

receiving one or more input files indicative of a logic function;

generating a graph from the one or more input files;

identifying inputs, state elements, and outputs from the graph;

segregating the graph into subgraphs by grouping logic components between the inputs and the state elements, between the state elements, between the state elements and the outputs, and between the input and the outputs;

determining whether a subgraph from among the subgraphs includes a feedback path;

performing combinational circuit synthesis on the subgraph if it is determined that the subgraph does not include a feedback path;

performing sequential circuit synthesis on the subgraph if it is determined that the subgraph includes a feedback path; and synthesizing a circuit using outputs from the combinational circuit synthesis and the sequential circuit synthesis.

12. The non-transitory machine-readable storage media of claim 11, wherein performing combinational circuit synthesis or performing sequential circuit synthesis comprises:
   selecting standard CMOS logic gates and majority or minority gates of any fan-in or fan-out to synthesize the circuit.

13. The non-transitory machine-readable storage media of claim 12, wherein the majority or minority gates include non-linear polar material.

14. The non-transitory machine-readable storage media of claim 13, wherein the non-linear polar material includes one of: ferroelectric material, para-electric material, or non-linear dielectric.

15. The non-transitory machine-readable storage media of claim 11, wherein the one or more input files are in one or more forms of Verilog, truth table, Boolean expression, graph, or netlist.

16. The non-transitory machine-readable storage media of claim 11, wherein performing combinational circuit synthesis on the subgraph comprises iteratively breaking the subgraph into smaller blocks.

17. The non-transitory machine-readable storage media of claim 16, wherein performing combinational circuit synthesis comprises:
   selecting an option that maximizes power, performance, and area for an individual block of the smaller blocks;
   for each block of the smaller blocks, synthesizing the block in view of the selected option, using CMOS cells, or a combination of CMOS cells and majority or minority gate cells, wherein the synthesizing the block results in a synthesized block; and
   combining the synthesized block, associated with each block of the smaller blocks, to hierarchically create larger cells and a complete circuit.

18. The non-transitory machine-readable storage media of claim 11, wherein performing combinational circuit synthesis on the subgraph comprises:
   breaking the subgraph into blocks;
   selecting an option that maximizes power, performance, and area for each block of the blocks of the subgraph;
   performing majority-minority inverter graph (MIG) synthesis on the blocks to generate MIG subgraphs; and
   matching a functionality of one or more standard building block cells to sections of the MIG subgraphs that maximizes power, performance, and area of the sections of the MIG subgraphs.

19. The non-transitory machine-readable storage media of claim 18, wherein performing combinational circuit synthesis on the subgraph comprises:
   replacing the sections of the MIG subgraphs with the one or more standard building block cells if a matching functionality is determined; and
   combining the replaced sections of the MIG subgraphs with other sections of the MIG subgraphs to generate a complete circuit, wherein the one or more standard building block cells include CMOS cells, majority or minority gate cells, or a combination of CMOS cells and majority or minority gate cells.

20. A non-transitory machine-readable storage media having machine-readable instructions stored thereon that when executed cause one or more machines to perform a method comprising:
   receiving one or more input files indicative of a logic function;
   generating a graph from the one or more input files;
   identifying inputs, state elements, and outputs from the graph;
   segregating the graph into subgraphs by grouping logic components between the inputs and the state elements, between the state elements, between the state elements and the outputs, and between the input and the outputs;
   determining whether a subgraph from among the subgraphs includes a feedback path;
   selecting standard CMOS logic gates and majority or minority gates of any fan-in or fan-out;
   performing combinational circuit synthesis on the subgraph, using the selected standard CMOS logic gates and majority or minority gates, if it is determined that the subgraph does not include the feedback path;
   performing sequential circuit synthesis on the subgraph, using the selected standard CMOS logic gates and majority or minority gates, if it is determined that the subgraph includes a feedback path; and
   synthesizing a circuit using outputs from the combinational circuit synthesis and the sequential circuit synthesis.

* * * * *